US010625560B2

(12) United States Patent
Miyakoshi et al.

(10) Patent No.: US 10,625,560 B2
(45) Date of Patent: Apr. 21, 2020

(54) VEHICLE AIR CONDITIONER

(71) Applicant: Sanden Holdings Corporation, Isesaki-shi, Gunma (JP)

(72) Inventors: Ryo Miyakoshi, Isesaki (JP); Kenichi Suzuki, Isesaki (JP)

(73) Assignee: SANDEN HOLDINGS CORPORATION, Isesaki-shi, Gunma (JP)

( * ) Notice: Subject to any disclaimer, the term of this patent is extended or adjusted under 35 U.S.C. 154(b) by 288 days.

(21) Appl. No.: 15/304,997

(22) PCT Filed: Mar. 20, 2015

(86) PCT No.: PCT/JP2015/001595
§ 371 (c)(1),
(2) Date: Oct. 18, 2016

(87) PCT Pub. No.: WO2015/159485
PCT Pub. Date: Oct. 22, 2015

(65) Prior Publication Data
US 2017/0182860 A1   Jun. 29, 2017

(30) Foreign Application Priority Data

Apr. 18, 2014  (JP) .................................. 2014-086387
Apr. 18, 2014  (JP) .................................. 2014-086388

(51) Int. Cl.
*B60H 1/00* (2006.01)
*B60H 1/22* (2006.01)
*B60H 1/32* (2006.01)

(52) U.S. Cl.
CPC ........... *B60H 1/00007* (2013.01); *B60H 1/00* (2013.01); *B60H 1/004* (2013.01); *B60H 1/008* (2013.01);
(Continued)

(58) Field of Classification Search
CPC .... B60H 1/3207; B60H 1/3208; B60H 1/321; B60H 2001/3255; B60H 2001/3258;
(Continued)

(56) References Cited

U.S. PATENT DOCUMENTS 5,526,650 A * 6/1996 Iritani ................ B60H 1/00907
62/205
5,544,493 A * 8/1996 Suzuki ................... B60H 1/321
62/133

(Continued)

FOREIGN PATENT DOCUMENTS

JP   06-191253 A   7/1994
JP   07-172160 A   7/1995
(Continued)

OTHER PUBLICATIONS

The State Intellectual Property Office of the People's Republic of China, The First Office Action issued in Chinese Patent Application No. 201580020249.1, dated Jan. 23, 2018.
(Continued)

*Primary Examiner* — Christopher R Zerphey
*Assistant Examiner* — For K King
(74) *Attorney, Agent, or Firm* — Baker Botts L.L.P.

(57) ABSTRACT

There is disclosed a vehicle air conditioner which is capable of enlarging an effective range of a dehumidifying and heating mode to environmental conditions and smoothly dehumidifying and heating a vehicle interior. A vehicle air conditioner 1 executes a dehumidifying and heating mode in which a controller lets a refrigerant discharged from a compressor 2 radiate heat in a radiator 4, and decompresses the refrigerant by which heat has been radiated and then lets the refrigerant absorb heat in a heat absorber 9 and an outdoor heat exchanger 7, the controller decreases an outdoor blower voltage FANVout of an outdoor blower 15 and
(Continued)

decreases an air volume into the outdoor blower 15 in a case where a temperature Te of the heat absorber 9 is high even when the controller adjusts a valve position of an outdoor expansion valve 6 into a lower limit of controlling in a situation in which a temperature TCI of the radiator 4 is satisfactory.

22 Claims, 24 Drawing Sheets

(52) U.S. Cl.
CPC ........ *B60H 1/0073* (2019.05); *B60H 1/0075* (2013.01); *B60H 1/00642* (2013.01); *B60H 1/00764* (2013.01); *B60H 1/00828* (2013.01); *B60H 1/00835* (2013.01); *B60H 1/00885* (2013.01); *B60H 1/22* (2013.01); *B60H 1/32* (2013.01); *B60H 1/3207* (2013.01); *B60H 1/3204* (2013.01); *B60H 1/3205* (2013.01); *B60H 2001/325* (2013.01); *B60H 2001/326* (2013.01); *B60H 2001/327* (2013.01); *B60H 2001/328* (2013.01); *B60H 2001/3241* (2013.01); *B60H 2001/3245* (2013.01); *B60H 2001/3252* (2013.01); *B60H 2001/3258* (2013.01); *B60H 2001/3261* (2013.01); *B60H 2001/3263* (2013.01); *B60H 2001/3285* (2013.01)

(58) Field of Classification Search
CPC ....... B60H 2001/326; F24F 3/153; F01P 7/10; F25B 2313/0294; F25B 2600/111

USPC .......................................................... 62/90
See application file for complete search history.

(56) References Cited

U.S. PATENT DOCUMENTS

| | | | | |
|---|---|---|---|---|
| 5,634,348 | A * | 6/1997 | Ikeda ................ | B60H 1/00735 62/160 |
| 5,685,162 | A * | 11/1997 | Iritani ................ | B60H 1/00021 62/156 |
| 5,782,102 | A * | 7/1998 | Iritani ................ | B60H 1/00021 62/197 |
| 6,826,921 | B1 * | 12/2004 | Uselton ................... | F24F 3/153 62/176.6 |
| 8,667,931 | B2 * | 3/2014 | Kerns ....................... | F01P 7/10 123/41.05 |
| 2011/0016896 | A1 * | 1/2011 | Oomura ............. | B60H 1/00785 62/155 |
| 2013/0025312 | A1 | 1/2013 | Hayashi | |
| 2015/0040594 | A1 * | 2/2015 | Suzuki ............... | B60H 1/00899 62/159 |

FOREIGN PATENT DOCUMENTS

| | | |
|---|---|---|
| JP | 08-276720 A | 10/1996 |
| JP | 2012-176660 A | 9/2012 |
| WO | 2011/125694 A1 | 10/2011 |

OTHER PUBLICATIONS

Japan Patent Office, International Search Report for PCT/JP2015/001595, dated Jun. 2, 2015.

\* cited by examiner

FIG. 6

DEHUMIDIFYING AND HEATING STATE JUDGMENT

| CaseNo | 0 | 1 | 2 | 3 | 4 | 5 | 6 | 7 | 8 |
|---|---|---|---|---|---|---|---|---|---|
| RADIATOR TEMPERATURE (HIGH PRESSURE) | CONVERGE | CONVERGE | ← | HIGH | LOW | HIGH | LOW | HIGH | LOW |
| HEAT ABSORBER TEMPERATURE | CONVERGE | HIGH | LOW | CONVERGE | ← | HIGH | LOW | LOW | HIGH |
| COMPRESSOR CONTROL | IN CONTROL RANGE | ← | ← | STICK TO LOWER LIMIT | STICK TO UPPER LIMIT | STICK TO LOWER LIMIT | STICK TO UPPER LIMIT | STICK TO LOWER LIMIT | STICK TO UPPER LIMIT |
| OUTDOOR EXPANSION VALVE CONTROL | IN CONTROL RANGE | STICK TO CLOSING DIRECTION | STICK TO OPENING DIRECTION | IN CONTROL RANGE | ← | STICK TO CLOSING DIRECTION | STICK TO OPENING DIRECTION | ← | STICK TO CLOSING DIRECTION |
| OUTDOOR BLOWER CONTROL | USUAL CONTROL | CONTROL IN DECREASING DIRECTION | CONTROL IN INCREASING DIRECTION | CONTROL IN DECREASING DIRECTION | CONTROL IN INCREASING DIRECTION | CONTROL IN DECREASING DIRECTION | CONTROL IN INCREASING DIRECTION | × | × |
| | | TEO F/B (HEAT ABSORBER TEMPERATURE CONTROL) | | PCO F/B (HIGH PRESSURE CONTROL) | | TEO, PCO SELECT Min IN F/B | TEO, PCO SELECT Max IN F/B | DEHUMIDIFYING AND HEATING ARE NOT ESTABLISHED ⇒CHANGE TO ANOTHER HP MODE | |

FIG. 13

| PARAMETER | | OUTDOOR BLOWER AIR VOLUME TENDENCY |
|---|---|---|
| Tam | HIGH | DECREASE |
| | LOW | INCREASE |
| TCO | HIGH | INCREASE |
| | LOW | DECREASE |
| TEO | HIGH | INCREASE |
| | LOW | DECREASE |
| Ga | HIGH | INCREASE |
| | LOW | DECREASE |
| Tin | HIGH | DECREASE |
| | LOW | INCREASE |
| RHin | HIGH | DECREASE |
| | LOW | INCREASE |

FIG. 17

DEHUMIDIFYING AND COOLING STATE JUDGMENT

| CaseNo | 0 | 1 | 2 | 3 | 4 | 5 | 6 | 7 | 8 |
|---|---|---|---|---|---|---|---|---|---|
| RADIATOR TEMPERATURE (HIGH PRESSURE) | CONVERGE | CONVERGE | ← | HIGH | LOW | HIGH | LOW | HIGH | LOW |
| HEAT ABSORBER TEMPERATURE | CONVERGE | HIGH | LOW | CONVERGE | ← | HIGH | LOW | LOW | HIGH |
| OUTDOOR EXPANSION VALVE CONTROL | IN CONTROL RANGE | ← | ← | STICK TO OPENING DIRECTION | STICK TO CLOSING DIRECTION | STICK TO OPENING DIRECTION | STICK TO CLOSING DIRECTION | STICK TO OPENING DIRECTION | STICK TO CLOSING DIRECTION |
| COMPRESSOR CONTROL | IN CONTROL RANGE | STICK TO UPPER LIMIT | STICK TO LOWER LIMIT | IN CONTROL RANGE | ← | STICK TO UPPER LIMIT | STICK TO LOWER LIMIT | STICK TO LOWER LIMIT | STICK TO UPPER LIMIT |
| OUTDOOR BLOWER CONTROL | USUAL CONTROL | CONTROL IN INCREASING DIRECTION | CONTROL IN DECREASING DIRECTION | CONTROL IN INCREASING DIRECTION | CONTROL IN DECREASING DIRECTION | CONTROL IN INCREASING DIRECTION | CONTROL IN DECREASING DIRECTION | × | × |
| | | TEO F/B (HEAT ABSORBER TEMPERATURE CONTROL) | TEO F/B (HEAT ABSORBER TEMPERATURE CONTROL) | PCO F/B (HIGH PRESSURE CONTROL) | PCO F/B (HIGH PRESSURE CONTROL) | TEO, PCO SELECT Max IN F/B | TEO, PCO SELECT Min IN F/B | DEHUMIDIFYING AND COOLING ARE NOT ESTABLISHED → CHANGE TO ANOTHER HP MODE | |

FIG. 24

| PARAMETER | | OUTDOOR BLOWER AIR VOLUME TENDENCY |
|---|---|---|
| Tam | HIGH | INCREASE |
|  | LOW | DECREASE |
| TCO | HIGH | DECREASE |
|  | LOW | INCREASE |
| TEO | HIGH | DECREASE |
|  | LOW | INCREASE |
| Ga | HIGH | INCREASE |
|  | LOW | DECREASE |
| Tin | HIGH | INCREASE |
|  | LOW | DECREASE |
| RHin | HIGH | INCREASE |
|  | LOW | DECREASE |

VEHICLE AIR CONDITIONER

CROSS-REFERENCE TO RELATED APPLICATIONS

This application is a U.S. National Stage Patent Application under 37 U.S.C. § 371 of International Patent Application No. PCT/JP2015/001595, filed on Mar. 20, 2015, which claims the benefit of Japanese Patent Application Nos. JP 2014-086387 and JP 2014-086388, filed on Apr. 18, 2014, the disclosures of each of which are incorporated herein by reference in their entirety.

TECHNICAL FIELD

The present invention relates to a vehicle air conditioner of a heat pump system which conditions air in a vehicle interior, and more particularly, it relates to a vehicle air conditioner which is applicable to a hybrid car or an electric car.

BACKGROUND ART

Due to actualization of environmental problems in recent years, hybrid cars and electric cars have spread. Further, as an air conditioner which is applicable to such a vehicle, there has been developed an air conditioner which includes an electric compressor to compress and discharge a refrigerant, a radiator disposed in a vehicle interior to let the refrigerant radiate heat, a heat absorber disposed in the vehicle interior to let the refrigerant absorb heat, an outdoor heat exchanger disposed outside the vehicle interior to let the refrigerant radiate or absorb heat, and an expansion valve to decompress the refrigerant flowing into the outdoor heat exchanger, and in the air conditioner, there are changeable a heating mode to let the refrigerant discharged from the compressor radiate heat in the radiator and let the refrigerant by which heat has been radiated in this radiator absorb heat in the outdoor heat exchanger, a dehumidifying and heating mode to let the refrigerant discharged from the compressor radiate heat in the radiator and let the refrigerant by which heat has been radiated in the radiator absorb heat in the heat absorber and the outdoor heat exchanger, a cooling mode to let the refrigerant discharged from the compressor radiate heat in the outdoor heat exchanger and absorb heat in the heat absorber, and a dehumidifying and cooling mode to let the refrigerant discharged from the compressor radiate heat in the radiator and the outdoor heat exchanger and absorb heat in the heat absorber (e.g., see Patent Document 1).

CITATION LIST

Patent Document

Patent Document 1: Japanese Patent Application Publication No. 2012-176660

SUMMARY OF THE INVENTION

Problems to be Solved by the Invention

However, depending on environmental conditions, it might be difficult to obtain consistency of a temperature of a radiator with a temperature of a heat absorber in the above dehumidifying and heating mode. Particularly, in an environment where an outdoor air temperature is from about +15° C. to +20° C., the temperature (a high pressure) of the radiator converges to satisfy a target value, but even when a valve position of an expansion valve which decompresses a refrigerant flowing into an outdoor heat exchanger is limited to the lowest limit, the temperature of the heat absorber might not lower to a target value.

To eliminate such a problem, it is also considered that there is prepared a mode called an internal cycle mode to obstruct inflow of a refrigerant into the outdoor heat exchanger, thereby letting the refrigerant absorb heat only in the heat absorber, and in a case where the temperature of the heat absorber does not lower in the dehumidifying and heating mode, the mode shifts to such an internal cycle mode. However, in this internal cycle mode, a compressor circulates the refrigerant between the radiator (heat radiation) and the heat absorber (heat absorption) which are present in an indoor side air flow passage, and hence there has been the defect that an amount of the refrigerant in a refrigerant circuit has to be appropriately managed.

Furthermore, depending on the environmental conditions, it might be difficult to obtain the consistency of the temperature of the radiator with the temperature of the heat absorber in the above dehumidifying and cooling mode. Particularly, in an environment where the outdoor air temperature is from about +20° C. to +25° C., the temperature of the heat absorber converges to satisfy a target value, but even when the valve position of the expansion valve which decompresses the refrigerant flowing into the outdoor heat exchanger is limited to the lowest limit, the temperature (the high pressure) of the radiator might not rise up to the target value.

To eliminate such a problem, it is also considered that there is prepared the mode called the internal cycle mode to obstruct the inflow of the refrigerant into the outdoor heat exchanger, thereby letting the refrigerant absorb heat only in the heat absorber, and in a case where the temperature of the radiator does not rise in the dehumidifying and cooling mode, the mode shifts to the internal cycle mode. However, in this internal cycle mode, the compressor circulates the refrigerant between the radiator (the heat radiation) and the heat absorber (the heat absorption) which are present in the indoor side air flow passage, and hence there has been the defect that the amount of the refrigerant in the refrigerant circuit has to be appropriately managed.

The present invention has been developed to solve such conventional technical problems, and an object thereof is to provide a vehicle air conditioner which is capable of enlarging an effective range of a dehumidifying and heating mode to environmental conditions and smoothly dehumidifying and heating a vehicle interior.

Another object of the present invention is to provide a vehicle air conditioner which is capable of enlarging an effective range of a dehumidifying and cooling mode to environmental conditions and smoothly dehumidifying and cooling a vehicle interior.

Means for Solving the Problems

A vehicle air conditioner of the present invention includes a compressor which compresses a refrigerant, an air flow passage through which air to be supplied to a vehicle interior flows, a radiator disposed in this air flow passage to let the refrigerant radiate heat, a heat absorber disposed in the air flow passage to let the refrigerant absorb heat, an outdoor heat exchanger disposed outside the vehicle interior to let the refrigerant absorb heat, an outdoor expansion valve which decompresses the refrigerant flowing into this outdoor heat exchanger, an outdoor blower which blows outdoor air through the outdoor heat exchanger, and control means, the vehicle air conditioner executes at least a dehumidifying and heating mode in which the control means lets the refrigerant discharged from the compressor radiate heat in the radiator, decompresses the refrigerant by which heat has been radiated and then lets the refrigerant absorb heat in the heat absorber and the outdoor heat exchanger, and the vehicle air conditioner is characterized in that the control means decreases an air volume of the outdoor blower in a case where a temperature of the heat absorber is high even when the control means adjusts a valve position of the outdoor expansion valve into a lower limit of controlling in a situation in which a temperature of the radiator is satisfactory.

The vehicle air conditioner of the invention of claim 2 is characterized in that in the above invention, the control means increases the air volume of the outdoor blower in a case where the temperature of the heat absorber is low even when the control means adjusts the valve position of the outdoor expansion valve into an upper limit of controlling in the situation in which the temperature of the radiator is satisfactory.

The vehicle air conditioner of the invention of claim 3 is characterized in that in the above respective inventions, the control means decreases the air volume of the outdoor blower in a case where the temperature of the radiator is high even when the control means adjusts a number of revolution of the compressor into a lower limit of controlling in a situation in which the temperature of the heat absorber is satisfactory.

The vehicle air conditioner of the invention of claim 4 is characterized in that in the above respective inventions, the control means increases the air volume of the outdoor blower in a case where the temperature of the radiator is low even when the control means adjusts the number of revolution of the compressor into an upper limit of controlling in the situation in which the temperature of the heat absorber is satisfactory.

The vehicle air conditioner of the invention of claim 5 is characterized in that in the above respective inventions, the control means decreases the air volume of the outdoor blower in a case where the temperature of the radiator is high and the temperature of the heat absorber is also high even when the control means adjusts the number of revolution of the compressor into the lower limit of controlling and adjusts the valve position of the outdoor expansion valve into the lower limit of controlling.

The vehicle air conditioner of the invention of claim 6 is characterized in that in the above respective inventions, the control means increases the air volume of the outdoor blower in a case where the temperature of the radiator is low and the temperature of the heat absorber is also low even when the control means adjusts the number of revolution of the compressor into the upper limit of controlling and adjusts the valve position of the outdoor expansion valve into the upper limit of controlling.

The vehicle air conditioner of the invention of claim 7 is characterized in that in the above respective inventions, the control means judges that the dehumidifying and heating mode is not established, and changes an operation mode to another mode without executing air volume decrease/increase control of the outdoor blower in a case where the temperature of the radiator is high and the temperature of the heat absorber is low even when the control means adjusts the number of revolution of the compressor into the lower limit of controlling and adjusts the valve position of the outdoor expansion valve into the upper limit of controlling, or in a case where the temperature of the radiator is low and the temperature of the heat absorber is high even when the control means adjusts the number of revolution of the compressor into the upper limit of controlling and adjusts the valve position of the outdoor expansion valve into the lower limit of controlling.

The vehicle air conditioner of the invention of claim 8 is characterized in that in the above respective inventions, the control means does not execute the air volume decrease/increase control of the outdoor blower or maximizes the air volume of the outdoor blower in a transitional stage of an operating state.

The vehicle air conditioner of the invention of claim 9 is characterized in that in the above invention, the control means determines the air volume of the outdoor blower in the transitional stage on the basis of one of an outdoor air temperature, a radiator target temperature, a heat absorber target temperature, a mass air volume of the air flowing into the air flow passage, a vehicle interior temperature, and a vehicle interior humidity, any combination of them, or all of them.

The vehicle air conditioner of the invention of claim 10 is characterized in that in the above respective inventions, the control means decreases the air volume of the outdoor blower or stops the outdoor blower in a case where a velocity is high.

The vehicle air conditioner of the invention of claim 11 includes a grill shutter which obstructs inflow of running air into the outdoor heat exchanger in addition to the above respective inventions, and the vehicle air conditioner is characterized in that the control means executes the air volume decrease/increase control of the outdoor blower in a state of closing the grill shutter or limiting the inflow of the running air in accordance with an opening of the grill shutter.

A vehicle air conditioner of the invention of claim 12 includes a compressor which compresses a refrigerant, an air flow passage through which air to be supplied to a vehicle interior flows, a radiator disposed in this air flow passage to let the refrigerant radiate heat, a heat absorber disposed in the air flow passage to let the refrigerant absorb heat, an outdoor heat exchanger disposed outside the vehicle interior to let the refrigerant radiate heat, an outdoor expansion valve which decompresses the refrigerant flowing into this outdoor heat exchanger, an outdoor blower which blows outdoor air through the outdoor heat exchanger, and control means, the vehicle air conditioner executes at least a dehumidifying and cooling mode in which the control means lets the refrigerant discharged from the compressor radiate heat in the radiator and the outdoor heat exchanger, decompresses the refrigerant by which heat has been radiated and then lets the refrigerant absorb heat in the heat absorber, and the vehicle air conditioner is characterized in that the control means decreases an air volume of the outdoor blower in a case where a temperature of the radiator is low even when the control means adjusts a valve position of the outdoor expansion valve into a lower limit of controlling in a situation in which a temperature of the heat absorber is satisfactory.

The vehicle air conditioner of the invention of claim 13 is characterized in that in the above invention, the control means increases the air volume of the outdoor blower in a case where the temperature of the radiator is high even when the control means adjusts the valve position of the outdoor expansion valve into an upper limit of controlling in the situation in which the temperature of the heat absorber is satisfactory.

The vehicle air conditioner of the invention of claim 14 is characterized in that in the invention of claim 12 or claim 13, the control means decreases the air volume of the outdoor blower in a case where the temperature of the heat absorber is low even when the control means adjusts a number of revolution of the compressor into a lower limit of controlling in a situation in which the temperature of the radiator is satisfactory.

The vehicle air conditioner of the invention of claim 15 is characterized in that in the respective inventions of claim 12 to claim 14, the control means increases the air volume of the outdoor blower in a case where the temperature of the heat absorber is high even when the control means adjusts the number of revolution of the compressor into an upper limit of controlling in the situation in which the temperature of the radiator is satisfactory.

The vehicle air conditioner of the invention of claim 16 is characterized in that in the respective inventions of claim 12 to claim 15, the control means decreases the air volume of the outdoor blower in a case where the temperature of the heat absorber is low and the temperature of the radiator is also low even when the control means adjusts the number of revolution of the compressor into the lower limit of controlling and adjusts the valve position of the outdoor expansion valve into the lower limit of controlling.

The vehicle air conditioner of the invention of claim 17 is characterized in that in the respective inventions of claim 12 to claim 16, the control means increases the air volume of the outdoor blower in a case where the temperature of the heat absorber is high and the temperature of the radiator is also high even when the control means adjusts the number of revolution of the compressor into the upper limit of controlling and adjusts the valve position of the outdoor expansion valve into the upper limit of controlling.

The vehicle air conditioner of the invention of claim 18 is characterized in that in the above respective inventions of claim 12 to claim 17, the control means judges that the dehumidifying and cooling mode is not established, and changes an operation mode to another mode without executing air volume decrease/increase control of the outdoor blower, in a case where the temperature of the heat absorber is low and the temperature of the radiator is high even when the control means adjusts the number of revolution of the compressor into the lower limit of controlling and adjusts the valve position of the outdoor expansion valve into the upper limit of controlling, or in a case where the temperature of the heat absorber is high and the temperature of the radiator is low even when the control means adjusts the number of revolution of the compressor into the upper limit of controlling and adjusts the valve position of the outdoor expansion valve into the lower limit of controlling.

The vehicle air conditioner of the invention of claim 19 is characterized in that in the respective inventions of claim 12 to claim 18, the control means does not execute the air volume decrease/increase control of the outdoor blower or maximizes the air volume of the outdoor blower in a transitional stage of an operating state.

The vehicle air conditioner of the invention of claim 20 is characterized in that in the above invention, the control means determines the air volume of the outdoor blower in the transitional stage on the basis of one of an outdoor air temperature, a radiator target temperature, a heat absorber target temperature, a mass air volume of the air flowing into the air flow passage, a vehicle interior temperature, and a vehicle interior humidity, any combination of them, or all of them.

The vehicle air conditioner of the invention of claim 21 is characterized in that in the respective inventions of claim 12 to claim 20, the control means decreases the air volume of the outdoor blower or stops the outdoor blower in a case where a velocity is high.

The vehicle air conditioner of the invention of claim 22 includes a grill shutter which obstructs inflow of running air into the outdoor heat exchanger in addition to the respective inventions of claim 12 to claim 21, and the vehicle air conditioner is characterized in that the control means executes the air volume decrease/increase control of the outdoor blower in a state of closing the grill shutter or limiting the inflow of the running air in accordance with an opening of the grill shutter.

Advantageous Effect of the Invention

According to the present invention, a vehicle air conditioner includes a compressor which compresses a refrigerant, an air flow passage through which air to be supplied to a vehicle interior flows, a radiator disposed in this air flow passage to let the refrigerant radiate heat, a heat absorber disposed in the air flow passage to let the refrigerant absorb heat, an outdoor heat exchanger disposed outside the vehicle interior to let the refrigerant absorb heat, an outdoor expansion valve which decompresses the refrigerant flowing into this outdoor heat exchanger, an outdoor blower which blows outdoor air through the outdoor heat exchanger, and control means, and the vehicle air conditioner executes at least a dehumidifying and heating mode in which the control means lets the refrigerant discharged from the compressor radiate heat in the radiator, decompresses the refrigerant by which heat has been radiated and then lets the refrigerant absorb heat in the heat absorber and the outdoor heat exchanger. In the vehicle air conditioner, the control means decreases an air volume of the outdoor blower in a case where a temperature of the heat absorber is high even when the control means adjusts a valve position of the outdoor expansion valve into a lower limit of controlling in a situation in which a temperature of the radiator is satisfactory. Therefore, even in a case where the temperature of the radiator is in the satisfactory situation and the control means adjusts the valve position of the outdoor expansion valve into the lower limit of controlling, the control means decreases the air volume of the outdoor blower, when the temperature of the heat absorber heightens and it is not possible to control the temperature of the heat absorber with the outdoor expansion valve by environmental conditions.

When the air volume of the outdoor blower decreases, a quantity of heat to be absorbed in the outdoor heat exchanger decreases, and hence the temperature of the radiator lowers. At this time, a pressure (the high pressure) of the radiator also decreases, and hence a number of revolution of the compressor increases to maintain the pressure of the radiator, an amount of the refrigerant to circulate in the refrigerant circuit increases, an amount of the refrigerant to flow into the heat absorber also increases, and as a result, it is possible to lower the temperature of the heat absorber. Consequently, an effective range of the dehumidifying and heating mode to the environmental conditions enlarges, and in a broad range of the environmental conditions, it is possible to smoothly achieve dehumidifying and heating air conditioning of the vehicle interior by the dehumidifying and heating mode.

Furthermore, according to the invention of claim 2, in addition to the above invention, the control means increases the air volume of the outdoor blower in a case where the temperature of the heat absorber is low even when the control means adjusts the valve position of the outdoor expansion valve into an upper limit of controlling in the situation in which the temperature of the radiator is satisfactory. Therefore, even in the case where the temperature of the radiator is in the satisfactory situation and the control means adjusts the valve position of the outdoor expansion valve into the upper limit of controlling, the control means increases the air volume of the outdoor blower, when the temperature of the heat absorber lowers and it is not possible to control the temperature of the heat absorber with the outdoor expansion valve by environmental conditions.

When the air volume of the outdoor blower increases, the quantity of heat to be absorbed in the outdoor heat exchanger increases, and hence the temperature of the radiator rises. At this time, the pressure (the high pressure) of the radiator also increases, and hence the number of revolution of the compressor decreases to maintain the pressure of the radiator, the amount of the refrigerant to circulate in the refrigerant circuit decreases, the amount of the refrigerant to flow into the heat absorber also decreases, and as a result, it is possible to raise the temperature of the heat absorber. Consequently, the effective range of the dehumidifying and heating mode to the environmental conditions further enlarges more, and in a broader range of the environmental conditions, it is possible to smoothly achieve the dehumidifying and heating air conditioning of the vehicle interior by the dehumidifying and heating mode.

Furthermore, according to the invention of claim 3, in addition to the above respective inventions, the control means decreases the air volume of the outdoor blower in a case where the temperature of the radiator is high even when the control means adjusts the number of revolution of the compressor into a lower limit of controlling in a situation in which the temperature of the heat absorber is satisfactory. Therefore, even in the case where the temperature of the heat absorber is in the satisfactory situation and the control means adjusts the number of revolution of the compressor into the lower limit of controlling, the control means decreases the air volume of the outdoor blower, when the temperature of the radiator heightens and it is not possible to control the temperature of the radiator with the compressor by environmental conditions.

When the air volume of the outdoor blower decreases, the quantity of heat to be absorbed in the outdoor heat exchanger decreases, and hence the temperature of the radiator lowers. Consequently, the effective range of the dehumidifying and heating mode to the environmental conditions further enlarges, and in a broader range of the environmental conditions, it is possible to smoothly achieve the dehumidifying and heating air conditioning of the vehicle interior by the dehumidifying and heating mode.

Furthermore, according to the invention of claim 4, in addition to the above respective inventions, the control means increases the air volume of the outdoor blower in a case where the temperature of the radiator is low even when the control means adjusts the number of revolution of the compressor into an upper limit of controlling in the situation in which the temperature of the heat absorber is satisfactory. Therefore, even in the case where the temperature of the heat absorber is in the satisfactory situation and the control means adjusts the number of revolution of the compressor into the upper limit of controlling, the control means increases the air volume of the outdoor blower, when the temperature of the radiator lowers and it is not possible to control the temperature of the radiator with the compressor by environmental conditions.

When the air volume of the outdoor blower increases, the quantity of heat to be absorbed in the outdoor heat exchanger increases, and hence the temperature of the radiator rises. Consequently, the effective range of the dehumidifying and heating mode to the environmental conditions further enlarges, and in the broader range of the environmental conditions, it is possible to smoothly achieve the dehumidifying and heating air conditioning of the vehicle interior by the dehumidifying and heating mode.

Furthermore, according to the invention of claim 5, in addition to the above respective inventions, the control means decreases the air volume of the outdoor blower in a case where the temperature of the radiator is high and the temperature of the heat absorber is also high even when the control means adjusts the number of revolution of the compressor into the lower limit of controlling and adjusts the valve position of the outdoor expansion valve into the lower limit of controlling. Therefore, even in the case where the control means adjusts the number of revolution of the compressor into the lower limit of controlling and adjusts the valve position of the outdoor expansion valve into the lower limit of controlling, the control means decreases the air volume of the outdoor blower, when the temperature of the radiator is high, the temperature of the heat absorber also heightens and it is not possible to control the temperature of the radiator and the temperature of the heat absorber with the compressor and the outdoor expansion valve by environmental conditions.

When the air volume of the outdoor blower decreases, the quantity of heat to be absorbed in the outdoor heat exchanger decreases, and hence it is possible to first lower the temperature of the radiator. Furthermore, at this time, the pressure (the high pressure) of the radiator also lowers, and hence for the purpose of maintaining this pressure, the number of revolution of the compressor increases, the amount of the refrigerant to circulate in the refrigerant circuit increases, the amount of the refrigerant to flow into the heat absorber also increases, and as a result, it is also possible to lower the temperature of the heat absorber. Consequently, the effective range of the dehumidifying and heating mode to the environmental conditions further enlarges, and in the broader range of the environmental conditions, it is possible to smoothly achieve the dehumidifying and heating air conditioning of the vehicle interior by the dehumidifying and heating mode.

According to the invention of claim 6, in addition to the above respective inventions, the control means increases the air volume of the outdoor blower in a case where the temperature of the radiator is low and the temperature of the heat absorber is also low even when the control means adjusts the number of revolution of the compressor into the upper limit of controlling and adjusts the valve position of the outdoor expansion valve into the upper limit of controlling. Therefore, even in the case where the control means adjusts the number of revolution of the compressor into the upper limit of controlling and adjusts the valve position of the outdoor expansion valve into the upper limit of controlling, the control means increases the air volume of the outdoor blower, when the temperature of the radiator is low and the temperature of the heat absorber is also low and it is not possible to control the temperature of the radiator and the temperature of the heat absorber with the compressor and the outdoor expansion valve by environmental conditions.

When the air volume of the outdoor blower increases, the quantity of heat to be absorbed in the outdoor heat exchanger increases, and hence it is possible to first raise the temperature of the radiator. Furthermore, at this time, the pressure (the high pressure) of the radiator also rises, and hence for the purpose of maintaining this pressure, the number of revolution of the compressor decreases, the amount of the refrigerant to circulate in the refrigerant circuit decreases, the amount of the refrigerant to flow into the heat absorber also decreases, and as a result, it is also possible to raise the temperature of the heat absorber. Consequently, the effective range of the dehumidifying and heating mode to the environmental conditions further enlarges, and in the broader range of the environmental conditions, it is possible to smoothly achieve the dehumidifying and heating air conditioning of the vehicle interior by the dehumidifying and heating mode.

According to the invention of claim 7, in addition to the above respective inventions, the control means judges that the dehumidifying and heating mode is not established, and changes an operation mode to another mode without executing air volume decrease/increase control of the outdoor blower in a case where the temperature of the radiator is high and the temperature of the heat absorber is low even when the control means adjusts the number of revolution of the compressor into the lower limit of controlling and adjusts the valve position of the outdoor expansion valve into the upper limit of controlling or in a case where the temperature of the radiator is low and the temperature of the heat absorber is high even when the control means adjusts the number of revolution of the compressor into the upper limit of controlling and adjusts the valve position of the outdoor expansion valve into the lower limit of controlling. Therefore, in a situation in which the dehumidifying and heating mode cannot continue even when the control means executes the air volume decrease/increase control of the outdoor blower, the control means changes the operation mode to the other operation mode and can continue the air conditioning of the vehicle interior without hindrance.

In the above-mentioned invention, as in the invention of claim 8, the control means does not execute the air volume decrease/increase control of the outdoor blower or maximizes the air volume of the outdoor blower in a transitional stage of an operating state, so that in a transitional stage such as a startup initial stage or a stage immediately after the change to the dehumidifying and heating mode, it is possible to shift to a stable state in early stages by inhibiting the air volume decrease/increase control of the outdoor blower.

In this case, as in the invention of claim 9, the control means determines the air volume of the outdoor blower in the transitional stage on the basis of one of an outdoor air temperature, a radiator target temperature, a heat absorber target temperature, a mass air volume of the air flowing into the air flow passage, a vehicle interior temperature, and a vehicle interior humidity, any combination of them, or all of them, so that even in the transitional stage, it is possible to supply an appropriate volume of air to the outdoor heat exchanger in accordance with the environmental conditions.

Furthermore, as in the invention of claim 10, the control means decreases the air volume of the outdoor blower or stops the outdoor blower in a case where a velocity is high, so that it is possible to eliminate an unnecessary operation of the outdoor blower in a case where running air suffices.

Furthermore, in a case where the vehicle air conditioner includes a grill shutter which obstructs inflow of running air into the outdoor heat exchanger as in the invention of claim 11, the control means executes the air volume decrease/increase control of the outdoor blower in a state of closing the grill shutter or limiting the inflow of the running air in accordance with an opening of the grill shutter, so that it is possible to improve control properties of the radiator temperature and the heat absorber temperature by the outdoor blower during running.

According to the invention of claim 12, a vehicle air conditioner includes a compressor which compresses a refrigerant, an air flow passage through which air to be supplied to a vehicle interior flows, a radiator disposed in this air flow passage to let the refrigerant radiate heat, a heat absorber disposed in the air flow passage to let the refrigerant absorb heat, an outdoor heat exchanger disposed outside the vehicle interior to let the refrigerant radiate heat, an outdoor expansion valve which decompresses the refrigerant flowing into this outdoor heat exchanger, an outdoor blower which blows outdoor air through the outdoor heat exchanger, and control means, the vehicle air conditioner executes at least a dehumidifying and cooling mode in which the control means lets the refrigerant discharged from the compressor radiate heat in the radiator and the outdoor heat exchanger, decompresses the refrigerant by which heat has been radiated and then lets the refrigerant absorb heat in the heat absorber, and the vehicle air conditioner is characterized in that the control means decreases an air volume of the outdoor blower in a case where a temperature of the radiator is low even when the control means adjusts a valve position of the outdoor expansion valve into a lower limit of controlling in a situation in which a temperature of the heat absorber is satisfactory. Therefore, even in the case where the temperature of the heat absorber is in the satisfactory situation and the control means adjusts the valve position of the outdoor expansion valve into the lower limit of controlling, the control means decreases the air volume of the outdoor blower, when the temperature of the radiator lowers and it is not possible to control the temperature of the radiator with the outdoor expansion valve by environmental conditions.

When the air volume of the outdoor blower decreases, a quantity of heat to be radiated in the outdoor heat exchanger decreases, and hence the pressure (the high pressure) of the radiator increases and the temperature of the radiator also rises. Consequently, the effective range of the dehumidifying and cooling mode to the environmental conditions enlarges, and in a broad range of the environmental conditions, it is possible to smoothly achieve the dehumidifying and cooling air conditioning of the vehicle interior by the dehumidifying and cooling mode.

Furthermore, according to the invention of claim 13, in addition to the above invention, the control means increases the air volume of the outdoor blower in a case where the temperature of the radiator is high even when the control means adjusts the valve position of the outdoor expansion valve into an upper limit of controlling in the situation in which the temperature of the heat absorber is satisfactory. Therefore, even in the case where the temperature of the heat absorber is in the satisfactory situation and the control means adjusts the valve position of the outdoor expansion valve into the upper limit of controlling, the control means increases the air volume of the outdoor blower, when the temperature of the radiator heightens and it is not possible to control the temperature of the radiator with the outdoor expansion valve by environmental conditions.

When the air volume of the outdoor blower increases, the quantity of heat to be radiated in the outdoor heat exchanger increases, and hence the pressure (the high pressure) of the radiator decreases and the temperature of the radiator also lowers. Consequently, the effective range of the dehumidifying and cooling mode to the environmental conditions further enlarges more, and in a further broad range of the environmental conditions, it is possible to smoothly achieve the dehumidifying and cooling air conditioning of the vehicle interior by the dehumidifying and cooling mode.

Furthermore, according to the invention of claim 14, in addition to the invention of claim 12 or claim 13, the control means decreases the air volume of the outdoor blower in a case where the temperature of the heat absorber is low even when the control means adjusts a number of revolution of the compressor into a lower limit of controlling in a situation in which the temperature of the radiator is satisfactory. Therefore, even in the case where the temperature of the radiator is in the satisfactory situation and the control means adjusts the number of revolution of the compressor into the lower limit of controlling, the control means decreases the air volume of the outdoor blower, when the temperature of the heat absorber lowers and it is not possible to control the temperature of the heat absorber with the compressor by environmental conditions.

When the air volume of the outdoor blower decreases, the quantity of heat to be radiated in the outdoor heat exchanger decreases, and hence the temperature of the heat absorber rises. Consequently, the effective range of the dehumidifying and cooling mode to the environmental conditions further enlarges, and in the broader range of the environmental conditions, it is possible to smoothly achieve the dehumidifying and cooling air conditioning of the vehicle interior by the dehumidifying and cooling mode.

Furthermore, according to the invention of claim 15, in addition to the respective inventions of claim 12 to claim 14, the control means increases the air volume of the outdoor blower in a case where the temperature of the heat absorber is high even when the control means adjusts the number of revolution of the compressor into an upper limit of controlling in the situation in which the temperature of the radiator is satisfactory. Therefore, even in the case where the temperature of the radiator is in the satisfactory situation and the control means adjusts the number of revolution of the compressor into the upper limit of controlling, the control means increases the air volume of the outdoor blower, when the temperature of the heat absorber heightens and it is not possible to control the temperature of the heat absorber with the compressor by environmental conditions.

When the air volume of the outdoor blower increases, the quantity of heat to be radiated in the outdoor heat exchanger increases, and hence the temperature of the heat absorber lowers. Consequently, the effective range of the dehumidifying and cooling mode to the environmental conditions further enlarges, and in the broader range of the environmental conditions, it is possible to smoothly achieve the dehumidifying and cooling air conditioning of the vehicle interior by the dehumidifying and cooling mode.

Furthermore, according to the invention of claim 16, in addition to the respective inventions of claim 12 to claim 15, the control means decreases the air volume of the outdoor blower in a case where the temperature of the heat absorber is low and the temperature of the radiator is also low even when the control means adjusts the number of revolution of the compressor into the lower limit of controlling and adjusts the valve position of the outdoor expansion valve into the lower limit of controlling. Therefore, even in the case where the control means adjusts the number of revolution of the compressor into the lower limit of controlling and adjusts the valve position of the outdoor expansion valve into the lower limit of controlling, the control means decreases the air volume of the outdoor blower, when the temperature of the heat absorber is low and the temperature of the radiator also lowers and it is not possible to control the temperature of the heat absorber and the temperature of the radiator with the compressor and the outdoor expansion valve by environmental conditions.

When the air volume of the outdoor blower decreases, the quantity of heat to be radiated in the outdoor heat exchanger decreases, and hence the temperature of the radiator rises and the temperature of the heat absorber also rises. Consequently, the effective range of the dehumidifying and cooling mode to the environmental conditions further enlarges, and in the broader range of the environmental conditions, it is possible to smoothly achieve the dehumidifying and cooling air conditioning of the vehicle interior by the dehumidifying and cooling mode.

According to the invention of claim 17, in addition to the respective inventions of claim 12 to claim 16, the control means increases the air volume of the outdoor blower in a case where the temperature of the heat absorber is high and the temperature of the radiator is also high even when the control means adjusts the number of revolution of the compressor into the upper limit of controlling and adjusts the valve position of the outdoor expansion valve into the upper limit of controlling. Therefore, even in the case where the control means adjusts the number of revolution of the compressor into the upper limit of controlling and adjusts the valve position of the outdoor expansion valve into the upper limit of controlling, the control means increases the air volume of the outdoor blower, when the temperature of the heat absorber is high and the temperature of the radiator also heightens and it is not possible to control the temperature of the heat absorber and the temperature of the radiator with the compressor and the outdoor expansion valve by environmental conditions.

When the air volume of the outdoor blower increases, the quantity of heat to be radiated in the outdoor heat exchanger increases, and hence the temperature of the heat absorber lowers and the temperature of the radiator also lowers. Consequently, the effective range of the dehumidifying and cooling mode to the environmental conditions further enlarges, and in the broader range of the environmental conditions, it is possible to smoothly achieve the dehumidifying and cooling air conditioning of the vehicle interior by the dehumidifying and cooling mode.

According to the invention of claim 18, in addition to the respective inventions of claim 12 to claim 17, the control means judges that the dehumidifying and cooling mode is not established and changes an operation mode to another mode without executing air volume decrease/increase control of the outdoor blower, in a case where the temperature of the heat absorber is low and the temperature of the radiator is high even when the control means adjusts the number of revolution of the compressor into the lower limit of controlling and adjusts the valve position of the outdoor expansion valve into the upper limit of controlling, or in a case where the temperature of the heat absorber is high and the temperature of the radiator is low even when the control means adjusts the number of revolution of the compressor into the upper limit of controlling and adjusts the valve position of the outdoor expansion valve into the lower limit of controlling. Therefore, in a situation in which the dehumidifying and cooling mode cannot continue even when the control means executes the air volume decrease/increase control of the outdoor blower, the control means changes to the other operation mode and can continue the air conditioning of the vehicle interior without hindrance.

In the inventions of claim 12 to claim 18, the control means does not execute the air volume decrease/increase control of the outdoor blower or maximizes the air volume of the outdoor blower in a transitional stage of an operating state as in the invention of claim 19, so that in a transitional stage such as a startup initial stage or a stage immediately after the change to the dehumidifying and cooling mode, it is possible to shift to a stable state in early stages by inhibiting the air volume decrease/increase control of the outdoor blower.

In this case, as in the invention of claim 20, the control means determines the air volume of the outdoor blower in the transitional stage on the basis of one of an outdoor air temperature, a radiator target temperature, a heat absorber target temperature, a mass air volume of the air flowing into the air flow passage, a vehicle interior temperature, and a vehicle interior humidity, any combination of them, or all of them, so that even in the transitional stage, it is possible to supply an appropriate volume of air to the outdoor heat exchanger in accordance with the environmental conditions.

Furthermore, as in the invention of claim 21, the control means decreases the air volume of the outdoor blower or stops the outdoor blower in a case where a velocity is high, so that it is possible to eliminate an unnecessary operation of the outdoor blower in a case where running air suffices.

Furthermore, in a case where the vehicle air conditioner includes a grill shutter which obstructs inflow of the running air into the outdoor heat exchanger as in the invention of claim 22, the control means executes the air volume decrease/increase control of the outdoor blower in a state of closing the grill shutter or limiting the inflow of the running air in accordance with an opening of the grill shutter, so that it is possible to improve control properties of the heat absorber temperature and the radiator temperature by the outdoor blower during running.

BRIEF DESCRIPTION OF THE DRAWINGS

FIG. 6 is a diagram explaining a judgment table of a dehumidifying and heating state of FIG. 5;

FIG. 13 is a diagram explaining the outdoor blower control of a transitional stage in the dehumidifying and heating mode of the controller of FIG. 2;

FIG. 17 is a diagram explaining a judgment table of a dehumidifying and cooling state of FIG. 16;

FIG. 24 is a diagram explaining the outdoor blower control of a transitional stage in the dehumidifying and cooling mode of the controller of FIG. 2.

MODE FOR CARRYING OUT THE INVENTION

Hereinafter, embodiments of the present invention will be described in detail with reference to the drawings.

Figure 1:
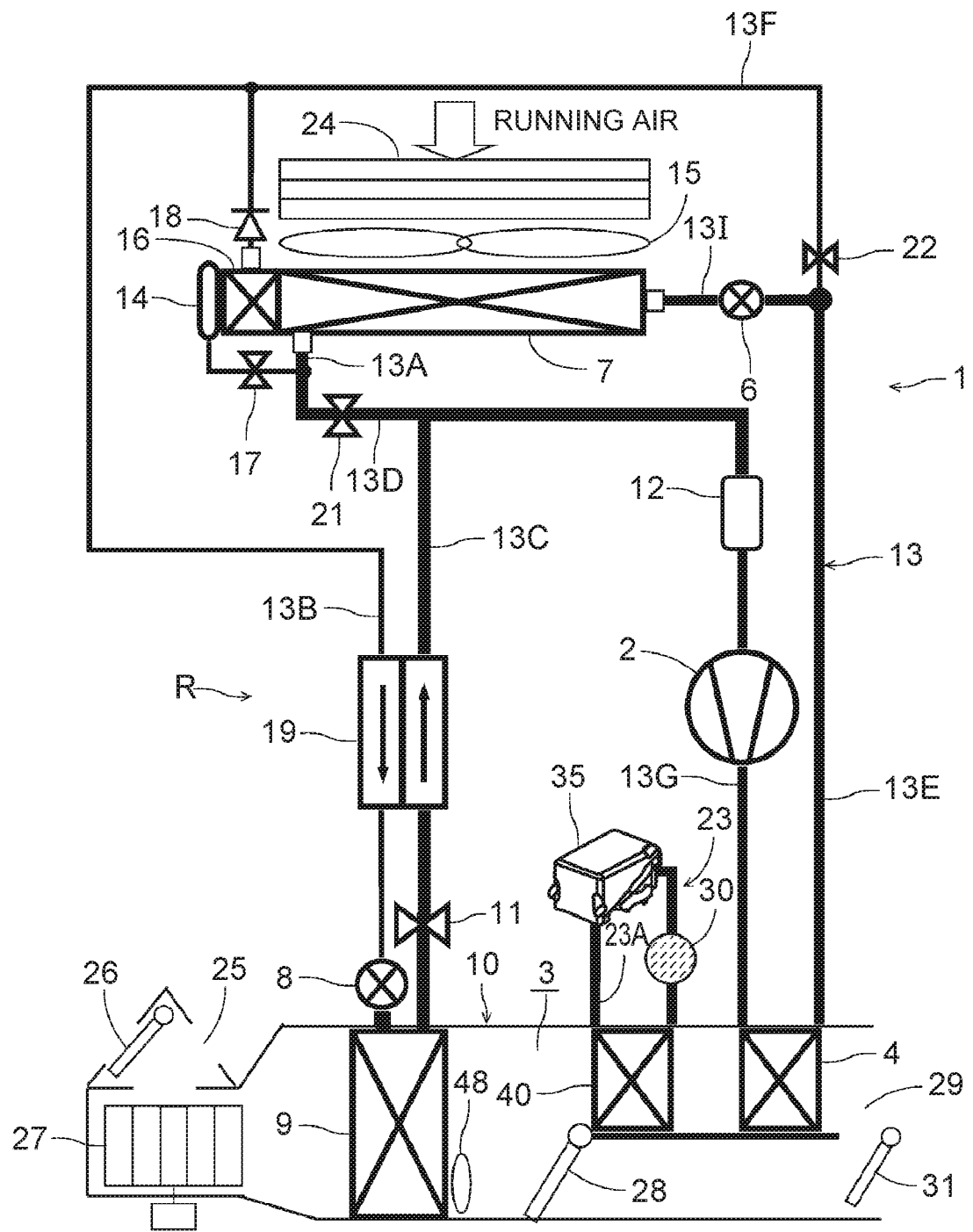
FIG. 1 is a constitutional view of a vehicle air conditioner of one embodiment to which the present invention is applied.

FIG. 1 shows a constitutional view of one embodiment of a vehicle air conditioner 1 of the present invention. In this case, a vehicle of the embodiment to which the present invention is applied is an electric car (EV) which does not have an engine (an internal combustion engine) and which runs by driving an electric motor for running with power charged in a battery (which is not shown in the drawing), and the vehicle air conditioner 1 of the present invention is also driven with the power of the battery.

That is, the vehicle air conditioner 1 of the embodiment performs heating by a heat pump operation using a refrigerant circuit in an electric car in which it is not possible to perform heating by engine waste heat, and further, the vehicle air conditioner selectively executes respective operation modes of dehumidifying and heating, dehumidifying and cooling, cooling, and the like. It is to be noted that the vehicle is not limited to the electric car, and the present invention is also effective for a so-called hybrid car using the engine together with the electric motor for running. Furthermore, the present invention is also applicable to a usual car which runs with the engine.

The vehicle air conditioner 1 of the embodiment performs air conditioning (heating, cooling, dehumidifying, and ventilation) of a vehicle interior of the electric car, and there are successively connected, by a refrigerant pipe 13, an electric type of compressor 2 which compresses a refrigerant to raise a pressure, a radiator 4 disposed in an air flow passage 3 of an HVAC unit 10 in which vehicle interior air passes and circulates, to let the high-temperature high-pressure refrigerant discharged from the compressor 2 radiate heat in the vehicle interior, an outdoor expansion valve (ECCV) 6 constituted of an electronic expansion valve which decompresses and expands the refrigerant during the heating, an outdoor heat exchanger 7 which performs heat exchange between the refrigerant and outdoor air to function as the radiator which lets the refrigerant radiate heat during the cooling and to function as an evaporator which lets the refrigerant absorb heat during the heating, an indoor expansion valve 8 constituted of an electronic expansion valve which decompresses and expands the refrigerant, a heat absorber 9 disposed in the air flow passage 3 to let the refrigerant absorb heat from interior and exterior of the vehicle during the cooling and during the dehumidifying, an evaporation capability control valve 11 which adjusts an evaporation capability in the heat absorber 9, an accumulator 12 and the like, thereby constituting a refrigerant circuit R.

It is to be noted that in the outdoor heat exchanger 7, an outdoor blower 15 is disposed to pass the outdoor air during vehicle stop or the like through the outdoor heat exchanger 7, thereby performing the heat exchange between the outdoor air and the refrigerant. Furthermore, reference numeral 24 in the drawing is a grill shutter. When closing the grill shutter 24, inflow of running air into the outdoor heat exchanger 7 is obstructed.

Furthermore, the outdoor heat exchanger 7 has a receiver tank portion 14 and a subcooling portion 16 successively on a refrigerant downstream side, a refrigerant pipe 13A extending out from the outdoor heat exchanger 7 is connected to the receiver tank portion 14 via a solenoid valve (an opening/closing valve) 17 opened during the cooling, and an outlet of the subcooling portion 16 is connected to the indoor expansion valve 8 via a check valve 18. It is to be noted that the receiver tank portion 14 and the subcooling portion 16 structurally constitute a part of the outdoor heat exchanger 7, and an indoor expansion valve 8 side of the check valve 18 is a forward direction.

Furthermore, a refrigerant pipe 13B between the check valve 18 and the indoor expansion valve 8 is disposed in a heat exchange relation with a refrigerant pipe 13C extending out from the evaporation capability control valve 11 positioned on an outlet side of the heat absorber 9, and both the pipes constitute an internal heat exchanger 19. In consequence, the refrigerant flowing through the refrigerant pipe 13B into the indoor expansion valve 8 is cooled (subcooled) by the low-temperature refrigerant flowing out from the heat absorber 9 through the evaporation capability control valve 11.

Furthermore, the refrigerant pipe 13A extending out from the outdoor heat exchanger 7 branches, and this branching refrigerant pipe 13D communicates and connects with the refrigerant pipe 13C on the downstream side of the internal heat exchanger 19 via a solenoid valve (an opening/closing valve) 21 to be opened during the heating. Furthermore, a refrigerant pipe 13E on an outlet side of the radiator 4 branches before the outdoor expansion valve 6, and this branching refrigerant pipe 13F communicates and connects with the refrigerant pipe 13B on the downstream side of the check valve 18 via a solenoid valve (an opening/closing valve) 22 to be opened during the dehumidifying.

Furthermore, in the air flow passage 3 on an air upstream side of the heat absorber 9, respective suction ports such as an indoor air suction port and an outdoor air suction port are formed (represented by a suction port 25 in FIG. 1), and in the suction port 25, a suction changing damper 26 is disposed to change the air to be introduced into the air flow passage 3 to indoor air which is air in the vehicle interior (an indoor air circulating mode) and outdoor air which is air outside the vehicle interior (an outdoor air introducing mode). Furthermore, on an air downstream side of the suction changing damper 26, an indoor blower (a blower fan) 27 is disposed to supply the introduced indoor air or outdoor air to the air flow passage 3.

Furthermore, in FIG. 1, reference numeral 23 indicates a heating medium circulating circuit as auxiliary heating means disposed in the vehicle air conditioner 1 of the embodiment. The heating medium circulating circuit 23 includes a circulating pump 30 constituting circulating means, a heating medium heating electric heater 35, and a heating medium-air heat exchanger 40 disposed in the air flow passage 3 on an air upstream side of the radiator 4 to the flow of the air of the air flow passage 3, and these components are successively annularly connected to one another by a heating medium pipe 23A. It is to be noted that as the heating medium to circulate in the heating medium circulating circuit 23, for example, water, a refrigerant such as HFO-1234yf, a coolant or the like is employed.

Further, when the circulating pump 30 is operated and the heating medium heating electric heater 35 is energized to generate heat, the heating medium heated by the heating medium heating electric heater 35 circulates through the heating medium-air heat exchanger 40. That is, the heating medium-air heat exchanger 40 of the heating medium circulating circuit 23 becomes a so-called heater core, and complements the heating of the vehicle interior. The employing of the heating medium circulating circuit 23 improves electric safety of a passenger.

Furthermore, in the air flow passage 3 on the air upstream side of the heating medium-air heat exchanger 40 and the radiator 4, an air mix damper 28 is disposed to adjust a degree of flow of the indoor air or the outdoor air through the radiator 4. Furthermore, in the air flow passage 3 on an air downstream side of the radiator 4, there is formed each outlet (represented by an outlet 29 in FIG. 1) of foot, vent or defroster, and in the outlet 29, an outlet changing damper 31 is disposed to perform changing control of blowing of the air from each outlet mentioned above.

Figure 2:
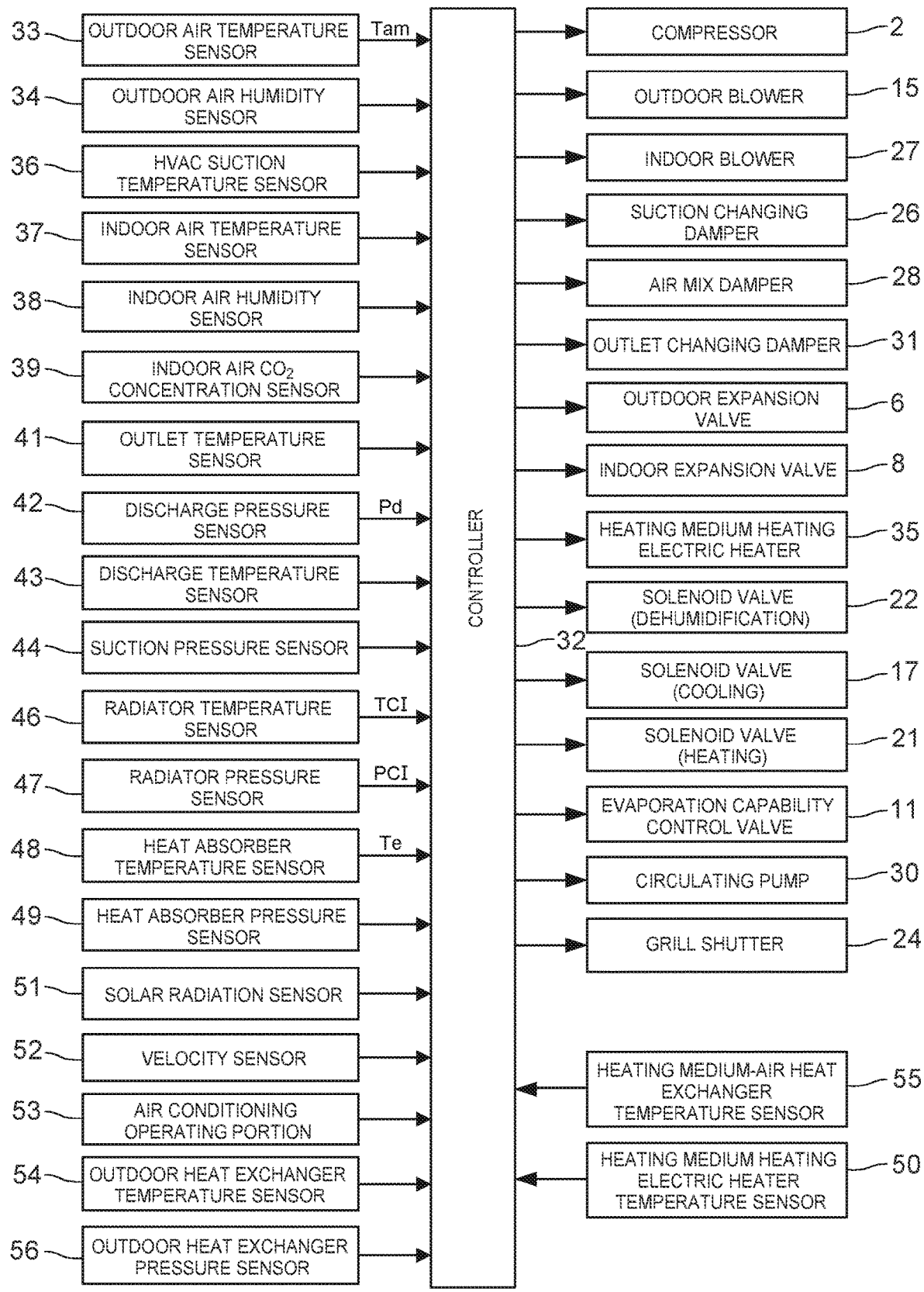
FIG. 2 is a block diagram of an electric circuit of a controller of the vehicle air conditioner of FIG. 1.

Next, in FIG. 2, 32 is a controller (ECU) as control means constituted of a microcomputer, and an input of the controller 32 is connected to respective outputs of an outdoor air temperature sensor 33 which detects an outdoor air temperature of the vehicle, an outdoor air humidity sensor 34 which detects an outdoor air humidity of the vehicle, an HVAC suction temperature sensor 36 which detects a temperature of the air to be sucked from the suction port 25 to the air flow passage 3, an indoor air temperature sensor 37 which detects a temperature of the air of the vehicle interior (the indoor air), an indoor air humidity sensor 38 which detects a humidity of the air of the vehicle interior, an indoor air $CO_2$ concentration sensor 39 which detects a carbon dioxide concentration of the vehicle interior, an outlet temperature sensor 41 which detects a temperature of the air blown out from the outlet 29 to the vehicle interior, a discharge pressure sensor 42 which detects a pressure of the refrigerant discharged from the compressor 2, a discharge temperature sensor 43 which detects a temperature of the refrigerant discharged from the compressor 2, a suction pressure sensor 44 which detects a suction refrigerant pressure of the compressor 2, a radiator temperature sensor 46 which detects a temperature of the radiator 4 (the temperature of the radiator 4 itself or the temperature of the air heated in the radiator 4), a radiator pressure sensor 47 which detects a refrigerant pressure of the radiator 4 (the pressure in the radiator 4 or the pressure of the refrigerant flowing out from the radiator 4), a heat absorber temperature sensor 48 which detects a temperature of the heat absorber 9 (the temperature of the heat absorber 9 itself or the temperature of the air cooled in the heat absorber 9), a heat absorber pressure sensor 49 which detects a refrigerant pressure of the heat absorber 9 (the pressure in the heat absorber 9 or the pressure of the refrigerant flowing out from the heat absorber 9), a solar radiation sensor 51 of, e.g., a photo sensor system to detect a solar radiation amount into the vehicle, a velocity sensor 52 to detect a moving speed of the vehicle (a velocity), an air conditioning operating portion 53 to set the changing of the temperature or the operation mode, an outdoor heat exchanger temperature sensor 54 which detects a temperature of the outdoor heat exchanger 7, and an outdoor heat exchanger pressure sensor 56 which detects the refrigerant pressure of the outdoor heat exchanger 7.

Furthermore, the input of the controller 32 is further connected to respective outputs of a heating medium heating electric heater temperature sensor 50 which detects a temperature of the heating medium heating electric heater 35 of the heating medium circulating circuit 23, and a heating medium-air heat exchanger temperature sensor 55 which detects a temperature of the heating medium-air heat exchanger 40.

On the other hand, an output of the controller 32 is connected to the compressor 2, the outdoor blower 15, the indoor blower (the blower fan) 27, the suction changing damper 26, the air mix damper 28, the outlet changing damper 31, the outdoor expansion valve 6, the indoor expansion valve 8, the respective solenoid valves 22, 17 and 21, the circulating pump 30, the heating medium heating electric heater 35, the evaporation capability control valve 11, and the grill shutter 24. Further, the controller 32 controls these components on the basis of the outputs of the respective sensors and the setting input by the air conditioning operating portion 53.

Next, an operation of the vehicle air conditioner 1 of the embodiment having the above-mentioned constitution will be described. The controller 32 changes and executes respective roughly divided operation modes such as a heating mode, a dehumidifying and heating mode, a dehumidifying and cooling mode, and a cooling mode. First, flow of the refrigerant in each operation mode will be described.

(1) Heating Mode

When the heating mode is selected by the controller 32 or a manual operation to the air conditioning operating portion 53, the controller 32 opens the solenoid valve 21 and closes the solenoid valve 17 and the solenoid valve 22. Further, the controller operates the compressor 2 and the respective blowers 15 and 27, and the air mix damper 28 has a state of passing the air blown out from the indoor blower 27 through the heating medium-air heat exchanger 40 and the radiator 4. In consequence, a high-temperature high-pressure gas refrigerant discharged from the compressor 2 flows into the radiator 4. The air in the air flow passage 3 passes through the radiator 4, and hence the air in the air flow passage 3 is heated by the heating medium-air heat exchanger 40 (in a case where the heating medium circulating circuit 23 is operating) and is then heated by the high-temperature refrigerant in the radiator 4. On the other hand, the refrigerant in the radiator 4 has the heat taken by the air and is cooled to condense and liquefy.

The refrigerant liquefied in the radiator 4 flows through the refrigerant pipe 13E to reach the outdoor expansion valve 6, is decompressed therein and then flows into the outdoor heat exchanger 7. The refrigerant flowing into the outdoor heat exchanger 7 evaporates, and the heat is pumped up from the outdoor air passed by running or the outdoor blower 15 (a heat pump). Further, the low-temperature refrigerant flowing out from the outdoor heat exchanger 7 flows through the refrigerant pipe 13D and the solenoid valve 21 to flow from the refrigerant pipe 13C into the accumulator 12 to perform gas liquid separation, and then the gas refrigerant is sucked into the compressor 2, thereby repeating this circulation. The air heated in the heating medium-air heat exchanger 40 and the radiator 4 is blown out from the outlet 29, thereby performing the heating of the vehicle interior.

The controller 32 controls a number of revolution of the compressor 2 on the basis of a refrigerant pressure of the radiator 4 which is detected by the radiator pressure sensor 47, i.e., a radiator pressure PCI (the high pressure of the refrigerant circuit R), also controls a valve position of the outdoor expansion valve 6 on the basis of a temperature of the radiator 4 (a radiator temperature TCI) which is detected by the radiator temperature sensor 46, and controls a subcool degree SC of the refrigerant in the outlet of the radiator 4.

(2) Dehumidifying and Heating Mode

Next, in the dehumidifying and heating mode, the controller 32 opens the solenoid valve 22 in the above state of the heating mode. In consequence, a part of the condensed refrigerant flowing through the radiator 4 and the refrigerant pipe 13E is distributed, and flows through the solenoid valve 22 to flow from the refrigerant pipes 13F and 13B through the internal heat exchanger 19, thereby reaching the indoor expansion valve 8. The refrigerant is decompressed in the indoor expansion valve 8 and then flows into the heat absorber 9 to evaporate. Water in the air blown out from the indoor blower 27 coagulates to adhere to the heat absorber 9 by a heat absorbing operation at this time, and hence the air is cooled and dehumidified.

The refrigerant evaporated in the heat absorber 9 flows through the evaporation capability control valve 11 and the internal heat exchanger 19 to join the refrigerant from the refrigerant pipe 13D in the refrigerant pipe 13C, and then flows through the accumulator 12 to be sucked into the compressor 2, thereby repeating this circulation. The air dehumidified in the heat absorber 9 is reheated in a process of passing the radiator 4, thereby performing the dehumidifying and heating of the vehicle interior.

The controller 32 controls the number of revolution of the compressor 2 on the basis of the radiator pressure PCI (the high pressure of the refrigerant circuit R) which is detected by the radiator pressure sensor 47, and also controls the valve position of the outdoor expansion valve 6 on the basis of the temperature of the heat absorber 9 (a heat absorber temperature Te) which is detected by the heat absorber temperature sensor 48.

Figure 3:
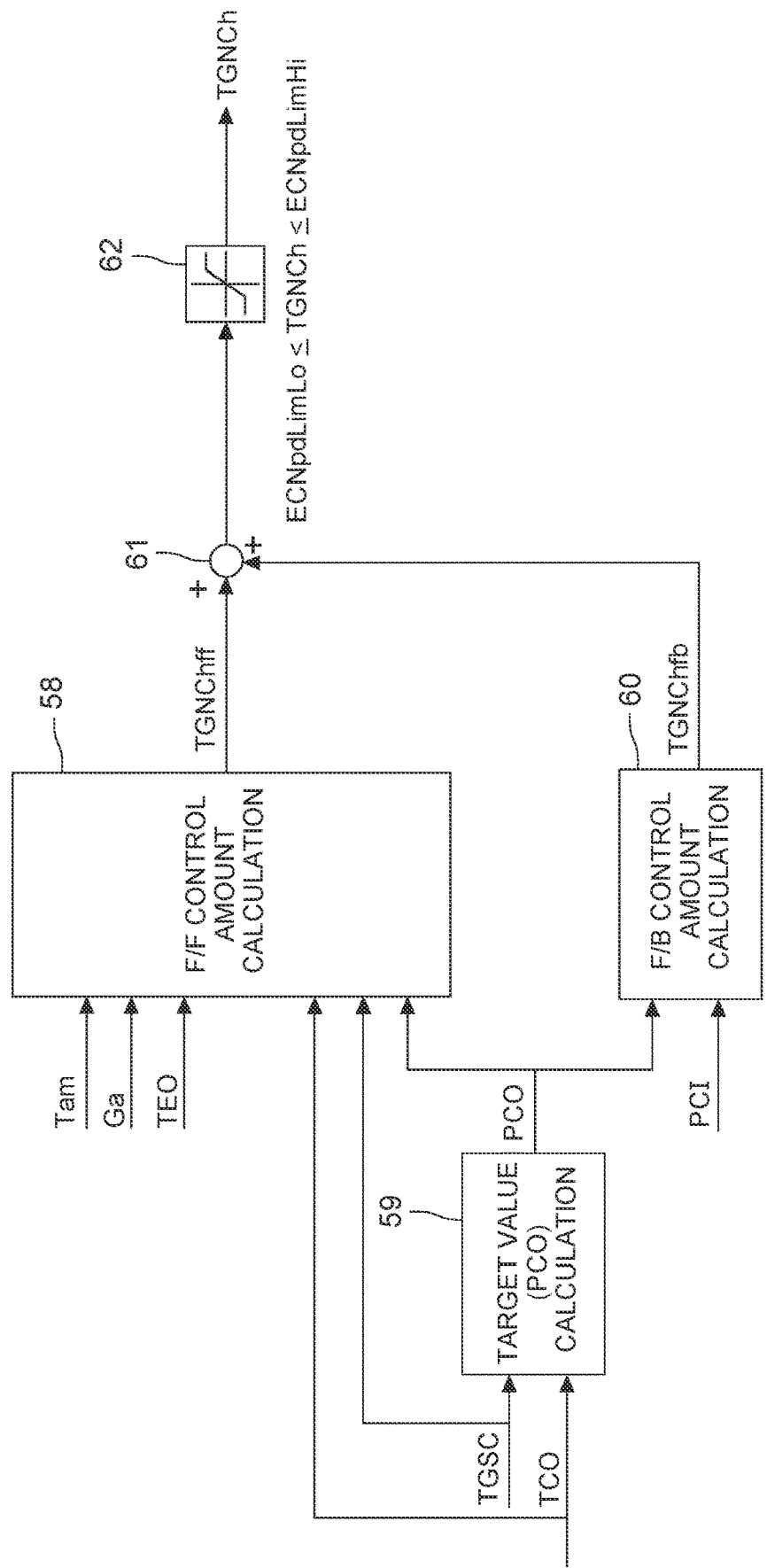
FIG. 3 is a control block diagram concerning compressor control in a dehumidifying and heating mode of the controller of FIG. 2.

FIG. 3 is a control block diagram of the controller 32 which determines a target number of revolution (a compressor target number of revolution) TGNCh of the compressor 2 in a dehumidifying and heating mode (similarly in the above heating mode). An F/F (feedforward) control amount calculation section 58 of the controller 32 calculates an F/F control amount TGNChff of the compressor target number of revolution on the basis of an outdoor air temperature Tam obtainable from the outdoor air temperature sensor 33, a heat absorber target temperature TEO that is a target value of the temperature of the heat absorber 9, a mass air volume Ga of the air flowing into the air flow passage 3, a target subcool degree TGSC that is a target value of the subcool degree SC in the outlet of the radiator 4, a radiator target temperature TCO that is a target value of the temperature of the radiator 4, and a target radiator pressure PCO that is a target value of the pressure of the radiator 4.

A target value calculation section 59 calculates the target radiator pressure PCO on the basis of the target subcool degree TGSC and the radiator target temperature TCO. Furthermore, an F/B (feedback) control amount calculation section 60 calculates an F/B control amount TGNChfb of the compressor target number of revolution on the basis of the target radiator pressure PCO and the radiator pressure PCI that is a refrigerant pressure of the radiator 4. Further, the F/F control amount TGNChff calculated by the F/F control amount calculation section 58 and the control amount TGNChfb calculated by the F/B control amount calculation section 60 are added by an adder 61, a limit setting section 62 attaches limits of an upper limit of controlling and a lower limit of controlling, and then the compressor target number of revolution TGNCh is determined. In the dehumidifying and heating mode (similarly in the above heating mode), the controller 32 controls the number of revolution of the compressor 2 on the basis of the compressor target number of revolution TGNCh.

Figure 4:
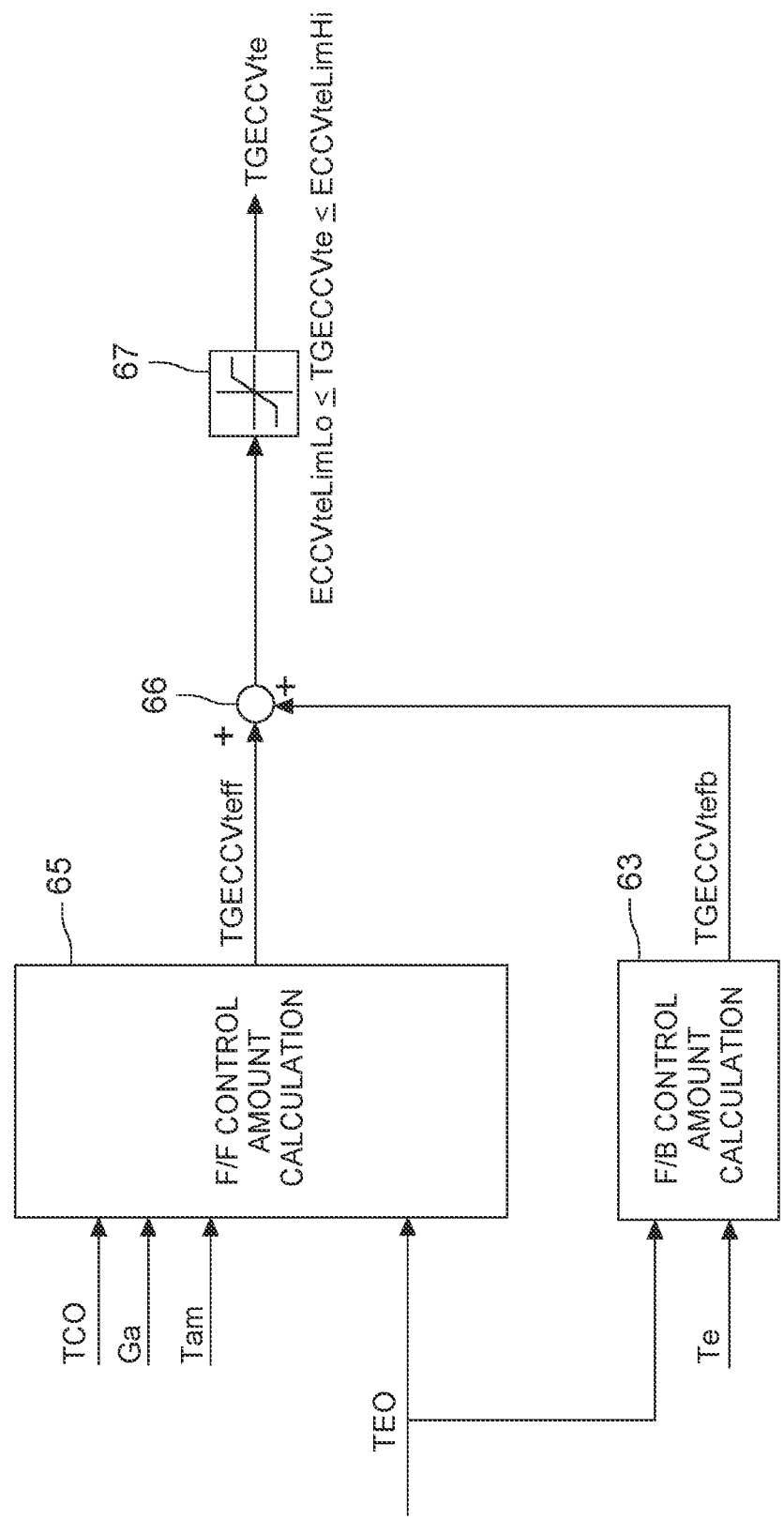
FIG. 4 is a control block diagram concerning outdoor expansion valve control in the dehumidifying and heating mode of the controller of FIG. 2.

Next, FIG. 4 is a control block diagram of the controller 32 which determines a target position (outdoor expansion valve target position) TGECCVte of the outdoor expansion valve 6 in the dehumidifying and heating mode. An F/F control amount calculation section 65 of the controller 32 calculates an F/F control amount TGECCVteff of the outdoor expansion valve target position on the basis of the heat absorber target temperature TEO of the heat absorber 9, the radiator target temperature TCO, the mass air volume Ga of the air, and the outdoor air temperature Tam.

Furthermore, an F/B control amount calculation section 63 calculates an F/B control amount TGECCVtefb of the outdoor expansion valve target position on the basis of the heat absorber target temperature TEO and the heat absorber temperature Te. Further, the F/F control amount TGECCVteff calculated by the F/F control amount calculation section 65 and the F/B control amount TGECCVtefb calculated by the F/B control amount calculation section 63 are added by an adder 66, a limit setting section 67 attaches limits of an upper limit of controlling and a lower limit of controlling, and then the outdoor expansion valve target position TGECCVte is determined. In the dehumidifying and heating mode, the controller 32 controls the valve position of the outdoor expansion valve 6 on the basis of the outdoor expansion valve target position TGECCVte.

(3) Dehumidifying and Cooling Mode

Next, in the dehumidifying and cooling mode, the controller 32 opens the solenoid valve 17 and closes the solenoid valve 21 and the solenoid valve 22. Further, the controller operates the compressor 2 and the respective blowers 15 and 27, and the air mix damper 28 has the state of passing the air blown out from the indoor blower 27 through the heating medium-air heat exchanger 40 and the radiator 4. In consequence, the high-temperature high-pressure gas refrigerant discharged from the compressor 2 flows into the radiator 4. Through the radiator 4, the air in the air flow passage 3 passes, and hence the air in the air flow passage 3 is heated by the high-temperature refrigerant in the radiator 4 (the heating medium-air heat exchanger 40 stops), whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled so that the valve tends to be open, to flow into the outdoor heat exchanger 7. The refrigerant flowing into the outdoor heat exchanger 7 is cooled by the running therein or the outdoor air passing through the outdoor blower 15, to radiate heat and condense. The refrigerant flowing out from the outdoor heat exchanger 7 flows from the refrigerant pipe 13A through the solenoid valve 17 to successively flow into the receiver tank portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 is reheated in the process of passing the radiator 4 (a radiation capability is lower than that during the heating), thereby performing the dehumidifying and cooling of the vehicle interior.

The controller 32 controls the number of revolution of the compressor 2 on the basis of the temperature of the heat absorber 9 which is detected by the heat absorber temperature sensor 48, also controls the valve position of the outdoor expansion valve 6 on the basis of the above-mentioned high pressure of the refrigerant circuit R (the radiator pressure PCI), and controls a refrigerant pressure (the radiator pressure PCI) of the radiator 4.

Figure 14:
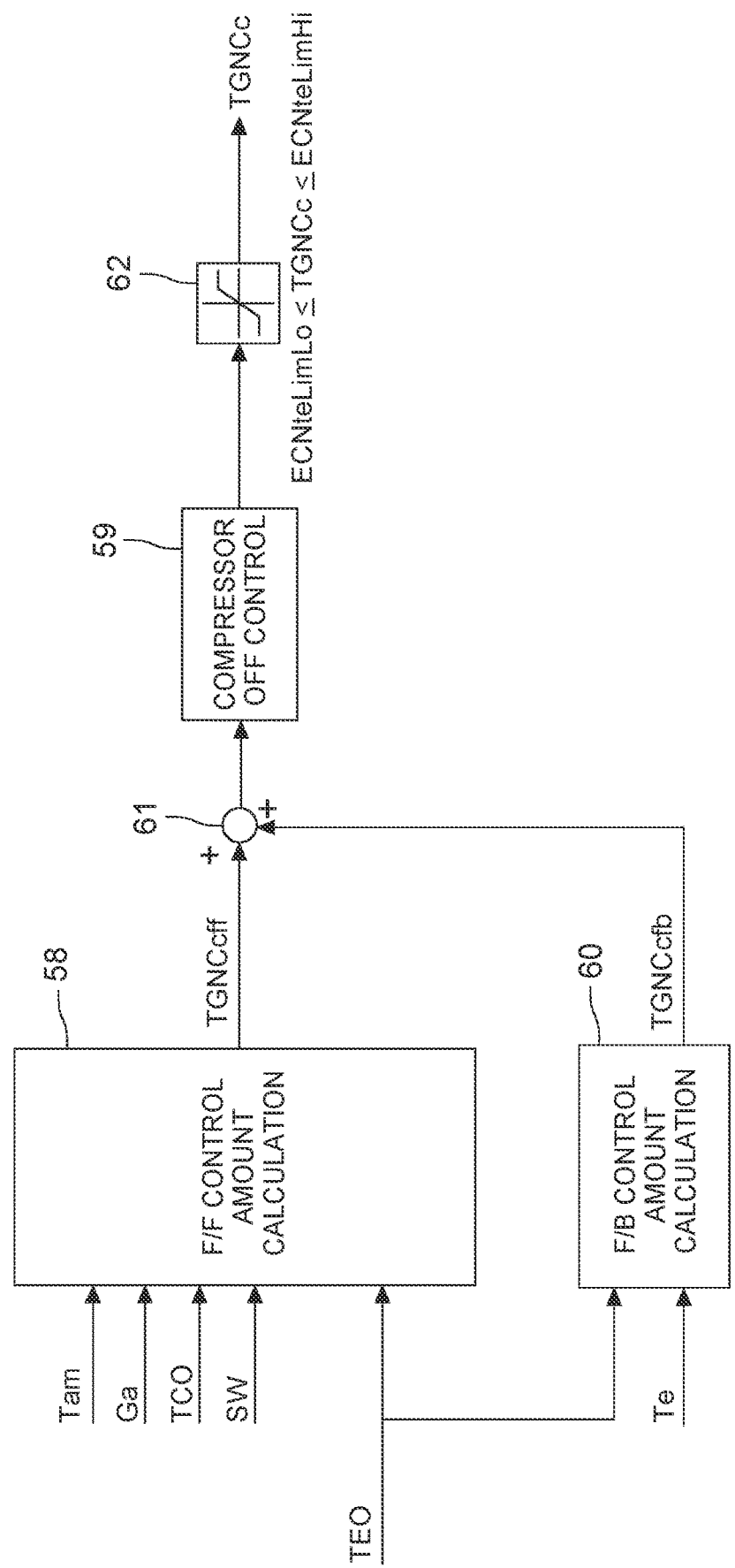
FIG. 14 is a control block diagram concerning compressor control in a dehumidifying and cooling mode of the controller of FIG. 2.

FIG. 14 is a control block diagram of the controller 32 which determines a target number of revolution (a compressor target number of revolution) TGNCc of the compressor 2 in the dehumidifying and cooling mode (similarly in an after-mentioned cooling mode). The F/F (feedforward) control amount calculation section 58 of the controller 32 calculates an F/F control amount TGNCcff of the compressor target number of revolution on the basis of the outdoor air temperature Tam obtainable from the outdoor air temperature sensor 33, the heat absorber target temperature TEO that is the target value of the temperature of the heat absorber 9, the mass air volume Ga of the air flowing into the air flow passage 3, the radiator target temperature TCO that is the target value of the temperature of the radiator 4, and an opening SW of the air mix damper 28.

Furthermore, the F/B (feedback) control amount calculation section 60 calculates an F/B control amount TGNCcfb of the compressor target number of revolution on the basis of the heat absorber target temperature TEO and the heat absorber temperature Te that is the temperature of the heat absorber 9. Further, the F/F control amount TGNCcff calculated by the F/F control amount calculation section 58 and the amount TGNCcfb calculated by the F/B control amount calculation section 60 are added by the adder 61, and transmitted through a compressor OFF control section 59 to the limit setting section 62 which attaches limits of an upper limit of controlling and a lower limit of controlling, and then the compressor target number of revolution TGNCc is determined. It is to be noted that the compressor OFF control section 59 stops the compressor 2 in a case where the temperature of the heat absorber 9 further lowers when the number of revolution of the compressor 2 is the lower limit of controlling. Further, in the dehumidifying and cooling mode (similarly in the above cooling mode), the controller 32 controls the number of revolution of the compressor 2 on the basis of the compressor target number of revolution TGNCc.

Figure 15:
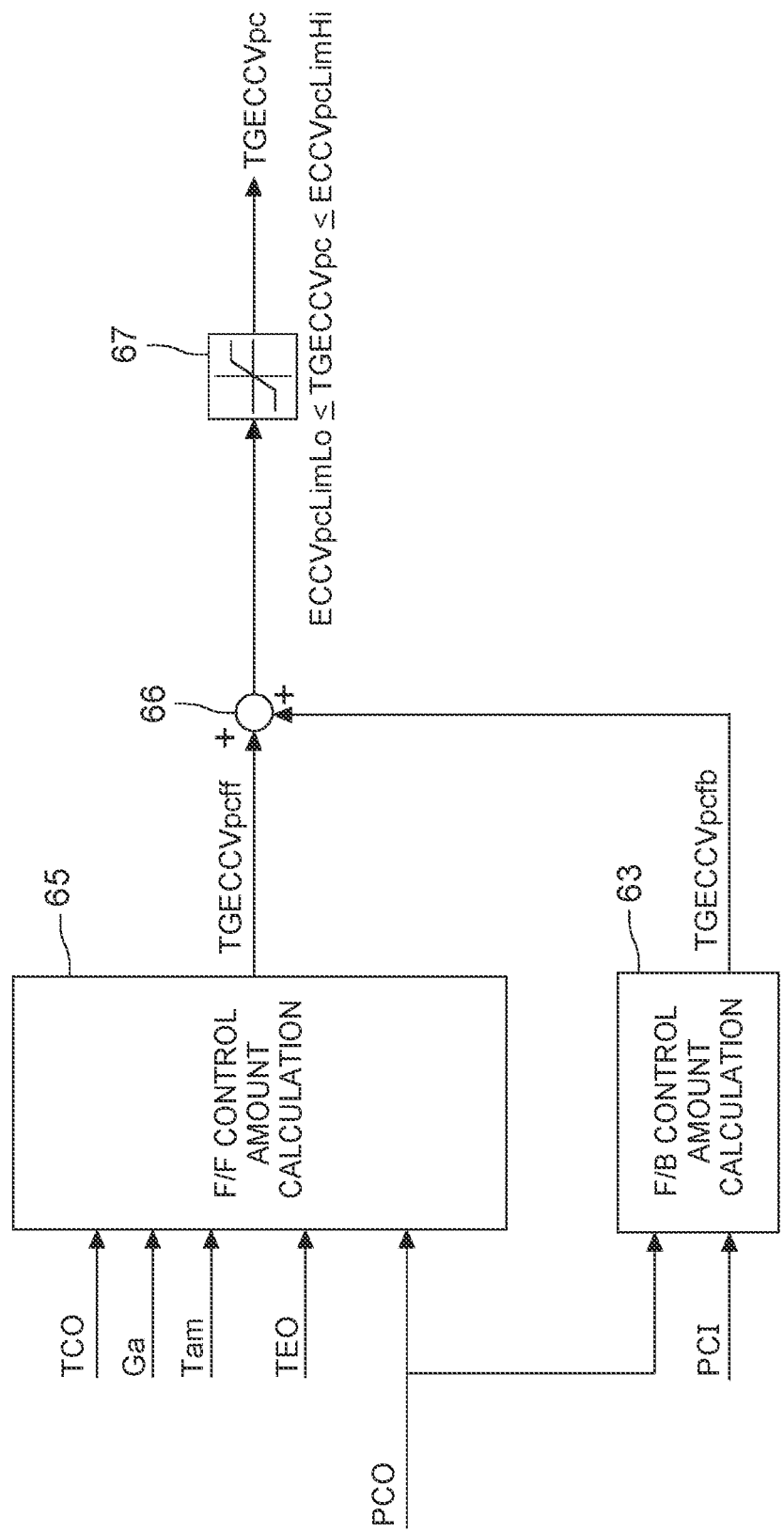
FIG. 15 is a control block diagram concerning outdoor expansion valve control in the dehumidifying and cooling mode of the controller of FIG. 2.

Next, FIG. 15 is a control block diagram of the controller 32 which determines a target position (an outdoor expansion valve target position) TGECCVpc of the outdoor expansion valve 6 in the dehumidifying and cooling mode. The F/F control amount calculation section 65 of the controller 32 calculates an F/F control amount TGECCVpcff of the outdoor expansion valve target position on the basis of the radiator target temperature TCO of the radiator 4, the target radiator pressure PCO, the mass air volume Ga of the air, the outdoor air temperature Tam, and the heat absorber target temperature TEO.

Furthermore, the F/B control amount calculation section 63 calculates an F/B control amount TGECCVpcfb of the outdoor expansion valve target position on the basis of the target radiator pressure PCO and the radiator pressure PCI. Further, the F/F control amount TGECCVpcff calculated by the F/F control amount calculation section 65 and the F/B control amount TGECCVpcfb calculated by the F/B control amount calculation section 63 are added by the adder 66, the limit setting section 67 attaches limits of an upper limit of controlling and a lower limit of controlling, and then the outdoor expansion valve target position TGECCVpc is determined. In the dehumidifying and cooling mode, the controller 32 controls the valve position of the outdoor expansion valve 6 on the basis of this outdoor expansion valve target position TGECCVpc.

(4) Cooling Mode

Next, in the cooling mode, the controller 32 fully opens the outdoor expansion valve 6 (adjusts the valve position into the upper limit of controlling) in the above state of the dehumidifying and cooling mode, and the air mix damper 28 has a state where the air does not pass through the radiator 4. In consequence, the high-temperature high-pressure gas refrigerant discharged from the compressor 2 flows into the radiator 4. The air in the air flow passage 3 does not pass through the radiator 4, the refrigerant therefore only passes the radiator, and the refrigerant flowing out from the radiator 4 flows through the refrigerant pipe 13E to reach the outdoor expansion valve 6.

At this time, the outdoor expansion valve 6 is fully open, and hence the refrigerant flows into the outdoor heat exchanger 7 as it is, in which the refrigerant is cooled by the running therein or the outdoor air passing through the outdoor blower 15, to condensate and liquefy. The refrigerant flowing out from the outdoor heat exchanger 7 flows from the refrigerant pipe 13A through the solenoid valve 17 to successively flow into the receiver tank portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The air blown out from the indoor blower 27 is cooled by the heat absorbing operation at this time.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 does not pass the radiator 4 but is blown out from the outlet 29 to the vehicle interior, thereby performing cooling of the vehicle interior. In this cooling mode, the controller 32 controls the number of revolution of the compressor 2 on the basis of the temperature Te of the heat absorber 9 which is detected by the heat absorber temperature sensor 48. Further, the controller 32 selects each of the above operation modes and changes in accordance with the outdoor air temperature or a target outlet temperature.

(5) Control of Outdoor Blower 15 in Dehumidifying and Heating Mode

Next, control of the outdoor blower 15 in the above dehumidifying and heating mode by the controller 32 will be described with reference to FIG. 5 to FIG. 13. In the embodiment, the controller 32 judges whether or not the radiator pressure PCI (the high pressure) detected by the radiator pressure sensor 47 converges to the target radiator pressure PCO or whether the radiator pressure is higher or lower than the target pressure, to judge whether or not the radiator temperature TCI converges to the radiator target temperature TCO (this state is called a satisfactory situation) or whether the radiator temperature is higher or lower than the target temperature. Furthermore, on the basis of the heat absorber temperature Te detected by the heat absorber temperature sensor 48, the controller judges whether or not the heat absorber temperature Te converges to the heat absorber target temperature TEO (this state is called the satisfactory situation) or whether the heat absorber temperature is higher or lower than the target temperature.

Figure 5:
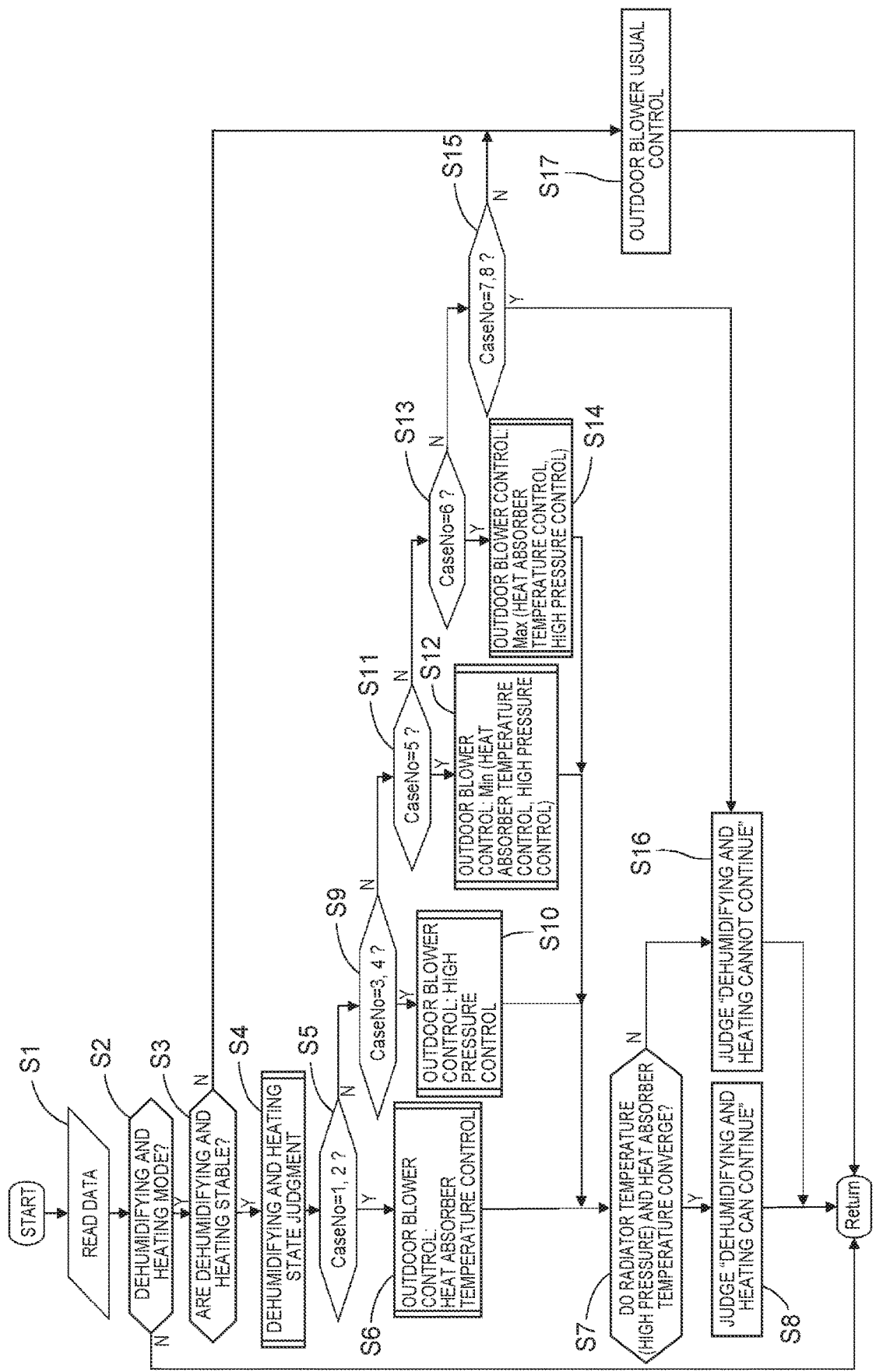
FIG. 5 is a flowchart of outdoor blower control in the dehumidifying and heating mode of the controller of FIG. 2.

The controller 32 reads data from each sensor in step S1 of FIG. 5, and judges whether or not a current operation mode is the dehumidifying and heating mode in step S2. Further, when the current operation mode is the dehumidifying and heating mode, the controller advances to step S3 and judges whether or not the dehumidifying and heating mode is stable. At this time, in a transitional stage such as a stage immediately after startup of the vehicle air conditioner 1 or immediately after change to the dehumidifying and heating mode, the controller 32 advances to step S17 and executes usual control of the outdoor blower 15. In this usual control, the controller 32 does not execute after-mentioned air volume decrease/increase control of the outdoor blower 15, but maximizes a voltage to be applied to the outdoor blower 15 to maximize an air volume. Consequently, in a transitional stage such as a startup initial stage or the stage immediately after the change to the dehumidifying and heating mode, the controller shifts to a stable state in early stages. It is to be noted that at this time, the controller may execute the control with a predetermined air volume by a predetermined applied voltage, without maximizing the air volume of the outdoor blower 15.

On the other hand, in a case where the dehumidifying and heating mode is stabilized in the step S3, the controller 32 advances to step S4 and judges a current dehumidifying and heating state with reference to a judgment table of the dehumidifying and heating state of FIG. 6. In the judgment table of the dehumidifying and heating state of FIG. 6, Case No. 0 is a case where both the radiator temperature TCI (judged from PCI (the high pressure)) and the heat absorber temperature Te converge to the radiator target temperature TCO and the heat absorber target temperature TEO, and the number of revolution of the compressor 2 and the valve position of the outdoor expansion valve 6 are in a control range.

Case No. 1 of FIG. 6 is a case where the radiator temperature TCI converges to the radiator target temperature TCO, but the heat absorber temperature Te is higher than the heat absorber target temperature TEO, and the number of revolution of the compressor 2 is in the control range, but the outdoor expansion valve 6 sticks to a closing direction and has the valve position at the lower limit of controlling, and Case No. 2 is a case where the radiator temperature TCI converges to the radiator target temperature TCO, but the heat absorber temperature Te is lower than the heat absorber target temperature TEO, and the number of revolution of the compressor 2 is in the control range, but the outdoor expansion valve 6 sticks to an opening direction and has the valve position at the upper limit of controlling. In each of these cases, it is not possible to control the heat absorber temperature Te with the valve position of the outdoor expansion valve 6.

Case No. 3 of FIG. 6 is a case where the heat absorber temperature Te converges to the heat absorber target temperature TEO, but the radiator temperature TCI is higher than the radiator target temperature TCO, and the valve position of the outdoor expansion valve 6 is in the control range, but the number of revolution of the compressor 2 sticks to the lower limit of controlling, and Case No. 4 is a case where the heat absorber temperature Te converges to the heat absorber target temperature TEO, but the radiator temperature TCI is lower than the radiator target temperature TCO, and the valve position of the outdoor expansion valve 6 is in the control range, but the number of revolution of the compressor 2 sticks to the upper limit of controlling. In each of these cases, it is not possible to control the radiator temperature TCI with the number of revolution of the compressor 2.

Case No. 5 of FIG. 6 is a case where both the radiator temperature TCI and the heat absorber temperature Te are higher than the radiator target temperature TCO and the heat absorber target temperature TEO, and the number of revolution of the compressor 2 sticks to the lower limit of controlling, and the valve position of the outdoor expansion valve 6 also sticks to the closing direction to indicate the lower limit of controlling, and Case No. 6 is a case where both the radiator temperature TCI and the heat absorber temperature Te are lower than the radiator target temperature TCO and the heat absorber target temperature TEO, and the number of revolution of the compressor 2 sticks to the upper limit of controlling, and the valve position of the outdoor expansion valve 6 also sticks to the opening direction to indicate the upper limit of controlling. In each of these cases, it is not possible to control the radiator temperature TCI and the heat absorber temperature Te with the number of revolution of the compressor 2 and the valve position of the outdoor expansion valve 6.

Case No. 7 of FIG. 6 is a case where the radiator temperature TCI is higher than the radiator target temperature TCO, and the heat absorber temperature Te is lower than the heat absorber target temperature TEO, and the number of revolution of the compressor 2 sticks to the lower limit of controlling, and the valve position of the outdoor expansion valve 6 sticks to the opening direction to indicate the upper limit of controlling, and Case No. 8 is a case where the radiator temperature TCI is lower than the radiator target temperature TCO, and the heat absorber temperature Te is higher than the heat absorber target temperature TEO, and the number of revolution of the compressor 2 sticks to the upper limit of controlling, and the valve position of the outdoor expansion valve 6 sticks to the closing direction to indicate the lower limit of controlling. Also in each of these cases, it is not possible to control the radiator temperature TCI and the heat absorber temperature Te with the number of revolution of the compressor 2 and the valve position of the outdoor expansion valve 6.

In step S4, the controller 32 judges which one of cases of FIG. 6 applies to the current dehumidifying and heating state, on the basis of the radiator pressure PCI and the heat absorber temperature Te, and in Case No. 0, i.e., in the case where both the radiator temperature TCI and the heat absorber temperature Te converge to the radiator target temperature TCO and the heat absorber target temperature TEO, and both the number of revolution of the compressor 2 and the valve position of the outdoor expansion valve 6 are in the control range, the controller advances from step S5, step S9, step S11, step S13 and step S15 to step S17, to execute the above-mentioned usual control of the outdoor blower 15.

On the other hand, in a case where the current dehumidifying and heating state is Case No. 1 or Case No. 2, i.e., in the case where the radiator temperature TCI converges to the radiator target temperature TCO, but the heat absorber temperature Te is higher than the heat absorber target temperature TEO, and the number of revolution of the compressor 2 is in the control range, but the outdoor expansion valve 6 sticks to the closing direction and has the valve position at the lower limit of controlling, or in the case where the radiator temperature TCI converges to the radiator target temperature TCO, but the heat absorber temperature Te is lower than the heat absorber target temperature TEO, and the number of revolution of the compressor 2 is in the control range, but the outdoor expansion valve 6 sticks to the opening direction and has the valve position at the upper limit of controlling, the controller 32 advances from the step S5 to step S6, to control an outdoor blower voltage FANVout (the air volume) that is the applied voltage of the outdoor blower 15, on the basis of the heat absorber temperature Te by a system shown in the lowest row of a column corresponding to Case No. 1 or 2 of FIG. 6.

Figure 7:
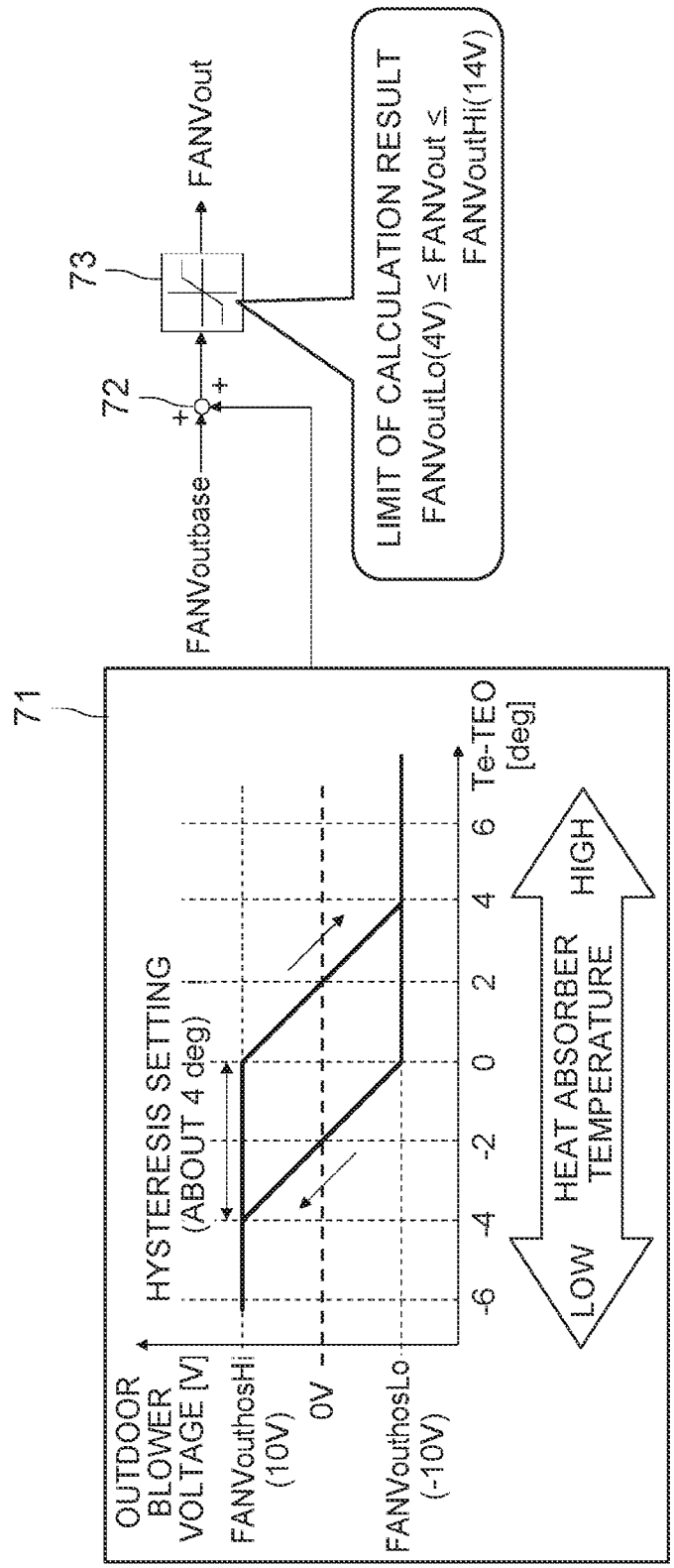
FIG. 7 is one example of a control block diagram concerning the outdoor blower control when a radiator temperature (a high pressure) converges in the dehumidifying and heating mode of the controller of FIG. 2.

FIG. 7 shows one example of a control block diagram of the outdoor blower 15 in this case. An outdoor blower voltage correcting section 71 of the controller 32 determines an outdoor blower voltage correction value FANVouthos between an upper limit FANVouthosHi (a positive value, e.g., 10 V) and a lower limit FANVouthosLo (a negative value, e.g., −10 V) on the basis of a difference (Te−TEO) between the heat absorber temperature Te and the heat absorber target temperature TEO. In the method, when the difference (Te−TEO) is large, i.e., the heat absorber temperature Te is high and lowers to 0, the section sets the outdoor blower voltage correction value FANVouthos to the lower limit FANVouthosLo, and as the difference (Te−TEO) further lowers from 0 to the negative value, the section increases the outdoor blower voltage correction value FANVouthos up to the upper limit FANVouthosHi with a predetermined inclination.

When the difference (Te−TEO) is small (the negative value), i.e., the heat absorber temperature Te is low and rises to 0, the section sets the outdoor blower voltage correction value FANVouthos to the upper limit FANVouthosHi, and as the difference (Te−TEO) further rises from 0, the section decreases the outdoor blower voltage correction value FANVouthos down to the lower limit FANVouthosLo with a predetermined inclination.

An adder 72 adds the outdoor blower voltage correction value FANVouthos determined by the outdoor blower voltage correcting section 71 in this manner to an outdoor blower voltage FANVoutbase that is a base, a limit setting section 73 attaches limits of an upper limit of controlling and a lower limit of controlling, and then the outdoor blower voltage FANVout is determined.

That is, in the case where the heat absorber temperature Te is higher than the heat absorber target temperature TEO as in Case No. 1 of FIG. 6, the outdoor blower voltage correction value FANVouthos is the negative value and its absolute value increases, so that the outdoor blower voltage FANVout decreases and the air volume decreases. When the air volume of the outdoor blower 15 decreases, a quantity of heat to be absorbed in the outdoor heat exchanger 7 decreases, and hence the radiator temperature TCI lowers. Simultaneously, the radiator pressure PCI also decreases, and hence the controller 32 increases the target number of revolution TGNCh (FIG. 3) of the compressor 2 to maintain the radiator pressure PCI at the target radiator pressure PCO. Consequently, an amount of the refrigerant to circulate in the refrigerant circuit R increases, an amount of the refrigerant to flow into the heat absorber 9 also increases, and as a result, the heat absorber temperature Te lowers.

Furthermore, in the case where the heat absorber temperature Te is lower than the heat absorber target temperature TEO as in Case No. 2 of FIG. 6, the outdoor blower voltage correction value FANVouthos is the positive value and increases, so that the outdoor blower voltage FANVout increases and the air volume increases. When the air volume of the outdoor blower 15 increases, the quantity of heat to be absorbed in the outdoor heat exchanger 7 increases, and hence the radiator temperature TCI rises. Simultaneously, the radiator pressure PCI also increases, and hence the controller 32 decreases the target number of revolution TGNCh (FIG. 3) of the compressor 2 to maintain the radiator pressure PCI at the target radiator pressure PCO. Consequently, the amount of the refrigerant to circulate in the refrigerant circuit R decreases, the amount of the refrigerant to flow into the heat absorber 9 also decreases, and as a result, the heat absorber temperature Te rises.

Figure 8:
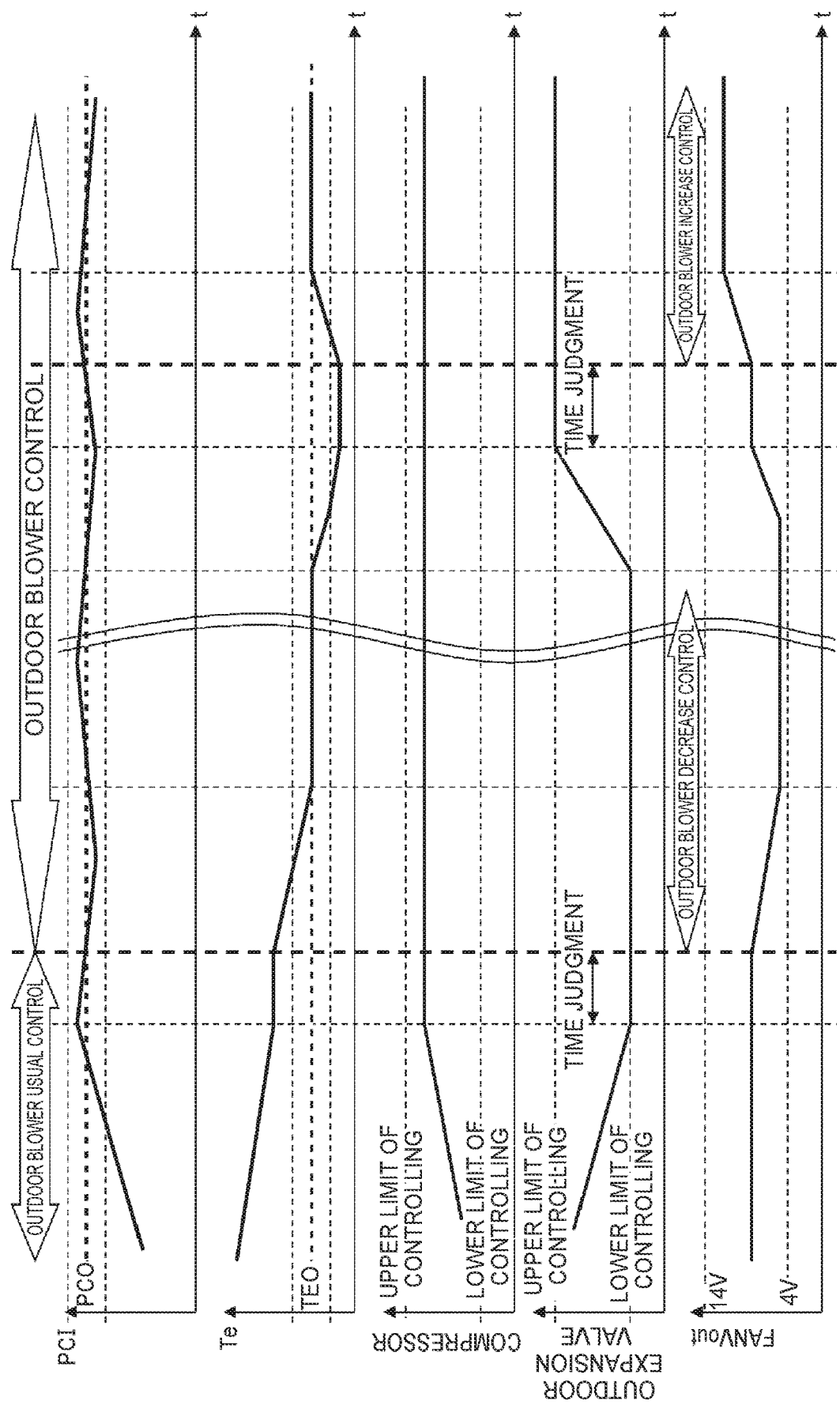
FIG. 8 is a timing chart of each device in the control of FIG. 7.

FIG. 8 shows such a behavior of the air volume decrease/increase control of the outdoor blower 15 on the basis of the heat absorber temperature Te. In this drawing, a range of the outdoor blower usual control indicates the above-mentioned transitional stage. In the case where the dehumidifying and heating mode becomes stable, and the radiator pressure PCI converges to the target radiator pressure PCO (i.e., the radiator temperature TCI converges to the radiator target temperature TCO), but the heat absorber temperature Te is higher than the heat absorber target temperature TEO, and the number of revolution of the compressor 2 is in the control range, but the valve position of the outdoor expansion valve 6 sticks to the lower limit of controlling (judged for a predetermined time), the controller 32 decreases the outdoor blower voltage FANVout to decrease the air volume (outdoor blower air volume decrease control). Furthermore, in the case where the radiator pressure PCI converges to the target radiator pressure PCO (i.e., the radiator temperature TCI converges to the radiator target temperature TCO), but the heat absorber temperature Te is lower than the heat absorber target temperature TEO, and the number of revolution of the compressor 2 is in the control range, but the valve position of the outdoor expansion valve 6 sticks to the upper limit of controlling (judged for the predetermined time), the controller 32 increases the outdoor blower voltage FANVout to increase the air volume (outdoor blower air volume increase control).

In consequence, an effective range (a range of defense) of the dehumidifying and heating mode to environmental conditions enlarges, it is possible to smoothly achieve dehumidifying and heating air conditioning of the vehicle interior by the dehumidifying and heating mode in a broad range of the environmental conditions, and it is possible to abolish the above-mentioned internal cycle mode.

Figure 9:
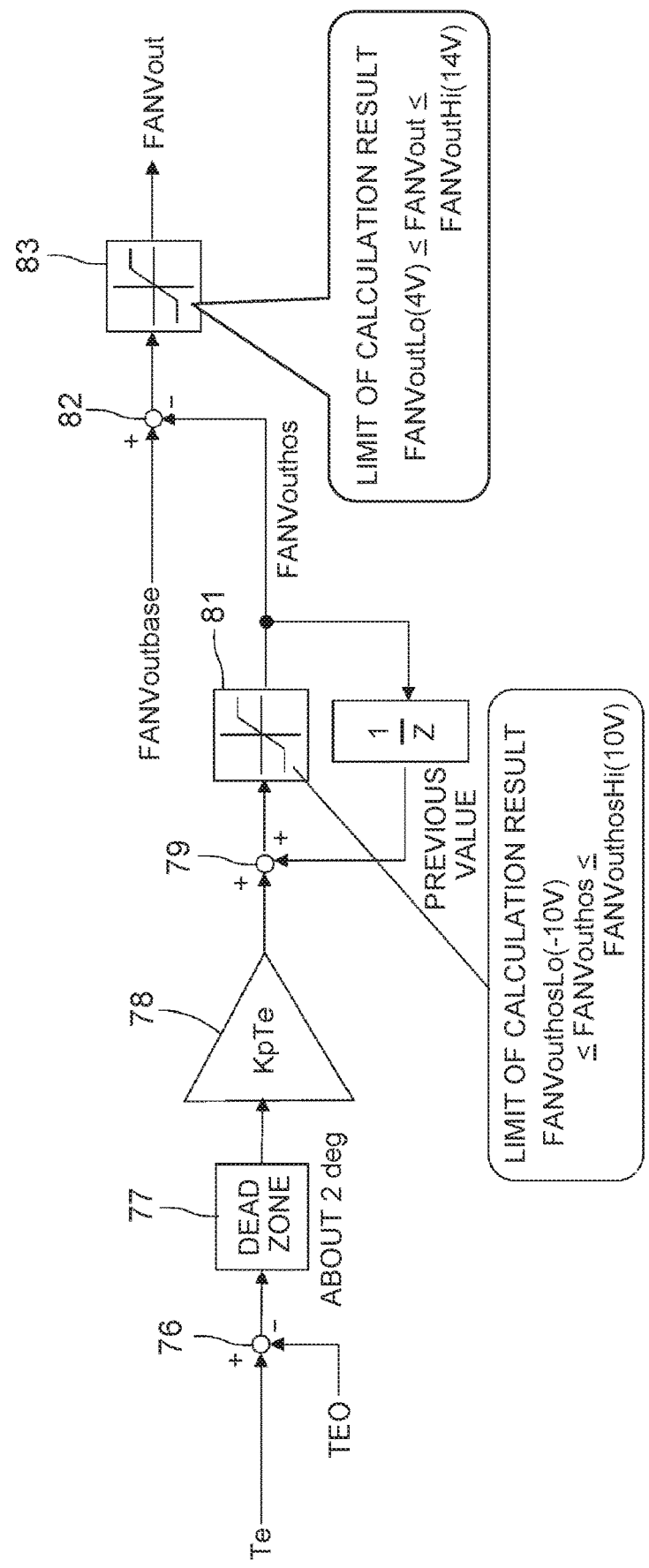
FIG. 9 is another example of the control block diagram concerning the outdoor blower control of FIG. 7.

Here, FIG. 9 shows another example of a control block diagram of the outdoor blower 15 in Case No. 1 or 2. In this case, a subtracter 76 calculates the difference (Te−TEO) between the heat absorber temperature Te and the heat absorber target temperature TEO, and an amplifier 78 amplifies this difference (Te−TEO) via a dead zone portion 77. An adder 79 adds the previous value (1/Z) to the amplified value. That is, in this case, feedback (F/B) control is executed. A limit setting section 81 attaches, to the value passing through the adder 79, limits of an upper limit of controlling and a lower limit of controlling to obtain the outdoor blower voltage correction value FANVouthos, a subtracter 82 subtracts this value from the outdoor blower voltage FANVoutbase that is the base, a limit setting section 83 attaches limits of an upper limit of controlling and a lower limit of controlling, and then the outdoor blower voltage FANVout is determined.

That is, in the case where the heat absorber temperature Te is higher than the heat absorber target temperature TEO (Case No. 1), the outdoor blower voltage correction value FANVouthos is the positive value and increases, so that the outdoor blower voltage FANVout decreases and the air volume decreases. Conversely, in the case where the heat absorber temperature Te is lower than the heat absorber target temperature TEO (Case No. 2), the outdoor blower voltage correction value FANVouthos is the negative value and its absolute value increases, so that the outdoor blower voltage FANVout increases and the air volume increases. In consequence, similarly to the case of FIG. 7, the effective range of the dehumidifying and heating mode to the environmental conditions enlarges, and in the broad range of the environmental conditions, it is possible to smoothly achieve the dehumidifying and heating air conditioning of the vehicle interior by the dehumidifying and heating mode.

On the other hand, when the current dehumidifying and heating state is Case No. 3 or Case No. 4, i.e., in the case where the heat absorber temperature Te converges to the heat absorber target temperature TEO, but the radiator temperature TCI is higher than the radiator target temperature TCO, and the valve position of the outdoor expansion valve 6 is in the control range, but the number of revolution of the compressor 2 sticks to the lower limit of controlling, or in the case where the heat absorber temperature Te converges to the heat absorber target temperature TEO, but the radiator temperature TCI is lower than the radiator target temperature TCO, and the valve position of the outdoor expansion valve 6 is in the control range, but the number of revolution of the compressor 2 sticks to the upper limit of controlling, the controller 32 advances from the step S5 to the step S9 and from the step S9 to step S10, to control the outdoor blower voltage FANVout (the air volume) that is the applied voltage of the outdoor blower 15 on the basis of the radiator pressure PCI (the high pressure) by a system shown in the lowest row of a column corresponding to Case No. 3 or 4 of FIG. 6.

Figure 10:
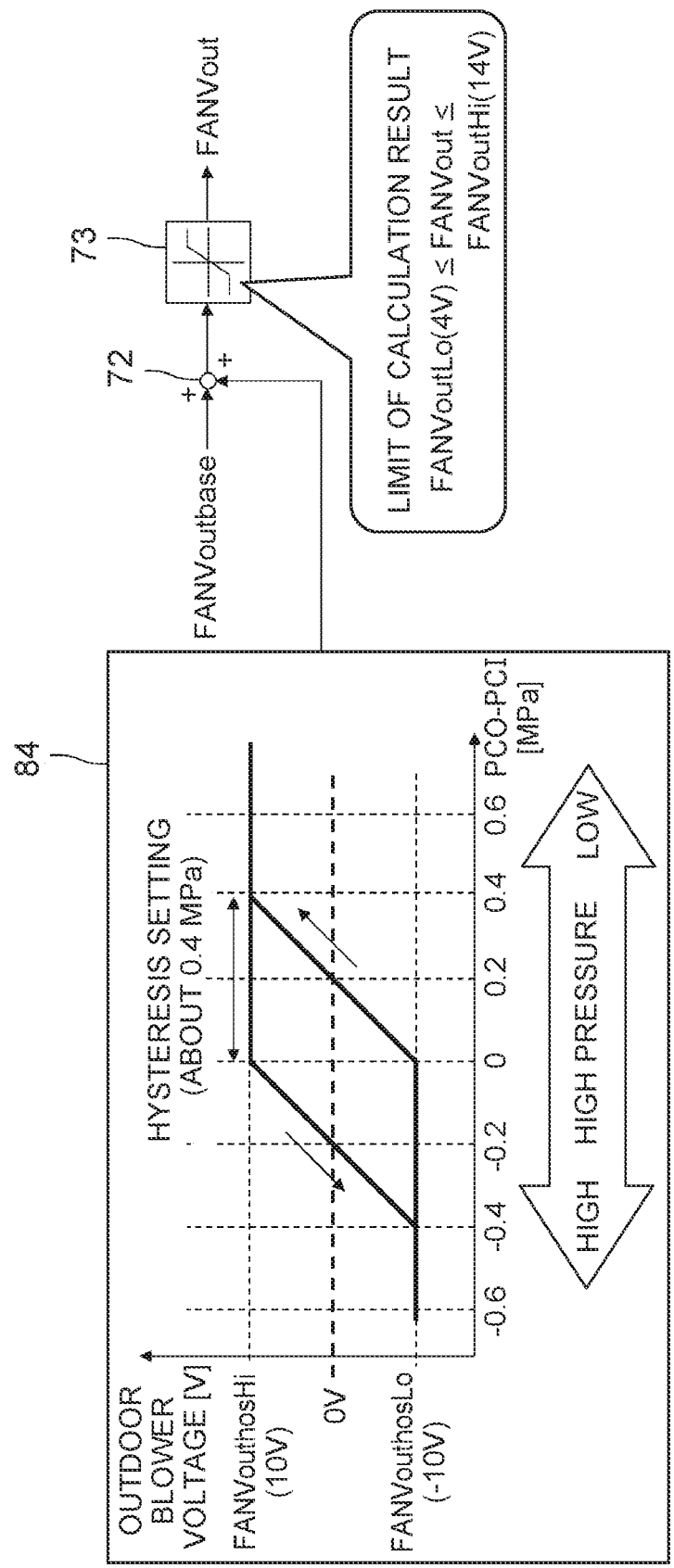
FIG. 10 is one example of the control block diagram concerning the outdoor blower control when a heat absorber temperature converges in the dehumidifying and heating mode of the controller of FIG. 2.

FIG. 10 shows one example of a control block diagram of the outdoor blower 15 in this case. An outdoor blower voltage correcting section 84 of the controller 32 in this case determines the outdoor blower voltage correction value FANVouthos between the upper limit FANVouthosHi (the positive value, e.g., 10 V) and the lower limit FANVouthosLo (the negative value, e.g., −10 V) on the basis of a difference (PCO−PCI) between the target radiator pressure PCO and the radiator pressure PCI. In the method, when the difference (PCO−PCI) is small (the negative value), i.e., the radiator pressure PCI is high (the radiator temperature TCI is high) and increases to 0, the section sets the outdoor blower voltage correction value FANVouthos to the lower limit FANVouthosLo, and as the difference (PCO−PCI) further increases from 0, the section increases the outdoor blower voltage correction value FANVouthos up to the upper limit FANVouthosHi with a predetermined inclination.

When the difference (PCO−PCI) is large, i.e., the radiator pressure PCI is low and decreases to 0, the section sets the outdoor blower voltage correction value FANVouthos to the upper limit FANVouthosHi, and as the difference (PCO−PCI) further decreases from 0 to the negative value, the section decreases the outdoor blower voltage correction value FANVouthos down to the lower limit FANVouthosLo with a predetermined inclination.

The adder 72 adds the outdoor blower voltage correction value FANVouthos determined by the outdoor blower voltage correcting section 84 in this manner to the outdoor blower voltage FANVoutbase that is the base, the limit setting section 73 attaches limits of an upper limit of controlling and a lower limit of controlling, and then the outdoor blower voltage FANVout is determined.

That is, in the case where the radiator temperature TCI is higher than the radiator target temperature TCO as in Case No. 3 of FIG. 6, the outdoor blower voltage correction value FANVouthos is the negative value and its absolute value increases, so that the outdoor blower voltage FANVout decreases and the air volume decreases. When the air volume of the outdoor blower 15 decreases, the quantity of heat to be absorbed in the outdoor heat exchanger 7 decreases, and hence the radiator temperature TCI also lowers.

Furthermore, in the case where the radiator temperature TCI is lower than the radiator target temperature TCO as in Case No. 4 of FIG. 6, the outdoor blower voltage correction value FANVouthos is the positive value and increases, so that the outdoor blower voltage FANVout increases and the air volume increases. When the air volume of the outdoor blower 15 increases, the quantity of heat to be absorbed in the outdoor heat exchanger 7 increases, and hence the radiator temperature TCI also rises.

Figure 11:
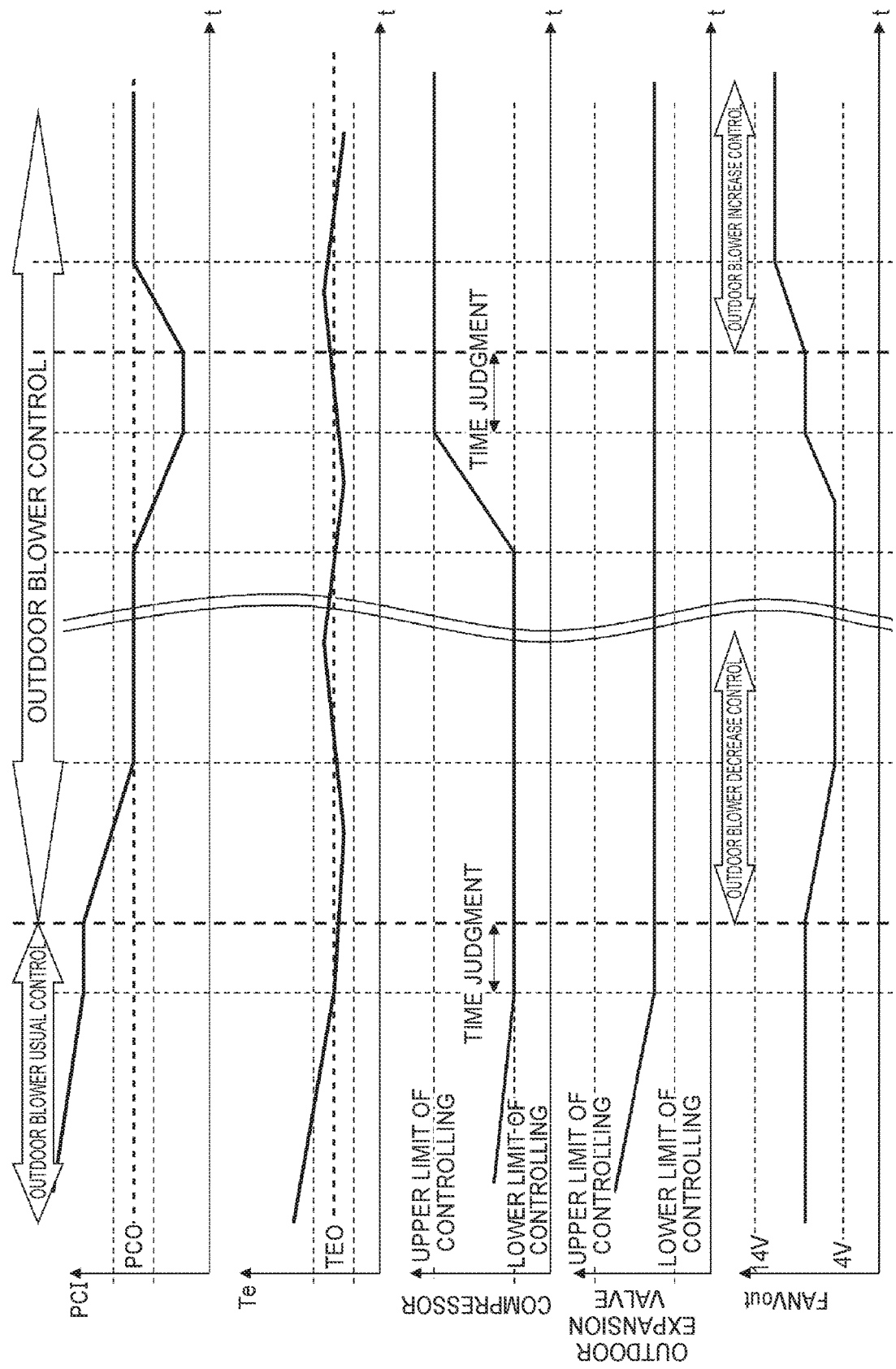
FIG. 11 is a timing chart of each device in the control of FIG. 10.

FIG. 11 shows a behavior of the air volume decrease/increase control of the outdoor blower 15 on the basis of such radiator pressure PCI. In this drawing, the range of the outdoor blower usual control indicates the above-mentioned transitional stage. In the case where the dehumidifying and heating mode becomes stable, and the heat absorber temperature Te converges to the heat absorber target temperature TEO, but the radiator pressure PCI is higher than the target radiator pressure PCO, and the valve position of the outdoor expansion valve 6 is in the control range, but the number of revolution of the compressor 2 sticks to the lower limit of controlling (judged for a predetermined time), the controller 32 decreases the outdoor blower voltage FANVout to decrease the air volume (the outdoor blower air volume decrease control). Furthermore, in the case where the heat absorber temperature Te converges to the heat absorber target temperature TEO, but the radiator pressure PCI is lower than the target radiator pressure PCO, and the valve position of the outdoor expansion valve 6 is in the control range, but the number of revolution of the compressor 2 sticks to the upper limit of controlling (judged for the predetermined time), the controller 32 increases the outdoor blower voltage FANVout to increase the air volume (the outdoor blower air volume increase control).

In consequence, the effective range of the dehumidifying and heating mode to environmental conditions enlarges, it is possible to smoothly achieve the dehumidifying and heating air conditioning of the vehicle interior by the dehumidifying and heating mode in the broad range of the environmental conditions, and it is possible to abolish the above-mentioned internal cycle mode.

Figure 12:
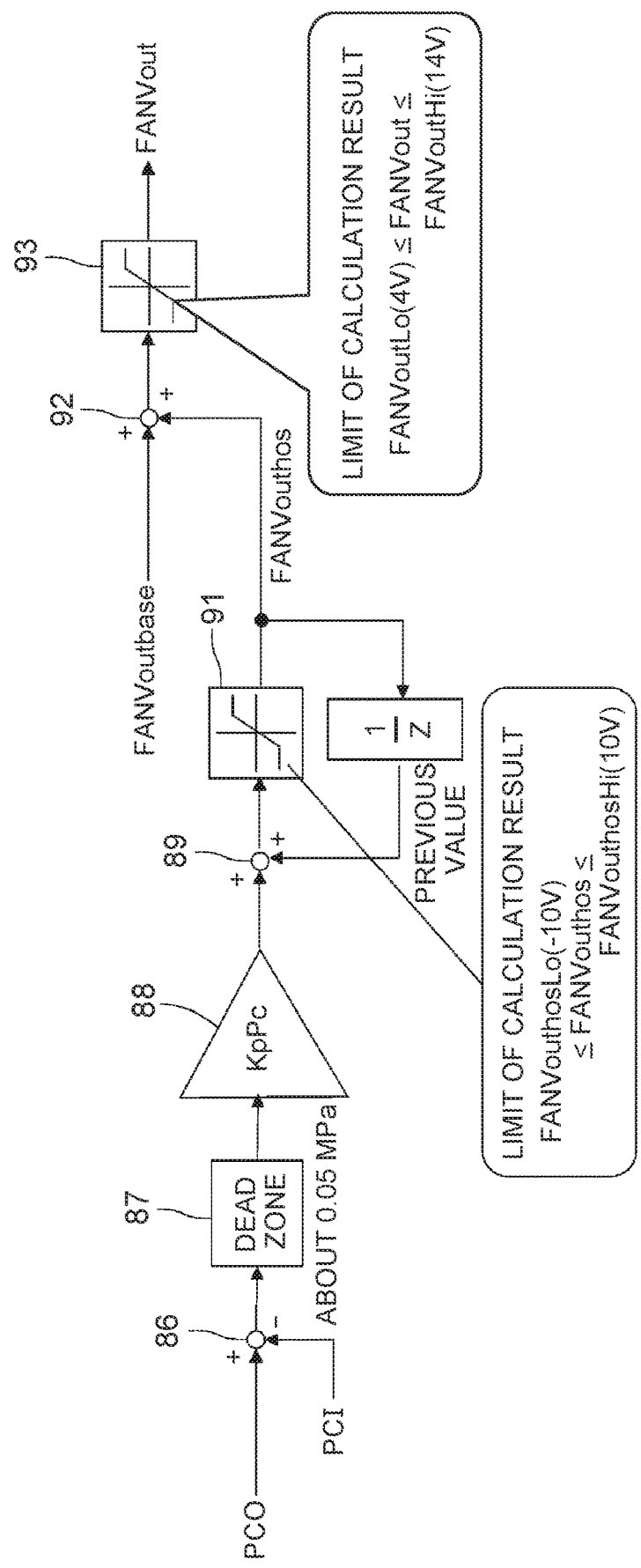
FIG. 12 is another example of the control block diagram concerning the outdoor blower control of FIG. 10.

Here, FIG. 12 shows another example of a control block diagram of the outdoor blower 15 in such Case No. 3 or 4. In this case, a subtracter 86 calculates the difference (PCO−PCI) between the target radiator pressure PCO and the radiator pressure PCI, and an amplifier 88 amplifies this difference (PCO−PCI) via a dead zone portion 87. An adder 89 adds the previous value (1/Z) to the amplified value. That is, in this case, the feedback (F/B) control is executed. A limit setting section 91 attaches, to the value passing through the adder 89, limits of an upper limit of controlling and a lower limit of controlling to obtain the outdoor blower voltage correction value FANVouthos, an adder 92 adds this value to the outdoor blower voltage FANVoutbase that is the base, a limit setting section 93 attaches limits of an upper limit of controlling and a lower limit of controlling, and then the outdoor blower voltage FANVout is determined.

That is, in the case where the radiator temperature TCI (judged with the radiator pressure PCI) is higher than the radiator target temperature TCO (compared with the target radiator pressure PCO) (Case No. 3), the outdoor blower voltage correction value FANVouthos is the negative value and it absolute value increases, so that the outdoor blower voltage FANVout decreases and the air volume decreases. Conversely, in the case where the radiator temperature TCI (the radiator pressure PCI) is lower than the radiator target temperature TCO (the target radiator pressure PCO) (Case No. 4), the outdoor blower voltage correction value FANVouthos is the positive value and increases, so that the outdoor blower voltage FANVout increases and the air volume increases. In consequence, similarly to the case of FIG. 10, the effective range of the dehumidifying and heating mode to the environmental conditions enlarges, and in the broad range of the environmental conditions, it is possible to smoothly achieve the dehumidifying and heating air conditioning of the vehicle interior by the dehumidifying and heating mode.

Furthermore, when the current dehumidifying and heating state is Case No. 5, i.e., in the case where both the radiator temperature TCI and the heat absorber temperature Te are higher than the radiator target temperature TCO and the heat absorber target temperature TEO, and the number of revolution of the compressor 2 sticks to the lower limit of controlling, and the valve position of the outdoor expansion valve 6 sticks to the closing direction to indicate the lower limit of controlling, the controller 32 advances from the step S5 to the step S9, from the step S9 to the step S11, and from the step S11 to step S12, to control the outdoor blower voltage FANVout (the air volume) that is the applied voltage of the outdoor blower 15 on the basis of the radiator pressure PCI (the high pressure) or the heat absorber temperature Te by a system shown in the lowest row of a column corresponding to Case No. 5 of FIG. 6.

In a case where the radiator temperature TCI is high and the heat absorber temperature Te is also high, the outdoor blower voltage FANVout decreases even by each of the above-mentioned control on the basis of the heat absorber temperature Te of FIG. 7 and FIG. 9 and the control on the basis of the radiator pressure PCI of FIG. 10 and FIG. 12, and hence the smaller value (Min) is employed to decrease the air volume of the outdoor blower 15.

When the air volume of the outdoor blower 15 decreases, the quantity of heat to be absorbed in the outdoor heat exchanger 7 decreases, and hence it is possible to first lower the temperature of the radiator 4. Furthermore, at this time, the radiator pressure PCI (the high pressure) also decreases, and hence the target number of revolution TGNCh (FIG. 3) of the compressor 2 increases to maintain the target radiator pressure PCO, the amount of the refrigerant to circulate through the refrigerant circuit R increases, the amount of the refrigerant to flow into the heat absorber 9 also increases, and as a result, it is also possible to lower the temperature of the heat absorber 9. In consequence, the effective range of the dehumidifying and heating mode to the environmental conditions further enlarges, and in the broad range of the environmental conditions, it is possible to smoothly achieve the dehumidifying and heating air conditioning of the vehicle interior by the dehumidifying and heating mode.

Furthermore, when the current dehumidifying and heating state is Case No. 6, i.e., in the case where both the radiator temperature TCI and the heat absorber temperature Te are lower than the radiator target temperature TCO and the heat absorber target temperature TEO, and the number of revolution of the compressor 2 sticks to the upper limit of controlling, and the valve position of the outdoor expansion valve 6 sticks to the opening direction to indicate the upper limit of controlling, the controller 32 advances from the step S5 to the step S9, from the step S9 to the step S11, from the step S11 to step S13, and from the step S13 to step S14, to control the outdoor blower voltage FANVout (the air volume) that is the applied voltage of the outdoor blower 15 on the basis of the radiator pressure PCI (the high pressure) or the heat absorber temperature Te by a system shown in the lowest row of a column corresponding to Case No. 6 of FIG. 6.

In a case where the radiator temperature TCI is low and the heat absorber temperature Te is also low, the outdoor blower voltage FANVout increases even by the above-mentioned control on the basis of the heat absorber temperature Te of FIG. 7 and FIG. 9 and the control on the basis of the radiator pressure PCI of FIG. 10 and FIG. 12, and hence the larger value (Max) is employed to increase the air volume of the outdoor blower 15.

When the air volume of the outdoor blower 15 increases, the quantity of heat to be absorbed in the outdoor heat exchanger 7 increases, and hence it is possible to first raise the temperature of the radiator 4. Furthermore, at this time, the radiator pressure PCI (the high pressure) also increases, and hence the target number of revolution TGNCh (FIG. 3) of the compressor 2 decreases to maintain the target radiator pressure PCO, the amount of the refrigerant to circulate through the refrigerant circuit R decreases, the amount of the refrigerant to flow into the heat absorber 9 also decreases, and as a result, it is also possible to raise the temperature of the heat absorber 9. In consequence, the effective range of the dehumidifying and heating mode to the environmental conditions similarly further enlarges, and in a broader range of the environmental conditions, it is possible to smoothly achieve the dehumidifying and heating air conditioning of the vehicle interior by the dehumidifying and heating mode.

Here, when the current dehumidifying and heating state is Case No. 7 or 8, i.e., in the case where the radiator temperature TCI is higher than the radiator target temperature TCO, and the heat absorber temperature Te is lower than the heat absorber target temperature TEO, and the number of revolution of the compressor 2 sticks to the lower limit of controlling and the valve position of the outdoor expansion valve 6 sticks to the opening direction to indicate the upper limit of controlling (the Case No. 7) or in the case where the radiator temperature TCI is lower than the radiator target temperature TCO, and the heat absorber temperature Te is higher than the heat absorber target temperature TEO, and the number of revolution of the compressor 2 sticks to the upper limit of controlling and the valve position of the outdoor expansion valve 6 sticks to the closing direction to indicate the lower limit of controlling (the Case No. 8), the controller 32 advances from the step S15 to step S16, to judge that the dehumidifying and heating mode is not established, thereby changing to another operation mode.

Furthermore, after executing the air volume decrease/increase control of the outdoor blower 15 in the step S6, the step S10, the step S12 and the step S14, the controller 32 advances to step S7 to judge whether or not the radiator temperature TCI and the heat absorber temperature Te converge to the radiator target temperature TCO and the heat absorber target temperature TEO. Further, in the case of the converging, the controller advances to step S8 to judge that the dehumidifying and heating mode can continue, thereby continuing the dehumidifying and heating mode. In a case where the radiator temperature TCI and the heat absorber temperature Te do not converge in the step S7, the controller advances to the step S16 to judge that the dehumidifying and heating mode is not established, thereby changing to the other operation mode.

(5-1) Another Example of Control of Outdoor Blower 15 in Transitional Stage

It is to be noted that in the above embodiment, in a transitional stage such as the stage immediately after the startup of the vehicle air conditioner 1 or immediately after the change to the dehumidifying and heating mode, the controller 32 maximizes the air volume of the outdoor blower 15 or maintains the predetermined air volume until the dehumidifying and heating mode becomes stable (the usual control), but the present invention is not limited to this embodiment, and the controller may determine the outdoor blower voltage FANVout in the transitional stage by Equation (I) mentioned below.

$$FANVout = f(Tam, TCO, TEO, Ga, Tin, RHin) \quad (I)$$

In this case, Tam is the above-mentioned outdoor air temperature, TCO is the above-mentioned radiator target temperature, TEO is the above-mentioned heat absorber target temperature, Ga is the above-mentioned mass air volume of the air, Tin is a vehicle interior temperature detected by the indoor air temperature sensor 37, RHin is a vehicle interior humidity detected by the indoor air humidity sensor 38, and the controller determines the outdoor blower voltage FANVout on the basis of these parameters. FIG. 13 shows a tendency of control by each parameter.

That is, in a case where the outdoor air temperature Tam is high, the controller 32 decreases the outdoor blower voltage FANVout of Equation (I), and controls the air volume in a decreasing direction. In the case where the outdoor air temperature Tam is high, the quantity of heat to be absorbed in the outdoor heat exchanger 7 also increases, and hence the controller decreases the air volume of the outdoor blower 15 to avoid excessive heat absorption. Conversely, in a case where the outdoor air temperature Tam is low, the controller increases the outdoor blower voltage FANVout of Equation (I), and controls the air volume in an increasing direction, to promote the heat absorption from the outdoor heat exchanger 7. Consequently, the radiator temperature TCI and the heat absorber temperature Te in such a transitional stage converge to the target values, respectively.

Furthermore, in a case where the radiator target temperature TCO is high, the controller 32 increases the outdoor blower voltage FANVout of Equation (I), and controls the air volume in the increasing direction to promote the heat absorption from the outdoor heat exchanger 7. Conversely, in a case where the radiator target temperature TCO is low, the controller decreases the outdoor blower voltage FANVout of Equation (I) and controls the air volume in the decreasing direction to avoid the excessive heat absorption from the outdoor heat exchanger 7. Consequently, the radiator temperature TCI and the heat absorber temperature Te in the transitional stage converge to the target values, respectively.

Furthermore, in a case where the heat absorber target temperature TEO is high, the controller 32 increases the outdoor blower voltage FANVout of Equation (I), controls the air volume in the increasing direction to promote the heat absorption from the outdoor heat exchanger 7, and decreases the amount of the refrigerant to circulate, thereby inhibiting drop of the heat absorber temperature Te in the same manner as described above. Conversely, in a case where the heat absorber target temperature TEO is low, the controller decreases the outdoor blower voltage FANVout of Equation (I), controls the air volume in the decreasing direction, decreases the heat absorption from the outdoor heat exchanger 7 to increase the amount of the refrigerant to circulate in the same manner as described above, and promotes the drop of the heat absorber temperature Te. Consequently, the radiator temperature TCI and the heat absorber temperature Te in the transitional stage converge to the target values, respectively.

Furthermore, in a case where the mass air volume Ga of the air flowing into the air flow passage 3 is high, the controller 32 increases the outdoor blower voltage FANVout of Equation (I) and controls the air volume in the increasing direction to increase the quantity of heat to be absorbed from the outdoor heat exchanger 7. Conversely, in a case where the mass air volume Ga is low, the controller decreases the outdoor blower voltage FANVout of Equation (I), controls the air volume in the decreasing direction, and decreases the heat absorption from the outdoor heat exchanger 7. Consequently, while converging the radiator temperature TCI and the heat absorber temperature Te in the transitional stage to the respective target values, the controller prevents excessive rise or drop of the outlet temperature.

Furthermore, in a case where the vehicle interior temperature Tin is high, the controller 32 decreases the outdoor blower voltage FANVout of Equation (I), controls the air volume in the decreasing direction, and avoids the excessive heat absorption from the outdoor heat exchanger 7. Conversely, in a case where the vehicle interior temperature Tin is low, the controller increases the outdoor blower voltage FANVout of Equation (I), controls the air volume in the increasing direction, and promotes the heat absorption from the outdoor heat exchanger 7. Consequently, while converging the radiator temperature TCI and the heat absorber temperature Te in the transitional stage to the respective target values, the controller maintains the vehicle interior temperature.

Furthermore, in a case where the vehicle interior humidity RHin is high, the controller 32 decreases the outdoor blower voltage FANVout of Equation (I), controls the air volume in the decreasing direction, increases the amount of the refrigerant to circulate in the same manner as described above to acquire the heat absorber temperature Te, and achieves the decrease of the vehicle interior humidity. Conversely, in a case where the vehicle interior humidity RHin is low, the controller increases the outdoor blower voltage FANVout of Equation (I), controls the air volume in the increasing direction, and decreases the amount of the refrigerant to circulate in the same manner as described above, thereby inhibiting the drop of the heat absorber temperature Te. Consequently, while converging the radiator temperature TCI and the heat absorber temperature Te in the transitional stage to the respective target values, the controller maintains the vehicle interior humidity.

(5-2) Another Example of Control of Outdoor Blower 15 in which Velocity is Taken into Consideration Here, in a case where a velocity of the vehicle which is detected by the velocity sensor 52, i.e., the velocity is high (higher than a predetermined value, or gradually linearly controlled), the controller 32 may execute control to decrease the outdoor blower voltage FANVout, and to decrease the air volume of the outdoor blower 15, or to stop the outdoor blower 15.

In a case where the velocity is high, the air volume into the outdoor heat exchanger 7 is covered by the running air, and hence the controller decreases or zeroizes the air volume of the outdoor blower 15, thereby making it possible to eliminate an unnecessary operation of the outdoor blower 15.

(5-3) Another Example of Control of Outdoor Blower 15 Cooperating with Grill Shutter 24

Furthermore, in a case where the controller executes the air volume decrease/increase control of the outdoor blower 15 of each above-mentioned embodiment, the controller 32 may have a state of closing the grill shutter 24 or limiting the inflow of the running air into the outdoor heat exchanger 7 in accordance with an opening of the grill shutter 24.

When the controller executes the air volume decrease/increase control of the outdoor blower 15 in the state of closing the grill shutter 24 or limiting the inflow of the running air into the outdoor heat exchanger 7 in accordance with the opening of the grill shutter 24, it is possible to control all or almost all of the air volume into the outdoor heat exchanger 7 with the outdoor blower 15, and hence it is possible to improve control properties of the radiator temperature TCI and the heat absorber temperature Te by the outdoor blower 15 during the running.

It is to be noted that in the above embodiment, the present invention is applied to the vehicle air conditioner 1 which changes and executes the respective operation modes of the heating mode, the dehumidifying and heating mode, the dehumidifying and cooling mode and the cooling mode, but in addition to the modes, a so-called internal cycle mode may be executed. Also in this case, the effective range of the dehumidifying and heating mode enlarges, and the vehicle air conditioner can avoid the execution of the internal cycle mode as much as possible.

Furthermore, the constitution and respective numeric values of the refrigerant circuit described in the above embodiment are not limited, and are changeable without departing from the gist of the present invention.

(6) Control of Outdoor Blower 15 in Dehumidifying and Cooling Mode

Next, control of the outdoor blower 15 in the above dehumidifying and cooling mode by the controller 32 will be described with reference to FIG. 16 to FIG. 24. In the embodiment, the controller 32 judges whether or not the radiator pressure PCI (the high pressure) detected by the radiator pressure sensor 47 converges to the target radiator pressure PCO or whether the radiator pressure is higher or lower than the target pressure, to judge whether or not the radiator temperature TCI converges to the radiator target temperature TCO (this state is called the satisfactory situation) or whether the radiator temperature is higher or lower than the target temperature. Furthermore, on the basis of the heat absorber temperature Te detected by the heat absorber temperature sensor 48, the controller judges whether or not the heat absorber temperature Te converges to the heat absorber target temperature TEO (this state is called the satisfactory situation) or whether the heat absorber temperature is higher or lower than the target temperature.

Figure 16:
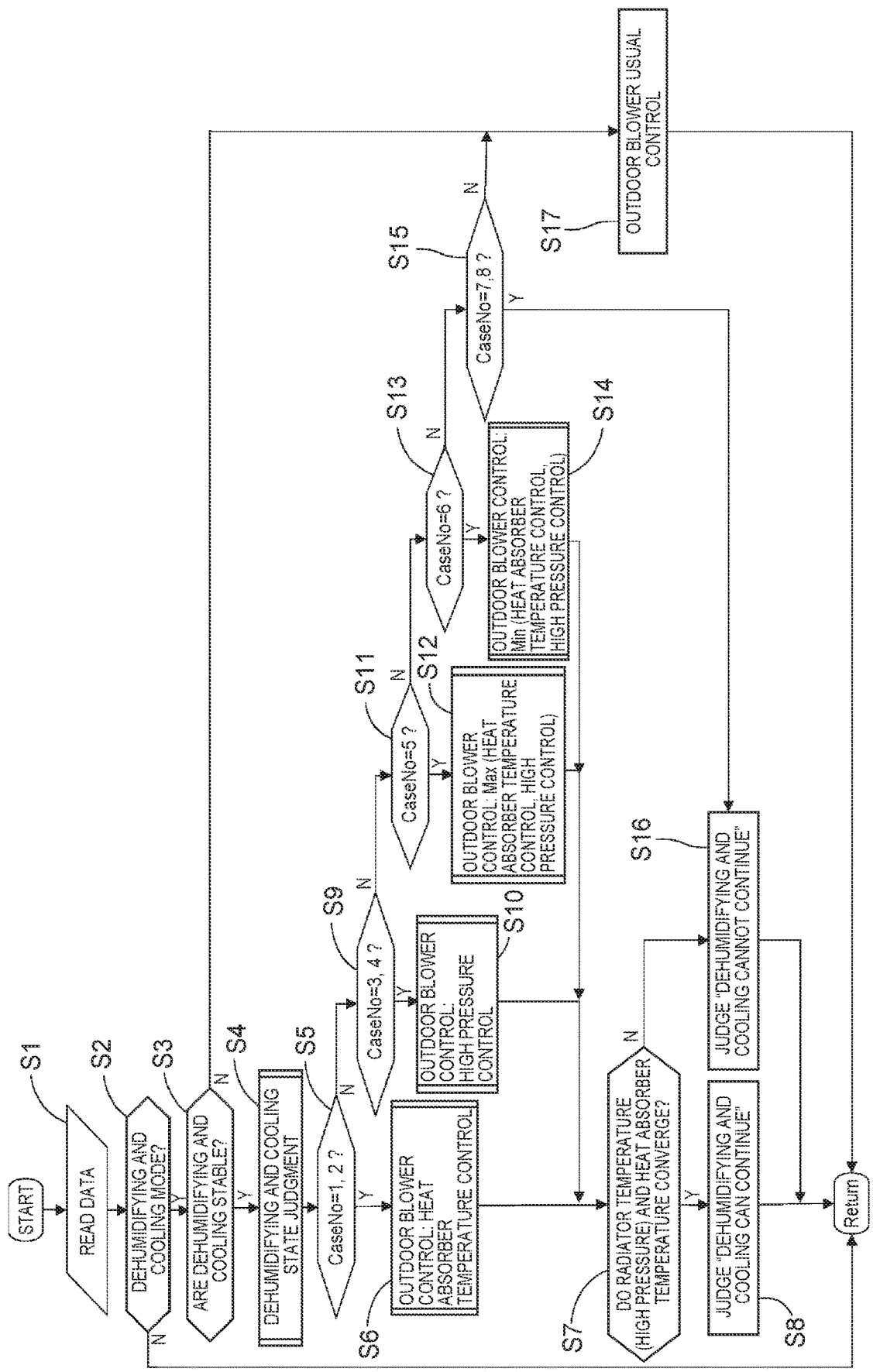
FIG. 16 is a flowchart of outdoor blower control in the dehumidifying and cooling mode of the controller of FIG. 2.

The controller 32 reads data from each sensor in step S1 of FIG. 16, and judges whether or not a current operation mode is the dehumidifying and cooling mode in step S2. Further, when the current operation mode is the dehumidifying and cooling mode, the controller advances to step S3 and judges whether or not the dehumidifying and cooling mode is stable. At this time, in a transitional stage such as the stage immediately after the startup of the vehicle air conditioner 1 or immediately after the change to the dehumidifying and cooling mode, the controller 32 advances to step S17 and executes the usual control of the outdoor blower 15. In this usual control, the controller 32 does not execute the after-mentioned air volume decrease/increase control of the outdoor blower 15, but maximizes the voltage to be applied to the outdoor blower 15 to maximize an air volume. Consequently, in a transitional stage such as the startup initial stage or the stage immediately after the change to the dehumidifying and cooling mode, the controller shifts to the stable state in early stages. It is to be noted that at this time, the controller may execute the control with a predetermined air volume by a predetermined applied voltage, without maximizing the air volume of the outdoor blower 15.

On the other hand, in a case where the dehumidifying and cooling mode is stabilized in the step S3, the controller 32 advances to step S4 and judges a current dehumidifying and cooling state with reference to a judgment table of the dehumidifying and cooling state of FIG. 17. In the judgment table of the dehumidifying and cooling state of FIG. 17, Case No. 0 is a case where both the radiator temperature TCI (judged from PCI (the high pressure)) and the heat absorber temperature Te converge to the radiator target temperature TCO and the heat absorber target temperature TEO, and the number of revolution of the compressor 2 and the valve position of the outdoor expansion valve 6 are in the control range.

Case No. 1 of FIG. 17 is a case where the radiator temperature TCI converges to the radiator target temperature TCO, but the heat absorber temperature Te is higher than the heat absorber target temperature TEO, and the outdoor expansion valve 6 is in the control range, but the number of revolution of the compressor 2 sticks to the upper limit of controlling, and Case No. 2 is a case where the radiator temperature TCI converges to the radiator target temperature TCO, but the heat absorber temperature Te is lower than the heat absorber target temperature TEO, and the valve position of the outdoor expansion valve 6 is in the control range, but the number of revolution of the compressor 2 sticks to the lower limit of controlling. In each of these cases, it is not possible to control the heat absorber temperature Te with the number of revolution of the compressor 2.

Case No. 3 of FIG. 17 is a case where the heat absorber temperature Te converges to the heat absorber target temperature TEO, but the radiator temperature TCI is higher than the radiator target temperature TCO, and the number of revolution of the compressor 2 is in the control range, but the valve position of the outdoor expansion valve 6 sticks to the opening direction to indicate the upper limit of controlling, and Case No. 4 is a case where the heat absorber temperature Te converges to the heat absorber target temperature TEO, but the radiator temperature TCI is lower than the radiator target temperature TCO, and the number of revolution of the compressor 2 is in the control range, but the valve position of the outdoor expansion valve 6 sticks to the closing direction to indicate the lower limit of controlling. In each of these cases, it is not possible to control the radiator temperature TCI with the valve position of the outdoor expansion valve 6.

Case No. 5 of FIG. 17 is a case where both the radiator temperature TCI and the heat absorber temperature Te are higher than the radiator target temperature TCO and the heat absorber target temperature TEO, and the valve position of the outdoor expansion valve 6 sticks to the opening direction to indicate the upper limit of controlling, and the number of revolution of the compressor 2 sticks to the upper limit of controlling, and Case No. 6 is a case where both the radiator temperature TCI and the heat absorber temperature Te are lower than the radiator target temperature TCO and the heat absorber target temperature TEO, and the valve position of the outdoor expansion valve 6 sticks to the closing direction to indicate the lower limit of controlling, and the number of revolution of the compressor 2 also sticks to the lower limit of controlling. In each of these cases, it is not possible to control the radiator temperature TCI and the heat absorber temperature Te with the valve position of the outdoor expansion valve 6 and the number of revolution of the compressor 2.

Case No. 7 of FIG. 17 is a case where the radiator temperature TCI is higher than the radiator target temperature TCO, and the heat absorber temperature Te is lower than the heat absorber target temperature TEO, and the valve position of the outdoor expansion valve 6 sticks to the opening direction to indicate the upper limit of controlling, and the number of revolution of the compressor 2 sticks to the lower limit of controlling, and Case No. 8 is a case where the radiator temperature TCI is lower than the radiator target temperature TCO, and the heat absorber temperature Te is higher than the heat absorber target temperature TEO, and the valve position of the outdoor expansion valve 6 sticks to the closing direction to indicate the lower limit of controlling, and the number of revolution of the compressor 2 sticks to the upper limit of controlling. Also in these cases, it is not possible to control the radiator temperature TCI and the heat absorber temperature Te with the valve position of the outdoor expansion valve 6 and the number of revolution of the compressor 2.

In step S4, the controller 32 judges which one of cases of FIG. 17 applies to the current dehumidifying and cooling state, on the basis of the radiator pressure PCI and the heat absorber temperature Te, and in Case No. 0, i.e., in the case where both the radiator temperature TCI and the heat absorber temperature Te converge to the radiator target temperature TCO and the heat absorber target temperature TEO, and both the valve position of the outdoor expansion valve 6 and the number of revolution of the compressor 2 are in the control range, the controller advances from step S5, step S9, step S11, step S13 and step S15 to the step S17, to execute the above-mentioned usual control of the outdoor blower 15.

On the other hand, in a case where the current dehumidifying and cooling state is Case No. 1 or Case No. 2, i.e., in the case where the radiator temperature TCI converges to the radiator target temperature TCO, but the heat absorber temperature Te is higher than the heat absorber target temperature TEO, and the valve position of the outdoor expansion valve 6 is in the control range, but the number of revolution of the compressor 2 sticks to the upper limit of controlling, or in the case where the radiator temperature TCI converges to the radiator target temperature TCO, but the heat absorber temperature Te is lower than the heat absorber target temperature TEO, and the valve position of the outdoor expansion valve 6 is in the control range, but the number of revolution of the compressor 2 sticks to the lower limit of controlling, the controller 32 advances from the step S5 to step S6, to control the outdoor blower voltage FANVout (the air volume) that is the applied voltage of the outdoor blower 15, on the basis of the heat absorber temperature Te by a system shown in the lowest row of a column corresponding to Case No. 1 or 2 of FIG. 17.

Figure 18:
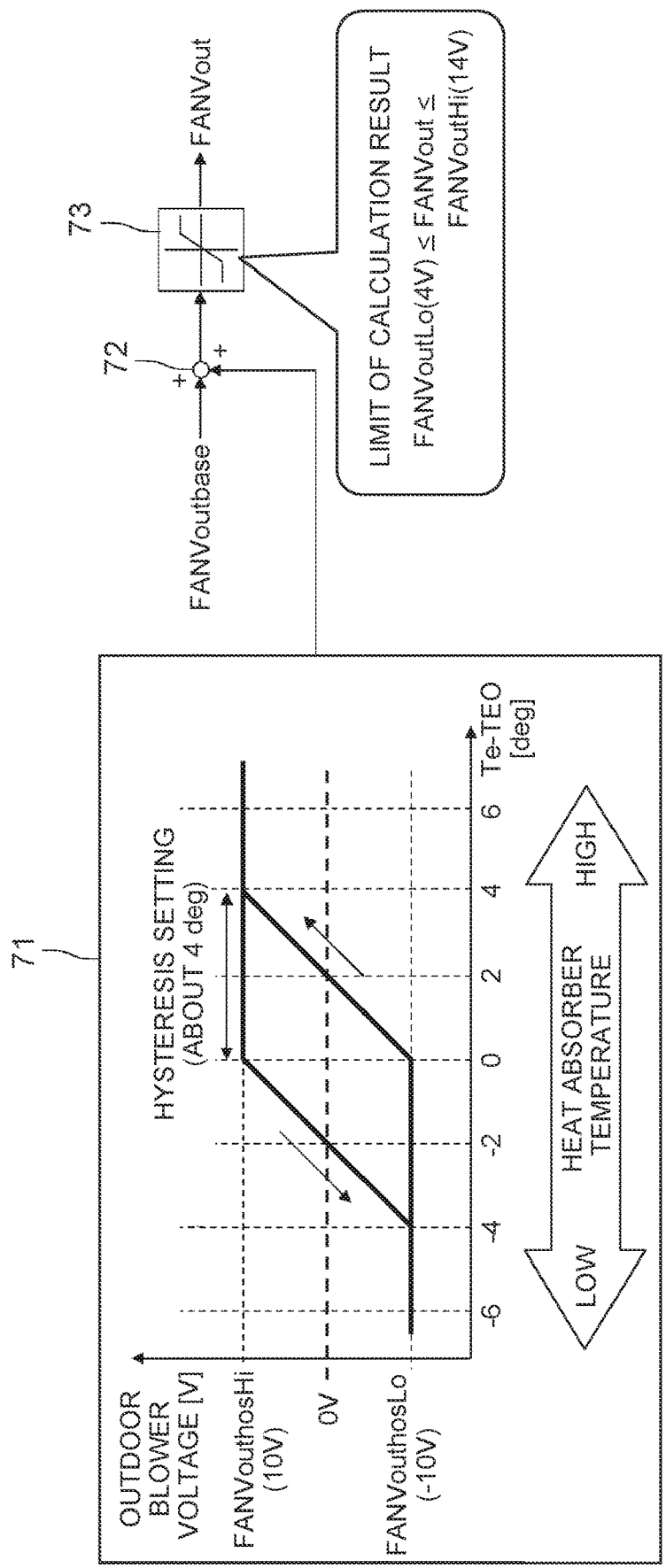
FIG. 18 is one example of a control block diagram concerning the outdoor blower control when a radiator temperature (a high pressure) converges in the dehumidifying and cooling mode of the controller of FIG. 2.

FIG. 18 shows one example of a control block diagram of the outdoor blower 15 in this case. The outdoor blower voltage correcting section 71 of the controller 32 determines the outdoor blower voltage correction value FANVouthos between the upper limit FANVouthosHi (the positive value, e.g., 10 V) and the lower limit FANVouthosLo (the negative value, e.g., −10 V) on the basis of the difference (Te−TEO) between the heat absorber temperature Te and the heat absorber target temperature TEO. In the method, when the difference (Te−TEO) is large, i.e., the heat absorber temperature Te is high and lowers to 0, the section sets the outdoor blower voltage correction value FANVouthos to the upper limit FANVouthosHi, and as the difference (Te−TEO) further lowers from 0 to the negative value, the section decreases the outdoor blower voltage correction value FANVouthos down to the lower limit FANVouthosLo with a predetermined inclination.

When the difference (Te−TEO) is small (the negative value), i.e., the heat absorber temperature Te is low and rises to 0, the section sets the outdoor blower voltage correction value FANVouthos to the lower limit FANVouthosLo, and as the difference (Te−TEO) further rises from 0, the section increases the outdoor blower voltage correction value FANVouthos up to the upper limit FANVouthosHi with a predetermined inclination.

The adder 72 adds the outdoor blower voltage correction value FANVouthos determined by the outdoor blower voltage correcting section 71 in this manner to the outdoor blower voltage FANVoutbase that is the base, the limit setting section 73 attaches limits of an upper limit of controlling and a lower limit of controlling, and then the outdoor blower voltage FANVout is determined.

That is, in the case where the heat absorber temperature Te is higher than the heat absorber target temperature TEO as in Case No. 1 of FIG. 17, the outdoor blower voltage correction value FANVouthos is the positive value and increases, so that the outdoor blower voltage FANVout increases and the air volume increases. When the air volume of the outdoor blower 15 increases, the quantity of heat to be radiated in the outdoor heat exchanger 7 increases, and hence the heat absorber temperature Te lowers.

Furthermore, in the case where the heat absorber temperature Te is lower than the heat absorber target temperature TEO as in Case No. 2 of FIG. 17, the outdoor blower voltage correction value FANVouthos is the negative value and its absolute value increases, so that the outdoor blower voltage FANVout decreases and the air volume decreases. When the air volume of the outdoor blower 15 decreases, the quantity of heat to be radiated in the outdoor heat exchanger 7 decreases, and hence the heat absorber temperature Te also rises.

Figure 19:
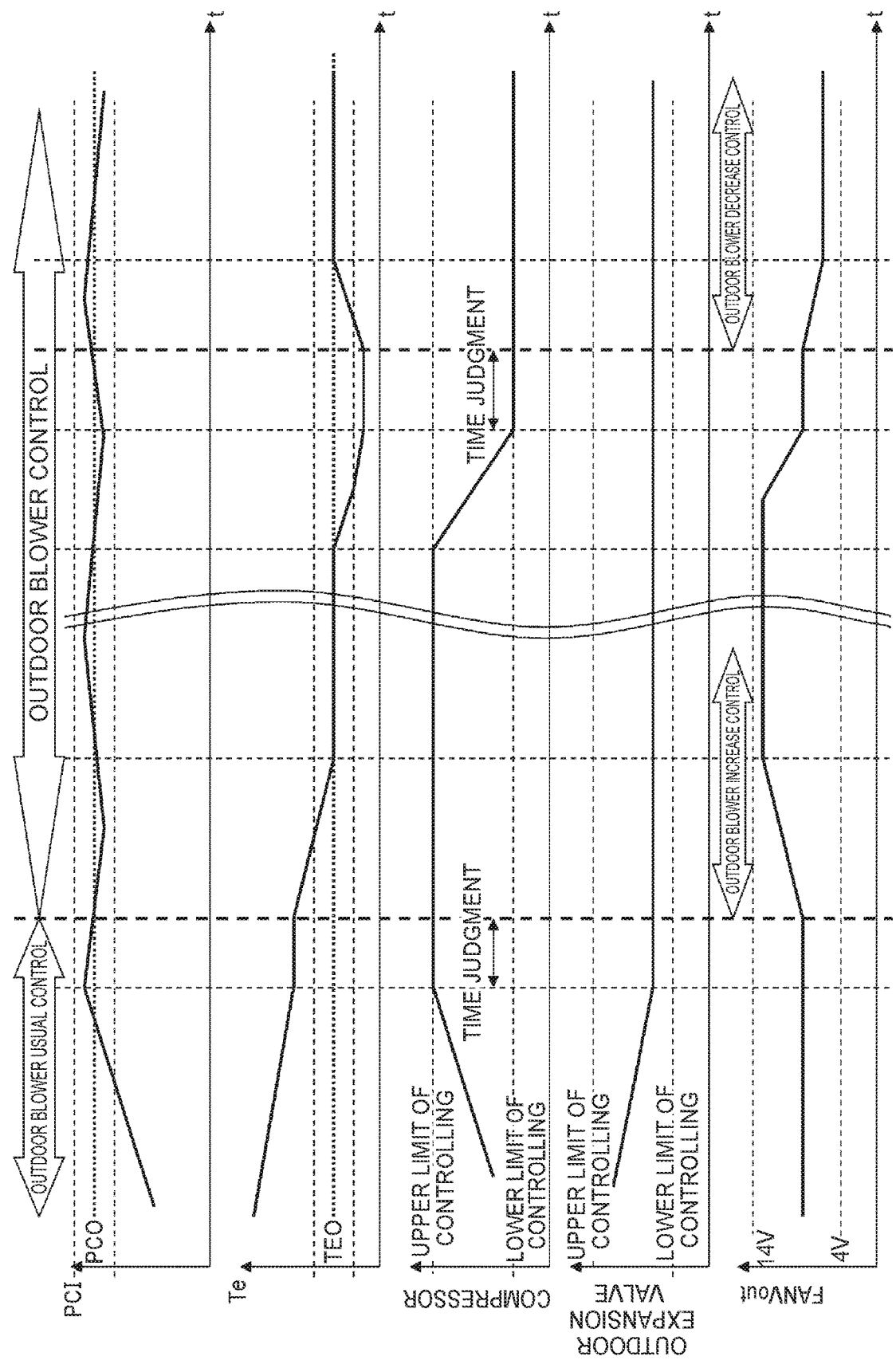
FIG. 19 is a timing chart of each device in the control of FIG. 18.

FIG. 19 shows a behavior of the air volume decrease/increase control of the outdoor blower 15 on the basis of such heat absorber temperature Te. In this drawing, a range of the outdoor blower usual control indicates the above-mentioned transitional stage. In the case where the dehumidifying and cooling mode becomes stable, and the radiator pressure PCI converges to the target radiator pressure PCO (i.e., the radiator temperature TCI converges to the radiator target temperature TCO), but the heat absorber temperature Te is higher than the heat absorber target temperature TEO, and the valve position of the outdoor expansion valve 6 is in the control range, but the number of revolution of the compressor 2 sticks to the upper limit of controlling (judged for a predetermined time), the controller 32 increases the outdoor blower voltage FANVout to increase the air volume (outdoor blower air volume increase control). Furthermore, in the case where the radiator pressure PCI converges to the target radiator pressure PCO (i.e., the radiator temperature TCI converges to the radiator target temperature TCO), but the heat absorber temperature Te is lower than the heat absorber target temperature TEO, and the valve position of the outdoor expansion valve 6 is in the control range, but the number of revolution of the compressor 2 sticks to the lower limit of controlling (judged for the predetermined time), the controller 32 decreases the outdoor blower voltage FANVout to decrease the air volume (outdoor blower air volume decrease control).

In consequence, an effective range (a range of defense) of the dehumidifying and cooling mode to environmental conditions enlarges, it is possible to smoothly achieve dehumidifying and cooling air conditioning of the vehicle interior by the dehumidifying and cooling mode in a broad range of the environmental conditions, and it is possible to abolish the above-mentioned internal cycle mode.

Figure 20:
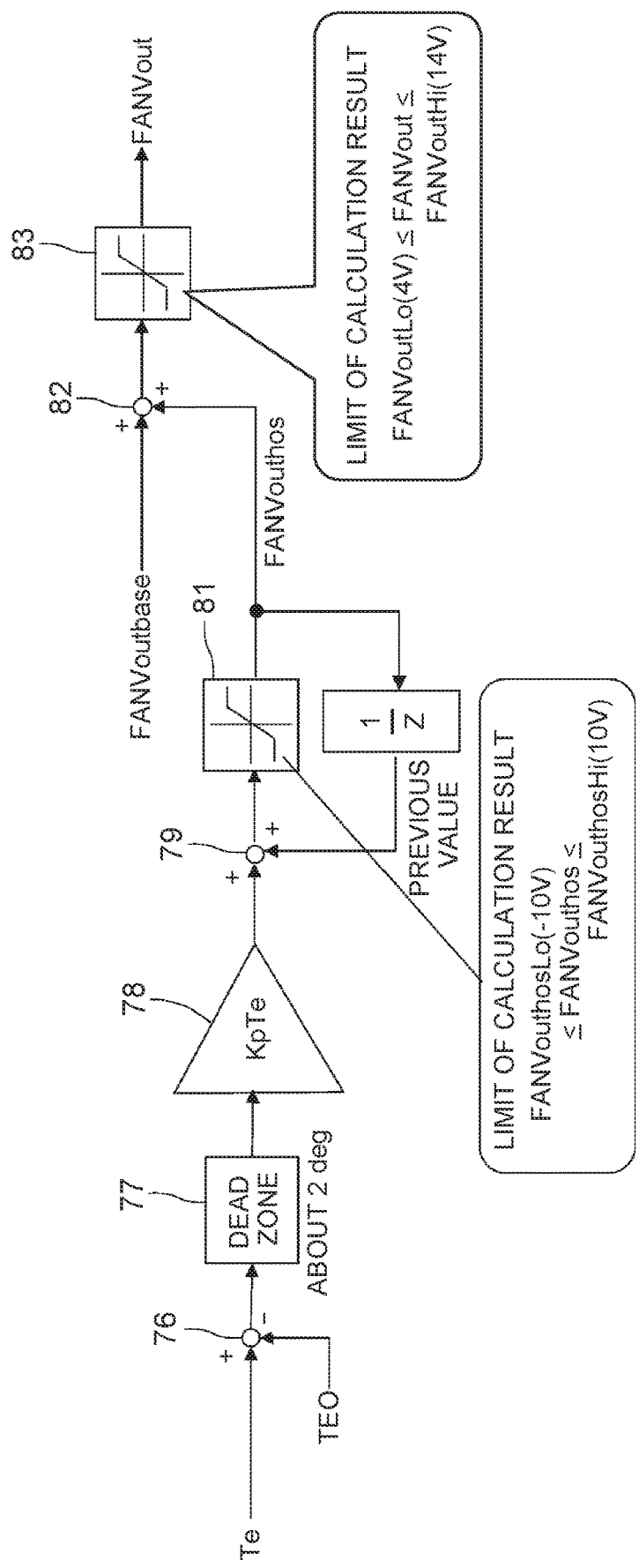
FIG. 20 is another example of the control block diagram concerning the outdoor blower control of FIG. 18.

Here, FIG. 20 shows another example of a control block diagram of the outdoor blower 15 in such Case No. 1 or 2. In this case, the subtracter 76 calculates the difference (Te−TEO) between the heat absorber temperature Te and the heat absorber target temperature TEO, and the amplifier 78 amplifies this difference (Te−TEO) via the dead zone portion 77. The adder 79 adds the previous value (1/Z) to the amplified value. That is, in this case, feedback (F/B) control is executed. The limit setting section 81 attaches, to the value passing through the adder 79, limits of an upper limit of controlling and a lower limit of controlling to obtain the outdoor blower voltage correction value FANVouthos, an adder 82 adds this value to the outdoor blower voltage FANVoutbase that is the base, the limit setting section 83 attaches limits of an upper limit of controlling and a lower limit of controlling, and then the outdoor blower voltage FANVout is determined.

That is, in the case where the heat absorber temperature Te is higher than the heat absorber target temperature TEO (Case No. 1), the outdoor blower voltage correction value FANVouthos is the positive value and increases, so that the outdoor blower voltage FANVout increases and the air volume increases. Conversely, in the case where the heat absorber temperature Te is lower than the heat absorber target temperature TEO (Case No. 2), the outdoor blower voltage correction value FANVouthos is the negative value and its absolute value increases, so that the outdoor blower voltage FANVout decreases and the air volume decreases. In consequence, similarly to the case of FIG. 18, the effective range of the dehumidifying and cooling mode to the environmental conditions enlarges, and in the broad range of the environmental conditions, it is possible to smoothly achieve the dehumidifying and cooling air conditioning of the vehicle interior by the dehumidifying and cooling mode.

On the other hand, when the current dehumidifying and cooling state is Case No. 3 or Case No. 4, i.e., in the case where the heat absorber temperature Te converges to the heat absorber target temperature TEO, but the radiator temperature TCI is higher than the radiator target temperature TCO, and the number of revolution of the compressor 2 is in the control range, but the valve position of the outdoor expansion valve 6 sticks to the opening direction to indicate the upper limit of controlling, or in the case where the heat absorber temperature Te converges to the heat absorber target temperature TEO, but the radiator temperature TCI is lower than the radiator target temperature TCO, and the number of revolution of the compressor 2 is in the control range, but the valve position of the outdoor expansion valve 6 sticks to the closing direction to indicate the lower limit of controlling, the controller 32 advances from the step S5 to the step S9 and from the step S9 to step S10, to control the outdoor blower voltage FANVout (the air volume) that is the applied voltage of the outdoor blower 15 on the basis of the radiator pressure PCI (the high pressure) by a system shown in the lowest row of a column corresponding to Case No. 3 or 4 of FIG. 17.

Figure 21:
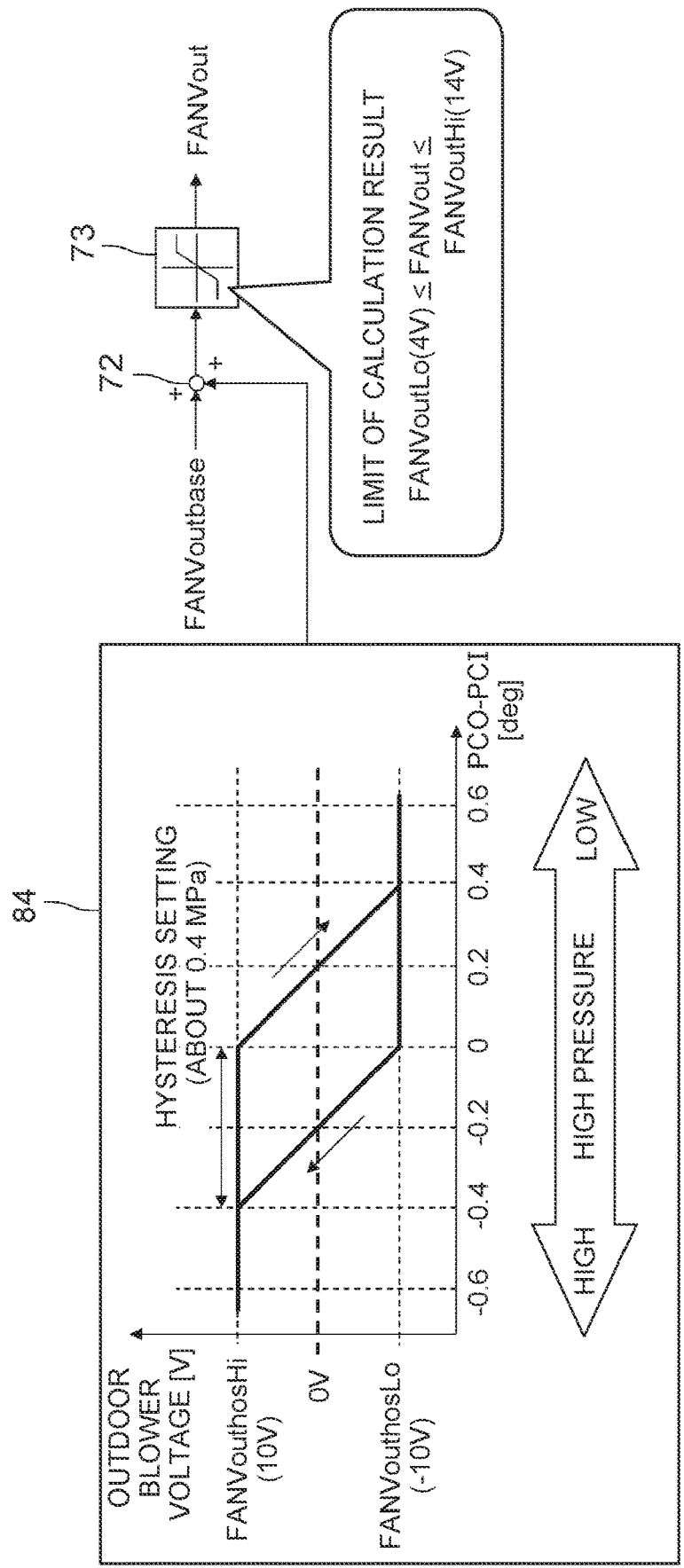
FIG. 21 is one example of a control block diagram concerning the outdoor blower control when a heat absorber temperature converges in the dehumidifying and cooling mode of the controller of FIG. 2.

FIG. 21 shows one example of a control block diagram of the outdoor blower 15 in this case. An outdoor blower voltage correcting section 84 of the controller 32 in this case determines the outdoor blower voltage correction value FANVouthos between the upper limit FANVouthosHi (the positive value, e.g., 10 V) and the lower limit FANVouthosLo (the negative value, e.g., −10 V) on the basis of the difference (PCO−PCI) between the target radiator pressure PCO and the radiator pressure PCI. In the method, when the difference (PCO−PCI) is small (the negative value), i.e., the radiator pressure PCI is high (the radiator temperature TCI is high) and increases to 0, the section sets the outdoor blower voltage correction value FANVouthos to the upper limit FANVouthosHi, and as the difference (PCO−PCI) further increases from 0, the section decreases the outdoor blower voltage correction value FANVouthos down to the lower limit FANVouthosLo with a predetermined inclination.

When the difference (PCO−PCI) is large, i.e., the radiator pressure PCI is low and decreases to 0, the section sets the outdoor blower voltage correction value FANVouthos to the lower limit FANVouthosLo, and as the difference (PCO−PCI) further decreases from 0 to the negative value, the section increases the outdoor blower voltage correction value FANVouthos up to the upper limit FANVouthosHi with a predetermined inclination.

The adder 72 adds the outdoor blower voltage correction value FANVouthos determined by the outdoor blower voltage correcting section 84 in this manner to the outdoor blower voltage FANVoutbase that is the base, the limit setting section 73 attaches limits of an upper limit of controlling and a lower limit of controlling, and then the outdoor blower voltage FANVout is determined.

That is, in the case where the radiator temperature TCI is higher than the radiator target temperature TCO as in Case No. 3 of FIG. 17, the outdoor blower voltage correction value FANVouthos is the positive value and increases, so that the outdoor blower voltage FANVout increases and the air volume increases. When the air volume of the outdoor blower 15 increases, the quantity of heat to be radiated in the outdoor heat exchanger 7 increases, so that the radiator pressure PCI (the high pressure) decreases and the radiator temperature TCI also lowers.

Furthermore, in the case where the radiator temperature TCI is lower than the radiator target temperature TCO as in Case No. 4 of FIG. 17, the outdoor blower voltage correction value FANVouthos is the negative value and its absolute value increases, so that the outdoor blower voltage FANVout decreases and the air volume decreases. When the air volume of the outdoor blower 15 decreases, the quantity of heat to be radiated in the outdoor heat exchanger 7 decreases, so that the radiator pressure PCI (the high pressure) increases and the radiator temperature TCI also rises.

Figure 22:
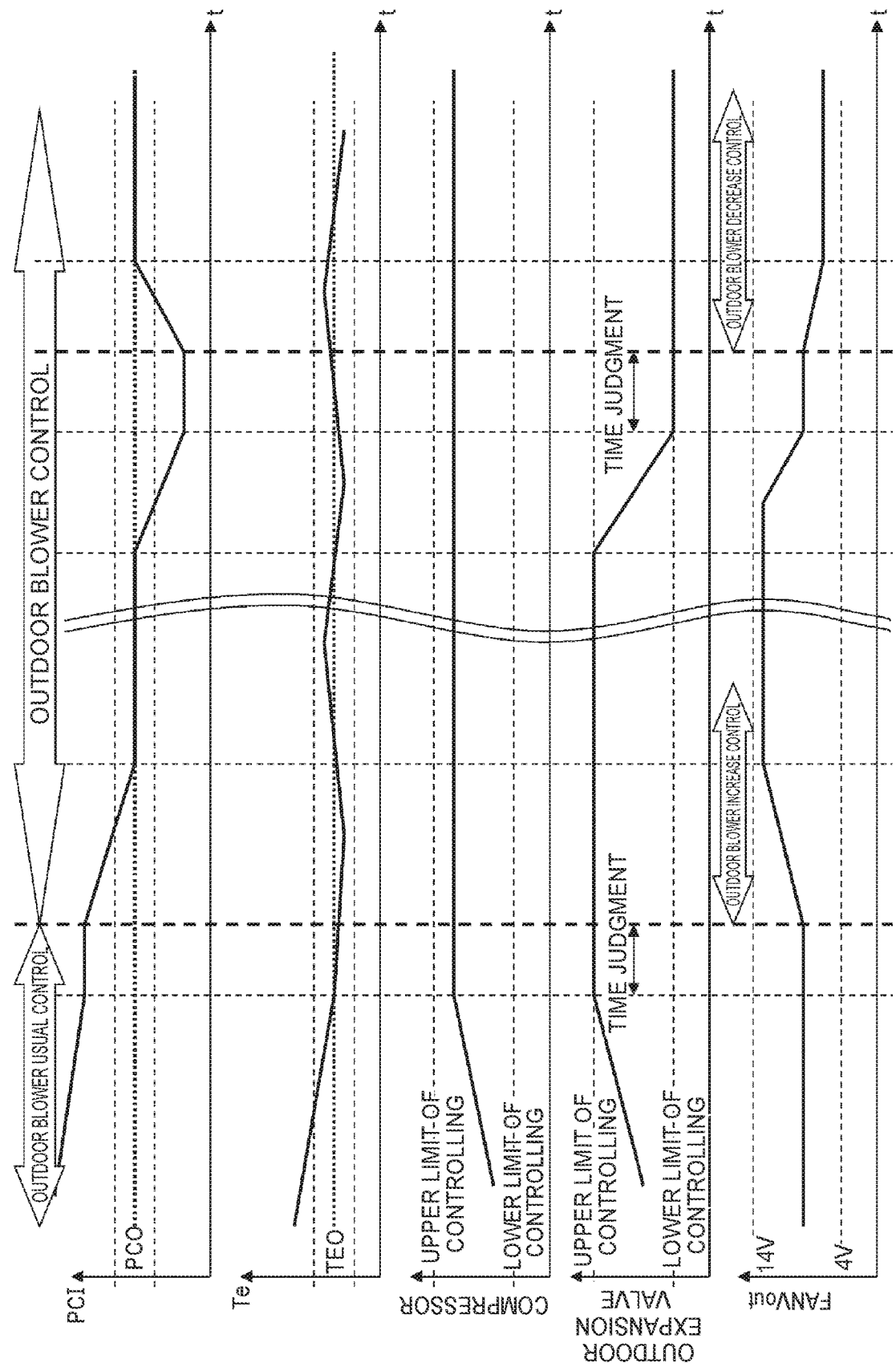
FIG. 22 is a timing chart of each device in the control of FIG. 21.

FIG. 22 shows a behavior of the air volume decrease/increase control of the outdoor blower 15 on the basis of such radiator pressure PCI. In this drawing, the range of the outdoor blower usual control indicates the above-mentioned transitional stage. In the case where the dehumidifying and heating mode becomes stable, and the heat absorber temperature Te converges to the heat absorber target temperature TEO, but the radiator pressure PCI is higher than the target radiator pressure PCO, and the number of revolution of the compressor 2 is in the control range, but the valve position of the outdoor expansion valve 6 sticks to the opening direction to indicate the upper limit of controlling (judged for a predetermined time), the controller 32 increases the outdoor blower voltage FANVout to increase the air volume (the outdoor blower air volume increase control). Furthermore, in the case where the heat absorber temperature Te converges to the heat absorber target temperature TEO, but the radiator pressure PCI is lower than the target radiator pressure PCO, and the number of revolution of the compressor 2 is in the control range, but the valve position of the outdoor expansion valve 6 sticks to the closing direction to indicate the lower limit of controlling (judged for the predetermined time), the controller 32 decreases the outdoor blower voltage FANVout to decrease the air volume (the outdoor blower air volume decrease control).

In consequence, the effective range of the dehumidifying and cooling mode to environmental conditions enlarges, it is possible to smoothly achieve the dehumidifying and cooling air conditioning of the vehicle interior by the dehumidifying and cooling mode in the broad range of the environmental conditions, and it is possible to abolish the above-mentioned internal cycle mode.

Figure 23:
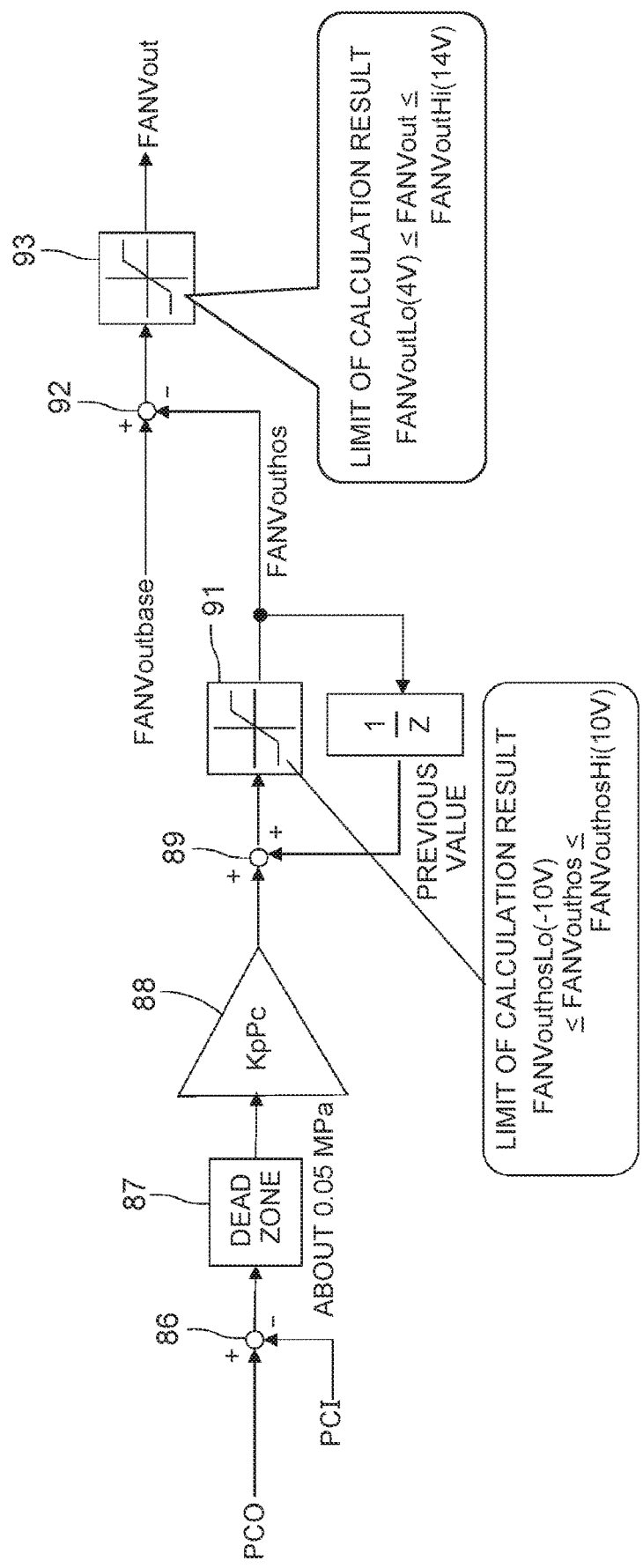
FIG. 23 is another example of the control block diagram concerning the outdoor blower control of FIG. 21.

Here, FIG. 23 shows another example of a control block diagram of the outdoor blower 15 in such Case No. 3 or 4. In this case, the subtracter 86 calculates the difference (PCO−PCI) between the target radiator pressure PCO and the radiator pressure PCI, and the amplifier 88 amplifies this difference (PCO−PCI) via the dead zone portion 87. The adder 89 adds the previous value (1/Z) to the amplified value. That is, in this case, the feedback (F/B) control is executed. The limit setting section 91 attaches, to the value passing through the adder 89, limits of an upper limit of controlling and a lower limit of controlling to obtain the outdoor blower voltage correction value FANVouthos, a subtracter 92 subtracts this value from the outdoor blower voltage FANVoutbase that is the base, the limit setting section 93 attaches limits of an upper limit of controlling and a lower limit of controlling, and then the outdoor blower voltage FANVout is determined.

That is, in the case where the radiator temperature TCI (judged with the radiator pressure PCI) is higher than the radiator target temperature TCO (compared with the target radiator pressure PCO) (Case No. 3), the outdoor blower voltage correction value FANVouthos is the negative value and it absolute value increases, so that the outdoor blower voltage FANVout increases and the air volume increases. Conversely, in the case where the radiator temperature TCI (the radiator pressure PCI) is lower than the radiator target temperature TCO (the target radiator pressure PCO) (Case No. 4), the outdoor blower voltage correction value FANVouthos is the positive value and increases, so that the outdoor blower voltage FANVout decreases and the air volume decreases. In consequence, similarly to the case of FIG. 21, the effective range of the dehumidifying and cooling mode to the environmental conditions enlarges, and in the broad range of the environmental conditions, it is possible to smoothly achieve the dehumidifying and cooling air conditioning of the vehicle interior by the dehumidifying and cooling mode.

Furthermore, when the current dehumidifying and cooling state is Case No. 5, i.e., in the case where both the radiator temperature TCI and the heat absorber temperature Te are higher than the radiator target temperature TCO and the heat absorber target temperature TEO, and the valve position of the outdoor expansion valve 6 sticks to the opening direction to indicate the upper limit of controlling, and the number of revolution of the compressor 2 sticks to the upper limit of controlling, the controller 32 advances from the step S5 to the step S9, from the step S9 to the step S11, and from the step S11 to step S12, to control the outdoor blower voltage FANVout (the air volume) that is the applied voltage of the outdoor blower 15 on the basis of the radiator pressure PCI (the high pressure) or the heat absorber temperature Te by a system shown in the lowest row of a column corresponding to Case No. 5 of FIG. 17.

In a case where the radiator temperature TCI is high and the heat absorber temperature Te is also high, the outdoor blower voltage FANVout increases even by each of the above-mentioned control on the basis of the heat absorber temperature Te of FIG. 18 and FIG. 20 and the control on the basis of the radiator pressure PCI of FIG. 21 and FIG. 23, and hence the larger value (Max) is employed to increase the air volume of the outdoor blower 15.

When the air volume of the outdoor blower 15 increases, the quantity of heat to be radiated in the outdoor heat exchanger 7 increases, so that the radiator pressure PCI (the high pressure) decreases and the temperature of the radiator 4 lowers and it is possible to lower the temperature of the heat absorber 9. Consequently, the effective range of the dehumidifying and cooling mode to the environmental conditions further enlarges, and in the broad range of the environmental conditions, it is possible to smoothly achieve the dehumidifying and cooling air conditioning of the vehicle interior by the dehumidifying and cooling mode.

Furthermore, when the current dehumidifying and cooling state is Case No. 6, i.e., in the case where both the radiator temperature TCI and the heat absorber temperature Te are lower than the radiator target temperature TCO and the heat absorber target temperature TEO, and the valve position of the outdoor expansion valve 6 sticks to the closing direction to indicate the lower limit of controlling, and the number of revolution of the compressor 2 sticks to the lower limit of controlling, the controller 32 advances from the step S5 to the step S9, from the step S9 to the step S11, from the step S11 to the step S13, and from the step S13 to step S14, to control the outdoor blower voltage FANVout (the air volume) that is the applied voltage of the outdoor blower 15 on the basis of the radiator pressure PCI (the high pressure) or the heat absorber temperature Te by a system shown in the lowest row of a column corresponding to Case No. 6 of FIG. 17.

In a case where the radiator temperature TCI is low and the heat absorber temperature Te is also low, the outdoor blower voltage FANVout decreases even by the above-mentioned control on the basis of the heat absorber temperature Te of FIG. 18 and FIG. 20 and the control on the basis of the radiator pressure PCI of FIG. 21 and FIG. 23, and hence the smaller value (Min) is employed to decrease the air volume of the outdoor blower 15.

When the air volume of the outdoor blower 15 decreases, the quantity of heat to be radiated in the outdoor heat exchanger 7 decreases, so that the pressure (the high pressure) of the radiator 4 increases and the temperature of the radiator 4 rises and it is also possible to raise the temperature of the heat absorber 9. In consequence, the effective range of the dehumidifying and cooling mode to the environmental conditions similarly further enlarges, and in a broader range of the environmental conditions, it is possible to smoothly achieve the dehumidifying and cooling air conditioning of the vehicle interior by the dehumidifying and cooling mode.

Here, when the current dehumidifying and cooling state is Case No. 7 or 8, i.e., in the case where the radiator temperature TCI is higher than the radiator target temperature TCO, the heat absorber temperature Te is lower than the heat absorber target temperature TEO, and the valve position of the outdoor expansion valve 6 sticks to the opening direction to indicate the upper limit of controlling and the number of revolution of the compressor 2 sticks to the lower limit of controlling (the Case No. 7) or in the case where the radiator temperature TCI is lower than the radiator target temperature TCO, and the heat absorber temperature Te is higher than the heat absorber target temperature TEO, and the valve position of the outdoor expansion valve 6 sticks to the closing direction to indicate the lower limit of controlling and the number of revolution of the compressor 2 sticks to the upper limit of controlling (the Case No. 8), the controller 32 advances from the step S15 to step S16, to judge that the dehumidifying and cooling mode is not established, thereby changing to another operation mode.

Furthermore, after executing the air volume decrease/increase control of the outdoor blower 15 in the step S6, the step S10, the step S12 and the step S14, the controller 32 advances to step S7 to judge whether or not the radiator temperature TCI and the heat absorber temperature Te converge to the radiator target temperature TCO and the heat absorber target temperature TEO. Further, in the case of the converging, the controller advances to step S8 to judge that the dehumidifying and cooling mode can continue, thereby continuing the dehumidifying and cooling mode. In a case where the radiator temperature TCI and the heat absorber temperature Te do not converge in the step S7, the controller advances to the step S16 to judge that the dehumidifying and cooling mode is not established, thereby changing to the other operation mode.

(6-1) Another Example of Control of Outdoor Blower 15 in Transitional Stage

It is to be noted that in the above embodiment, in a transitional stage such as the stage immediately after the startup of the vehicle air conditioner 1 or immediately after the change to the dehumidifying and cooling mode, the controller 32 maximizes the air volume of the outdoor blower 15 or maintains the predetermined air volume until the dehumidifying and cooling mode becomes stable (the usual control), but the present invention is not limited to this embodiment, and the controller may determine the outdoor blower voltage FANVout in the transitional stage by Equation (I) mentioned above.

FIG. 24 shows a tendency of control by each parameter. That is, in a case where the outdoor air temperature Tam is high, the controller 32 increases the outdoor blower voltage FANVout of Equation (I), and controls the air volume in the increasing direction. In the case where the outdoor air temperature Tam is high, the refrigerant is hard to radiate heat in the outdoor heat exchanger 7, and hence the controller increases the air volume of the outdoor blower 15 to promote the heat radiation in the outdoor heat exchanger 7.

Conversely, in a case where the outdoor air temperature Tam is low, the refrigerant is easy to radiate heat in the outdoor heat exchanger 7, and hence the controller decreases the outdoor blower voltage FANVout of Equation (I), and controls the air volume in the decreasing direction, to eliminate the excessive heat radiation in the outdoor heat exchanger 7. Consequently, the radiator temperature TCI and the heat absorber temperature Te in such a transitional stage converge to the target values, respectively.

Furthermore, in a case where the radiator target temperature TCO is high, the controller 32 decreases the outdoor blower voltage FANVout of Equation (I), and controls the air volume in the decreasing direction to inhibit the heat radiation in the outdoor heat exchanger 7. Conversely, in a case where the radiator target temperature TCO is low, the controller increases the outdoor blower voltage FANVout of Equation (I) and controls the air volume in the increasing direction to promote the heat radiation in the outdoor heat exchanger 7. Consequently, the radiator temperature TCI and the heat absorber temperature Te in the transitional stage converge to the target values, respectively.

Furthermore, in a case where the heat absorber target temperature TEO is high, the controller 32 decreases the outdoor blower voltage FANVout of Equation (I), controls the air volume in the decreasing direction to inhibit the heat radiation in the outdoor heat exchanger 7, and inhibits the drop of the heat absorber temperature Te. Conversely, in a case where the heat absorber target temperature TEO is low, the controller increases the outdoor blower voltage FANVout of Equation (I), controls the air volume in the increasing direction, and promotes the heat radiation in the outdoor heat exchanger 7 to promote the drop of the heat absorber temperature Te. Consequently, the radiator temperature TCI and the heat absorber temperature Te in the transitional stage converge to the target values, respectively.

Furthermore, in a case where the mass air volume Ga of the air flowing into the air flow passage 3 is high, the controller 32 increases the outdoor blower voltage FANVout of Equation (I) and controls the air volume in the increasing direction to increase the quantity of heat to be radiated from the outdoor heat exchanger 7. Conversely, in a case where the mass air volume Ga is low, the controller decreases the outdoor blower voltage FANVout of Equation (I), controls the air volume in the decreasing direction, and decreases the heat radiation from the outdoor heat exchanger 7. Consequently, while converging the radiator temperature TCI and the heat absorber temperature Te in the transitional stage to the respective target values, the controller prevents excessive rise or drop of the outlet temperature.

Furthermore, in a case where the vehicle interior temperature Tin is high, the controller 32 increases the outdoor blower voltage FANVout of Equation (I), controls the air volume in the increasing direction, and promotes the heat radiation in the outdoor heat exchanger 7. Conversely, in a case where the vehicle interior temperature Tin is low, the controller decreases the outdoor blower voltage FANVout of Equation (I), controls the air volume in the decreasing direction, and inhibits the heat radiation in the outdoor heat exchanger 7. Consequently, while converging the radiator temperature TCI and the heat absorber temperature Te in the transitional stage to the respective target values, the controller maintains the vehicle interior temperature.

Furthermore, in a case where the vehicle interior humidity RHin is high, the controller 32 increases the outdoor blower voltage FANVout of Equation (I), controls the air volume in the increasing direction, acquires the heat absorber temperature Te, and achieves the decrease of the vehicle interior humidity. Conversely, in a case where the vehicle interior humidity RHin is low, the controller decreases the outdoor blower voltage FANVout of Equation (I), controls the air volume in the decreasing direction, and inhibits the drop of the heat absorber temperature Te. Consequently, while converging the radiator temperature TCI and the heat absorber temperature Te in the transitional stage to the respective target values, the controller maintains the vehicle interior humidity.

(6-2) Another Example of Control of Outdoor Blower 15 in which Velocity is Taken into Consideration Here, in a case where the velocity of the vehicle which is detected by the velocity sensor 52, i.e., the velocity is high (higher than the predetermined value, or gradually linearly controlled), the controller 32 may execute control to decrease the outdoor blower voltage FANVout, and to decrease the air volume of the outdoor blower 15, or to stop the outdoor blower 15.

In a case where the velocity is high, the air volume into the outdoor heat exchanger 7 is covered by the running air, and hence the controller decreases or zeroizes the air volume of the outdoor blower 15, thereby making it possible to eliminate the unnecessary operation of the outdoor blower 15.

(6-3) Another Example of Control of Outdoor Blower 15 Cooperating with Grill Shutter 24

Furthermore, in a case where the controller executes the air volume decrease/increase control of the outdoor blower 15 of each above-mentioned embodiment, the controller 32 may have a state of closing the grill shutter 24 or limiting the inflow of the running air into the outdoor heat exchanger 7 in accordance with an opening of the grill shutter 24.

When the controller executes the air volume decrease/increase control of the outdoor blower 15 in the state of closing the grill shutter 24 or limiting the inflow of the running air into the outdoor heat exchanger 7 in accordance with the opening of the grill shutter 24, it is possible to control all or almost all of the air volume into the outdoor heat exchanger 7 with the outdoor blower 15, and hence it is possible to improve control properties of the radiator temperature TCI and the heat absorber temperature Te by the outdoor blower 15 during the running.

It is to be noted that in the above embodiment, the present invention is applied to the vehicle air conditioner 1 which changes and executes the respective operation modes of the heating mode, the dehumidifying and heating mode, the dehumidifying and cooling mode and the cooling mode, but in addition to the modes, a so-called internal cycle mode may be executed. Also in this case, the effective range of the dehumidifying and cooling mode enlarges, and the vehicle air conditioner can avoid the execution of the internal cycle mode as much as possible.

Furthermore, the constitution and respective numeric values of the refrigerant circuit described in the above embodiment are not limited, and are changeable without departing from the gist of the present invention.

DESCRIPTION OF REFERENCE NUMERALS

1 vehicle air conditioner
2 compressor
3 air flow passage
4 radiator
6 outdoor expansion valve
7 outdoor heat exchanger
8 indoor expansion valve
9 heat absorber 15 outdoor blower
24 grill shutter
32 controller (control means)
R refrigerant circuit

The invention claimed is:

1. A vehicle air conditioner comprising:
a compressor which compresses a refrigerant;
an air flow passage through which air to be supplied to a vehicle interior flows;
a radiator disposed in the air flow passage to let the refrigerant radiate heat;
a heat absorber disposed in the air flow passage to let the refrigerant absorb heat;
an outdoor heat exchanger disposed outside the vehicle interior to let the refrigerant absorb heat;
an outdoor expansion valve which decompresses the refrigerant flowing into the outdoor heat exchanger;
an outdoor blower which blows outdoor air through the outdoor heat exchanger; and
a controller,
the vehicle air conditioner executing at least a dehumidifying and heating mode in which the controller is configured to let the refrigerant discharged from the compressor radiate heat in the radiator, decompresses the refrigerant by which heat has been radiated and then lets the refrigerant absorb heat in the heat absorber and the outdoor heat exchanger,
wherein the controller is configured to decrease an air volume of the outdoor blower in a case where (i) a temperature of the radiator converges to a radiator target temperature, (ii) the controller is configured to adjust a valve position of the outdoor expansion valve into a lowest opening of controlling, and (iii) a temperature of the heat absorber is higher than a heat absorber target temperature.

2. The vehicle air conditioner according to claim 1,
wherein the controller is configured to increase the air volume of the outdoor blower in a case where the temperature of the heat absorber is lower than the heat absorber target temperature even when the controller is configured to adjust the valve position of the outdoor expansion valve into a highest opening of controlling in the situation in which the temperature of the radiator converges to the radiator target temperature.

3. The vehicle air conditioner according to claim 1,
wherein the controller is configured to decrease the air volume of the outdoor blower in a case where the temperature of the radiator is higher than a radiator target temperature even when the controller is configured to adjust a speed of the compressor into a lowest speed of controlling in a situation in which the temperature of the heat absorber converges to the radiator target temperature.

4. The vehicle air conditioner according to claim 1,
wherein the controller is configured to increase the air volume of the outdoor blower in a case where the temperature of the radiator is lower than a radiator target temperature even when the controller is configured to adjust a speed of the compressor into a highest speed of controlling in the situation in which the temperature of the heat absorber converges to the radiator target temperature.

5. The vehicle air conditioner according to claim 1,
wherein the controller is configured to decrease the air volume of the outdoor blower in a case where the temperature of the radiator is higher than a radiator target temperature and the temperature of the heat absorber is also higher than the heat absorber target temperature even when the controller is configured to adjust a speed of the compressor into a highest speed of controlling and adjusts the valve position of the outdoor expansion valve into the lowest opening of controlling.

6. The vehicle air conditioner according to claim 1,
wherein the controller is configured to increase the air volume of the outdoor blower in a case where the temperature of the radiator is lower than a radiator target temperature and the temperature of the heat absorber is also lower than the heat absorber target temperature even when the controller is configured to adjust a speed of the compressor into a highest speed of controlling and adjusts the valve position of the outdoor expansion valve into the highest opening of controlling.

7. The vehicle air conditioner according to claim 1,
wherein the controller is configured to judge that the dehumidifying and heating mode is not established, and changes an operation mode to another mode without executing air volume decrease/increase control of the outdoor blower in a case where the temperature of the radiator is higher than the radiator target temperature and the temperature of the heat absorber is lower than the heat absorber target temperature even when the controller configured to adjust a speed of the compressor into a highest speed of controlling and adjusts the valve position of the outdoor expansion valve into the highest opening of controlling, or in a case where the temperature of the radiator is lower than the radiator target temperature and the temperature of the heat absorber is higher than the heat absorber target temperature even when the controller is configured to adjust a speed of the compressor into a highest speed of controlling and adjusts the valve position of the outdoor expansion valve into the lowest opening of controlling.

8. The vehicle air conditioner according to claim 1,
wherein the controller is configured to not execute the air volume decrease/increase control of the outdoor blower or maximizes the air volume of the outdoor blower in a transitional stage of an operating state.

9. The vehicle air conditioner according to claim 8,
wherein the controller is configured to determine the air volume of the outdoor blower in the transitional stage on a basis of one of an outdoor air temperature, a radiator target temperature, a heat absorber target temperature, a mass air volume of the air flowing into the air flow passage, a vehicle interior temperature, and a vehicle interior humidity, any combination of them, or all of them.

10. The vehicle air conditioner according to claim 1,
wherein the controller is configured to decrease the air volume of the outdoor blower or stops the outdoor blower in a case where a velocity is higher than a predetermined value.

11. The vehicle air conditioner according to claim 1, comprising:
a grill shutter which obstructs inflow of running air into the outdoor heat exchanger,
wherein the controller is configured to execute the air volume decrease/increase control of the outdoor blower in a state of closing the grill shutter or limiting the inflow of the running air in accordance with an opening of the grill shutter.

12. A vehicle air conditioner comprising:
a compressor which compresses a refrigerant;
an air flow passage through which air to be supplied to a vehicle interior flows;

a radiator disposed in the air flow passage to let the refrigerant radiate heat;

a heat absorber disposed in the air flow passage to let the refrigerant absorb heat;

an outdoor heat exchanger disposed outside the vehicle interior to let the refrigerant radiate heat;

an outdoor expansion valve which decompresses the refrigerant flowing into the outdoor heat exchanger;

an outdoor blower which blows outdoor air through the outdoor heat exchanger; and a controller, the vehicle air conditioner executing at least a dehumidifying and cooling mode in which the controller is configured to let the refrigerant discharged from the compressor radiate heat in the radiator and the outdoor heat exchanger, decompresses the refrigerant by which heat has been radiated and then lets the refrigerant absorb heat in the heat absorber, wherein the controller is configured to decrease an air volume of the outdoor blower in a case where (i) a temperature of the heat absorber converges to a heat absorber target temperature, (ii) the controller is configured to adjust a valve position of the outdoor expansion valve into a lowest opening of controlling, and (iii) a temperature of the radiator is lower than a radiator target temperature.

13. The vehicle air conditioner according to claim 12, wherein the controller is configured to increase the air volume of the outdoor blower in a case where the temperature of the radiator is higher than the radiator target temperature even when the controller is configured to adjust the valve position of the outdoor expansion valve into a highest opening of controlling in the situation in which the temperature of the heat absorber is satisfactory.

14. The vehicle air conditioner according to claim 12, wherein the controller is configured to decrease the air volume of the outdoor blower in a case where the temperature of the heat absorber is lower than a heat absorber target temperature even when the controller is configured to a speed of the compressor into a lowest speed of controlling in a situation in which the temperature of the radiator converges to the heat absorber target temperature.

15. The vehicle air conditioner according to claim 12, wherein the controller is configured to increase the air volume of the outdoor blower in a case where the temperature of the heat absorber is higher than a heat absorber target temperature even when the controller is configured to adjust the highest speed of controlling in the situation in which the temperature of the radiator converges to the heat absorber target temperature.

16. The vehicle air conditioner according to claim 12, wherein the controller is configured to decrease the air volume of the outdoor blower in a case where the temperature of the heat absorber is lower than a heat absorber target temperature and the temperature of the radiator is also lower than the radiator target temperature even when the controller is configured to adjust a speed of the compressor into a lowest speed of controlling and adjusts the valve position of the outdoor expansion valve into the lowest opening of controlling.

17. The vehicle air conditioner according to claim 12, wherein the controller is configured to increase the air volume of the outdoor blower in a case where the temperature of the heat absorber is higher than a heat absorber target temperature and the temperature of the radiator is also higher than the radiator target temperature even when the controller is configured to adjust a speed of the compressor into a highest speed of controlling and adjusts the valve position of the outdoor expansion valve into the highest opening of controlling.

18. The vehicle air conditioner according to claim 12, wherein the controller is configured to judge that the dehumidifying and cooling mode is not established, and changes an operation mode to another mode without executing air volume decrease/increase control of the outdoor blower, in a case where the temperature of the heat absorber is lower than the heat absorber target temperature and the temperature of the radiator is higher than the radiator target temperature even when the controller is configured to adjust a speed compressor into a lowest speed of controlling and adjusts the valve position of the outdoor expansion valve into the highest opening of controlling, or in a case where the temperature of the heat absorber is higher than the heat absorber target temperature and the temperature of the radiator is lower than the radiator target temperature even when the controller is configured to adjust a speed of the compressor into a highest speed of controlling and adjusts the valve position of the outdoor expansion valve into the lowest opening of controlling.

19. The vehicle air conditioner according to claim 12, wherein the controller is configured to not execute the air volume decrease/increase control of the outdoor blower or maximizes the air volume of the outdoor blower in a transitional stage of an operating state.

20. The vehicle air conditioner according to claim 19, wherein the controller is configured to determine the air volume of the outdoor blower in the transitional stage on a basis of one of an outdoor air temperature, a radiator target temperature, a heat absorber target temperature, a mass air volume of the air flowing into the air flow passage, a vehicle interior temperature, and a vehicle interior humidity, any combination of them, or all of them.

21. The vehicle air conditioner according to claim 12, wherein the controller is configured to decrease the air volume of the outdoor blower or stops the outdoor blower in a case where a velocity is higher than a predetermined value.

22. The vehicle air conditioner according to claim 12, comprising:

a grill shutter which obstructs inflow of running air into the outdoor heat exchanger, wherein the controller is configured to execute the air volume decrease/increase control of the outdoor blower in a state of closing the grill shutter or limiting the inflow of the running air in accordance with an opening of the grill shutter.

* * * * *